United States Patent
Guo

(10) Patent No.: US 9,938,710 B2
(45) Date of Patent: Apr. 10, 2018

(54) COLD-FORMED STEEL ABOVE GROUND TORNADO SHELTER

(71) Applicant: Ping Guo, Brampton (CA)

(72) Inventor: Ping Guo, Brampton (CA)

(*) Notice: Subject to any disclaimer, the term of this patent is extended or adjusted under 35 U.S.C. 154(b) by 0 days.

(21) Appl. No.: 14/675,124

(22) Filed: Mar. 31, 2015

(65) Prior Publication Data

US 2015/0275502 A1    Oct. 1, 2015

Related U.S. Application Data

(63) Continuation-in-part of application No. 14/642,153, filed on Mar. 9, 2015, now abandoned.

(60) Provisional application No. 61/972,503, filed on Mar. 31, 2014.

(51) Int. Cl.
    *E04B 1/32*    (2006.01)
    *E04H 9/14*    (2006.01)
    *E04B 1/08*    (2006.01)

(52) U.S. Cl.
    CPC .............. *E04B 1/3205* (2013.01); *E04B 1/08* (2013.01); *E04H 9/14* (2013.01); *E04B 2001/3276* (2013.01)

(58) Field of Classification Search
    CPC .......... E04B 31/3205; E04B 1/32; E04B 1/92; E04B 2001/3276; E04B 2001/327; E04H 9/01; E04C 2/08
    USPC ................... 52/169.7, 86, 741, 537
    See application file for complete search history.

(56) References Cited

U.S. PATENT DOCUMENTS

| | | | | |
|---|---|---|---|---|
| 3,111,788 A * | 11/1963 | Ouellet | ............... | E04B 7/107 52/537 |
| 3,187,852 A * | 6/1965 | Carman | ............... | E04B 1/3205 52/245 |
| 3,258,889 A * | 7/1966 | Butcher | ............... | E04C 2/386 264/263 |
| 3,660,482 A * | 5/1972 | Elizalde | ............... | E04D 3/24 52/478 |
| 3,785,913 A * | 1/1974 | Hallamore | ............... | E04C 2/284 156/71 |
| 3,814,659 A * | 6/1974 | Nadeau | ............... | C08G 18/4045 138/149 |
| 3,842,647 A * | 10/1974 | Knudson | ............... | B21D 11/08 72/177 |
| 3,902,288 A * | 9/1975 | Knudson | ............... | B21D 11/08 52/528 |
| 3,967,430 A * | 7/1976 | Knudson | ............... | B21D 11/08 29/243.5 |
| 3,968,603 A * | 7/1976 | Merson | ............... | E04B 1/08 52/574 |
| 3,991,252 A * | 11/1976 | Kolakowski | ............ | B32B 13/12 156/71 |
| 4,120,123 A * | 10/1978 | Knudson | ............... | E04B 1/18 52/406.2 |

(Continued)

OTHER PUBLICATIONS

Pre-Engineed Systems, Tornado Shelter, website "http://pre-engineeredsystems.com/pre-fabricated-tornado-shelters.php".

*Primary Examiner* — Brian E Glessner
*Assistant Examiner* — Adam G Barlow
(74) *Attorney, Agent, or Firm* — DeLio, Peterson & Curcio, LLC.; Thomas E. Ciesco

(57) ABSTRACT

A tornado shelter which meets the structural performance criteria of ICC, FEMA, ASCE, AISI, and ACI, produced from trapezoidal cold-formed steel panels.

17 Claims, 76 Drawing Sheets

(56) References Cited

U.S. PATENT DOCUMENTS

| | | | | |
|---|---|---|---|---|
| 4,122,203 A * | 10/1978 | Stahl | B32B 5/18 | 156/71 |
| 4,194,328 A * | 3/1980 | Peirson | E04B 1/3205 | 52/236.6 |
| 4,260,569 A * | 4/1981 | Hurst | B29C 44/1228 | 264/45.4 |
| 4,290,250 A * | 9/1981 | Kusenda | E04B 1/3205 | 52/404.2 |
| 4,505,084 A * | 3/1985 | Knudson | B21D 13/04 | 52/519 |
| 4,505,143 A * | 3/1985 | Knudson | B21D 13/04 | 72/181 |
| 4,819,398 A * | 4/1989 | Dameron | E04D 3/24 | 52/522 |
| 5,192,598 A * | 3/1993 | Forte | B32B 5/18 | 156/78 |
| 5,233,799 A * | 8/1993 | Abukawa | B21D 5/08 | 52/53 |
| 5,365,716 A * | 11/1994 | Munson | E04B 1/7604 | 52/404.1 |
| 5,376,315 A | 12/1994 | Fricke | | |
| 5,481,837 A | 1/1996 | Minks, Jr. | | |
| 5,641,368 A * | 6/1997 | Romes | B05B 7/1409 | 156/293 |
| 5,666,780 A * | 9/1997 | Romes | B05B 7/1409 | 156/71 |
| 5,758,463 A * | 6/1998 | Mancini, Jr. | E04C 2/384 | 52/309.12 |
| 5,765,330 A * | 6/1998 | Richard | E04B 1/14 | 52/265 |
| 6,061,976 A | 5/2000 | Willbanks, Jr. | | |
| 6,131,343 A | 10/2000 | Jackson, Jr. | | |
| 6,151,841 A | 11/2000 | Green | | |
| 6,161,345 A | 12/2000 | Hope et al. | | |
| 6,263,715 B1 * | 7/2001 | Blazley | B21D 13/04 | 72/187 |
| 6,279,284 B1 * | 8/2001 | Moras | E04B 1/10 | 52/105 |
| 6,393,776 B1 | 5/2002 | Waller et al. | | |
| 6,415,558 B1 | 7/2002 | Cherry | | |
| 6,481,172 B1 * | 11/2002 | Porter | B32B 5/18 | 428/317.7 |
| 6,499,203 B2 * | 12/2002 | Morello | B21D 39/025 | 29/243.58 |
| 6,948,281 B1 * | 9/2005 | Carmichael | E04H 9/14 | 52/169.6 |
| 7,127,856 B2 * | 10/2006 | Hagen, Jr. | E04B 1/7604 | 52/309.7 |
| 8,033,070 B2 * | 10/2011 | Morello | B21D 13/04 | 52/462 |
| 8,136,303 B2 | 3/2012 | Scott, IV | | |
| 8,429,866 B2 * | 4/2013 | Knight | E04B 2/58 | 52/302.3 |
| 8,495,852 B2 * | 7/2013 | Fay | E04B 1/62 | 52/404.3 |
| 8,549,797 B1 | 10/2013 | Ricketts | | |
| 8,696,966 B2 * | 4/2014 | Smith | B29C 39/10 | 264/261 |
| 2004/0148889 A1 * | 8/2004 | Bibee | E04B 1/78 | 52/481.1 |
| 2006/0080905 A1 * | 4/2006 | Morello | E04B 1/3205 | 52/86 |
| 2010/0126093 A1 * | 5/2010 | Davis | E04B 1/3205 | 52/283 |
| 2011/0232203 A1 * | 9/2011 | Anderson | B21D 5/08 | 52/86 |
| 2012/0222367 A1 | 9/2012 | Wirtz | | |
| 2013/0291450 A1 | 11/2013 | Hillje | | |
| 2014/0115989 A1 * | 5/2014 | Sievers | E04C 2/386 | 52/302.1 |
| 2015/0093535 A1 * | 4/2015 | Lambach | E04C 2/386 | 428/71 |

* cited by examiner

COLD-FORMED STEEL ABOVE GROUND TORNADO SHELTER

This application claims priority on U.S. Provisional Patent Application No. 61/972,503 filed Mar. 31, 2014, incorporated herein by reference.

BACKGROUND OF THE INVENTION

1. Field of the Invention

This invention relates to shelters conforming to the "ICC/NSSA Standard for the Design and Construction of Storm Shelters" (ICC 500), "FEMA Design and Construction Guidance for Community Safe Rooms" (FEMA 361), "ICC International Building Code" (IBC), "ASCE Standard ASCE/SEI 7 Minimum Design Loads for Buildings and Other Structures" (ASCE 7), "AISI Standard North American Specification for the Design of Cold-Formed Steel Structural Members" (AISI S100), and "ACI Standard Building Code Requirements for Structural Concrete (ACI 318)".

2. Description of Related Art

Tornado shelters are well known and have been built both underground and above ground. The majority of underground tornado shelters are relatively small. Large underground tornado shelters can be built but at significantly higher costs. Underground tornado shelters are not ideal for areas with high level ground water or susceptible to flooding.

Above ground tornado shelters are often defined by a relatively small box or the like constructed out of reinforced concrete, reinforced masonry, thick steel frames and plates, lumber frames covered with thick steel plates or combinations of the above. Larger tornado shelters are commonly made of heavily reinforced concrete. Without intending to be bound by theory, it is believed that the result of the relatively high costs of large concrete tornado shelters is a dearth of community tornado shelters.

It is well known to construct buildings from lengths of rolled steel, each length having been cold-formed into a trough. To assemble such a building, a plurality of arches is constructed, each arch being constructed from a plurality of the lengths, bolted to one another. The arches are upended and bolted to one another, to form an arch building. Hundreds of thousands of ordinary cold-formed steel arch buildings have been constructed. However, these ordinary cold-formed steel arch buildings do not conform to the structural requirements of ICC 500, FEMA 361, IBC, ASCE 7, AISI S100, and ACI 318, especially for 250 mph tornado wind forces, 100 mph 15-lb sawn lumber 2×4 missile impacts, and 100 psf roof live loads.

SUMMARY OF THE INVENTION

For the purpose of the invention, tornado-resisting is defined as being capable to resist 100 psf roof live loads, up to 250 mph tornado wind loads, and 15-lb sawn lumber 2×4 missile impacts at up to 100 mph on vertical surfaces and 67 mph on horizontal surfaces, as required by ICC 500, without any perforation of the interior surface, dislodgment and disengagement, excessive spall, or permanent deformation of the interior surface exceeding 3 inches.

Forming one aspect of the invention is a low cost tornado shelter comprising:
  a plurality of 0.03" to 0.13" thick tornado-resisting cold-formed steel panels;
  a plurality of 10' to 100' wide main tornado-resisting systems comprised of the panels;
  a tornado-resisting end wall system;
  a tornado-resisting foundation system; and
  the panels, the main systems, the end wall and the foundation being adapted such that the shelter is capable of providing life-safety protection to up to thousands of occupants from up to 250 mph tornadoes and up to 100 mph tornado debris missile impacts.

According to another aspect of the invention, the tornado shelter as described in the paragraph directly above, wherein the end wall system is comprised of the panels.

Forming yet another aspect of the invention is the tornado shelter as described in the paragraph directly above, wherein at least one of the end walls having at least one baffled entry system comprising:
  an opening within the end wall;
  a tornado-resisting main baffled entry wall comprised of the panels;
  a tornado-resisting side baffled entry wall system comprised of the panels;
  a tornado-resisting horizontal diaphragm comprised of the panels; and
  the opening, the main baffled entry wall, the side baffled entry wall system, the horizontal diaphragm, and the end wall being adapted to allow occupants to enter the shelter through single or double passageways while providing life-safety protections to up to thousands of occupants from up to 100 mph tornado debris missile impacts, with or without a door.

According to another aspect of the invention, the tornado shelter as described in the paragraph directly above, wherein an opening is protected by a tornado impact-protective system comprised of one or more of the panels.

Forming one more aspect of the invention is a commercial package comprising the steel components of the panels, the main systems, the end walls, and the impact-protective system of the shelter according to the paragraphs above.

According to another aspect of the invention, a method of assisting a consumer with the securement of a tornado shelter, the method comprising the steps of:
  offering the commercial package as described directly above for sale; and
  providing assistance in the installation of the commercial package.

Forming yet another aspect of the invention is a method according to the paragraph directly above, wherein the assistance is provided in the form of one or more of instructions accompanying the commercial package in shipment and the service of installation of the commercial package.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-76 of the drawings in which like numerals refer to like features of the invention.

Figure 1:
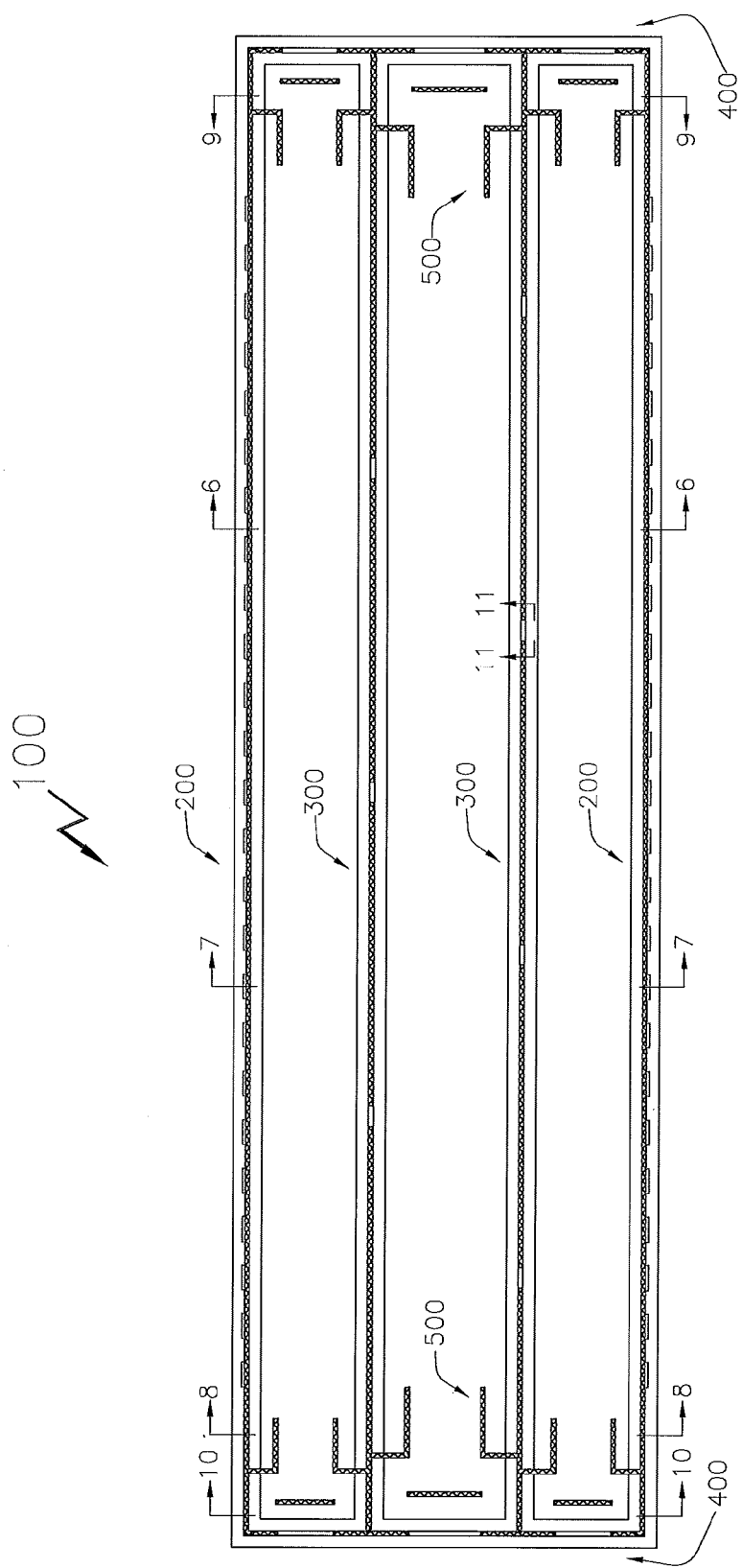
FIG. 1 is a gross plan of a community tornado shelter structure constructed from a commercial package according to an exemplary embodiment of the invention

FIG. 1 shows a gross plan of a large community tornado shelter structure 100 constructed from a commercial package according to an exemplary embodiment of the current invention. A tornado shelter 100 is comprised of main tornado-resisting systems 200, longitudinal internal load bearing walls 300, tornado-resisting end walls 400, and baffled entry walls 500. More detailed views of shelter 100 are provided in FIGS. 2-35.

Figure 2:
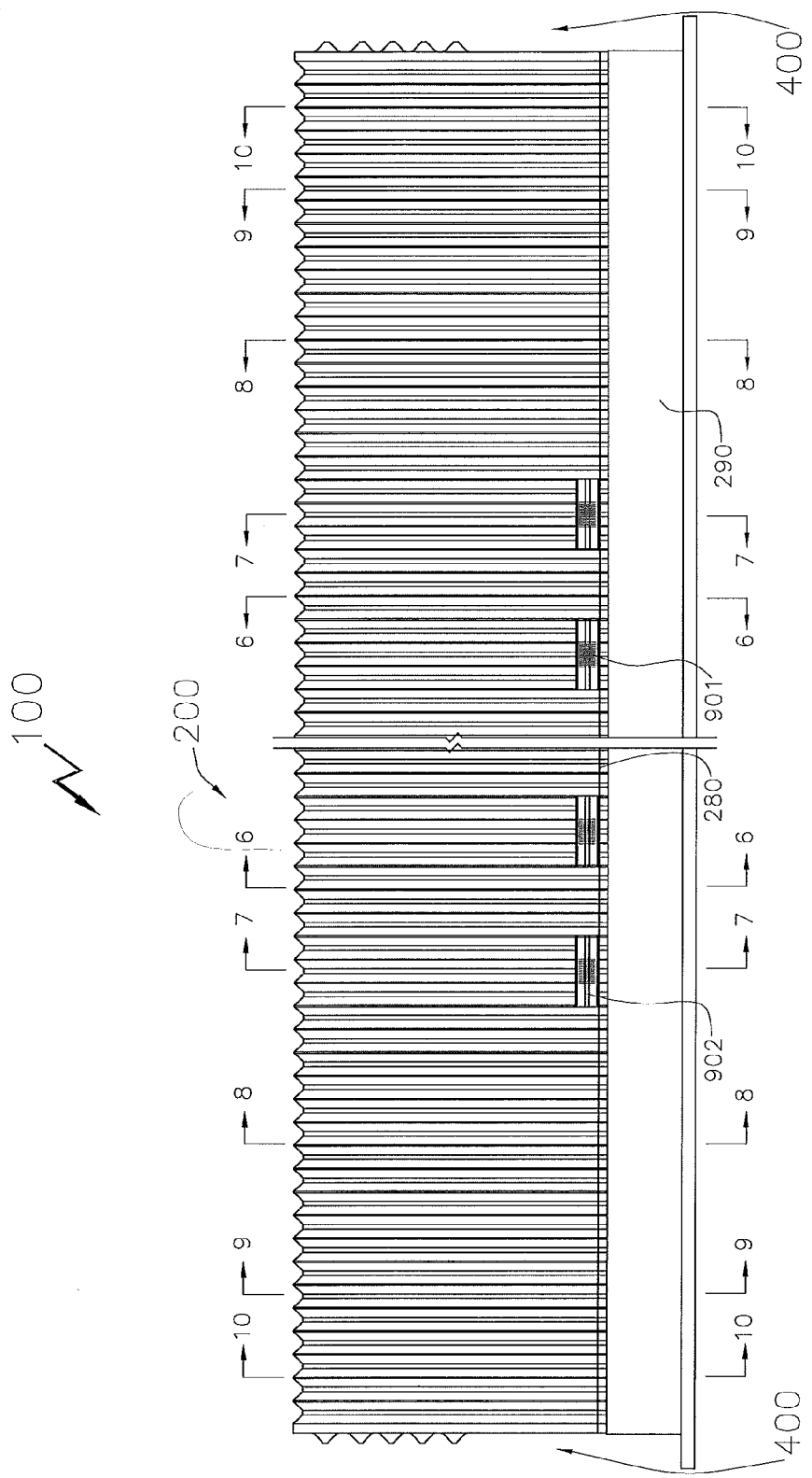
FIG. 2 is a side elevation view of the structure of FIG. 1

FIG. 2 shows a side elevation view of shelter 100. Main tornado-resisting systems 200, designed to withstand the ICC 500 required tornado wind pressures and debris missile impacts, serve as all of the side wall, roof, and side envelope of shelter 100. Indicated in FIG. 2 are also locations of the cross section views, FIGS. 6-10, of shelter 100. Locations of ICC 500 required side base vents 901 and their tornado impact-protective systems 902 are also shown in FIG. 2. The main tornado-resisting systems 200 are connected to Tornado-resisting foundation 290 by tornado-resisting connectors 280.

Figure 3:
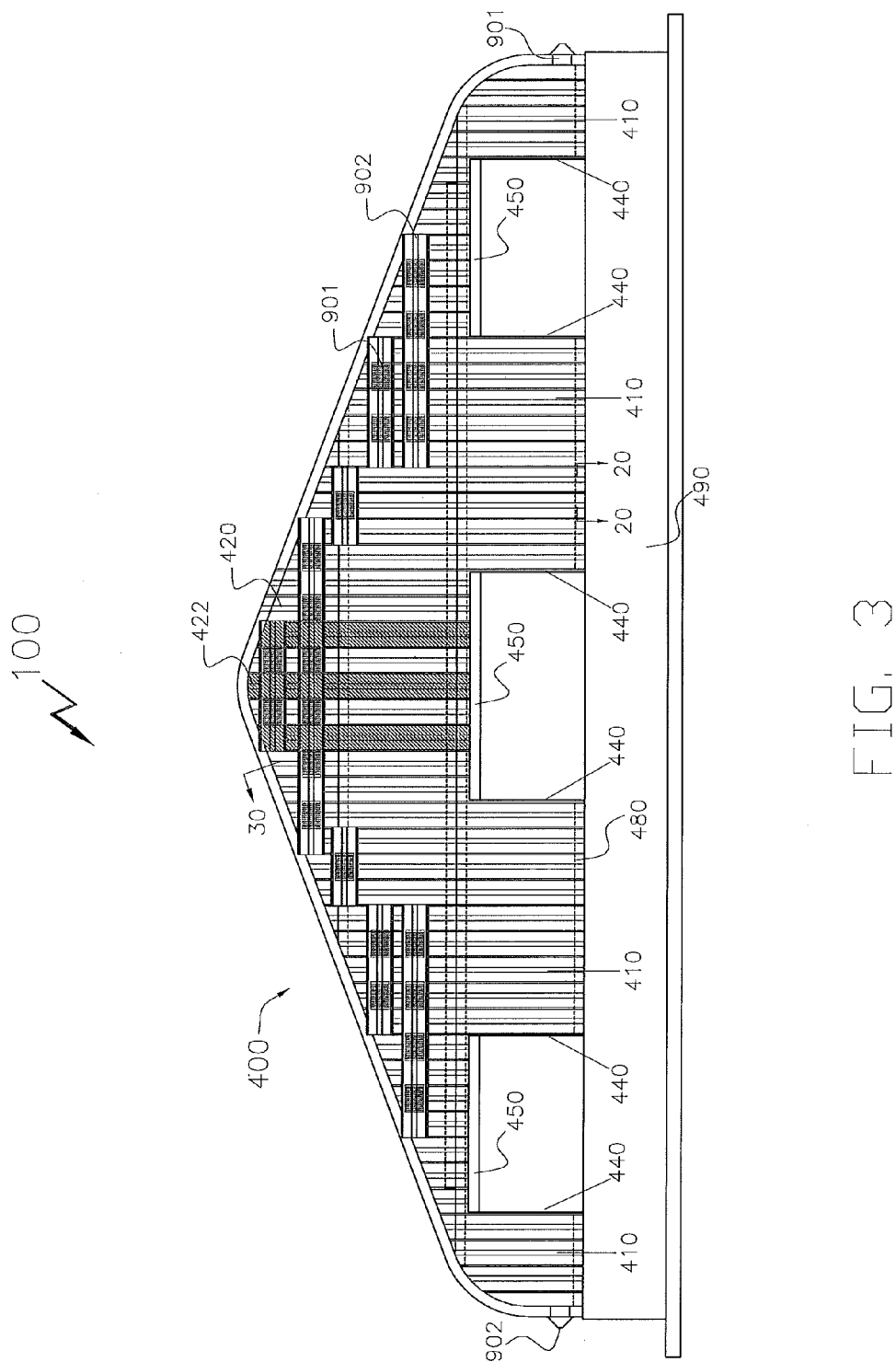
FIG. 3 is an end elevation view of the structure of FIG. 1
Figure 20:
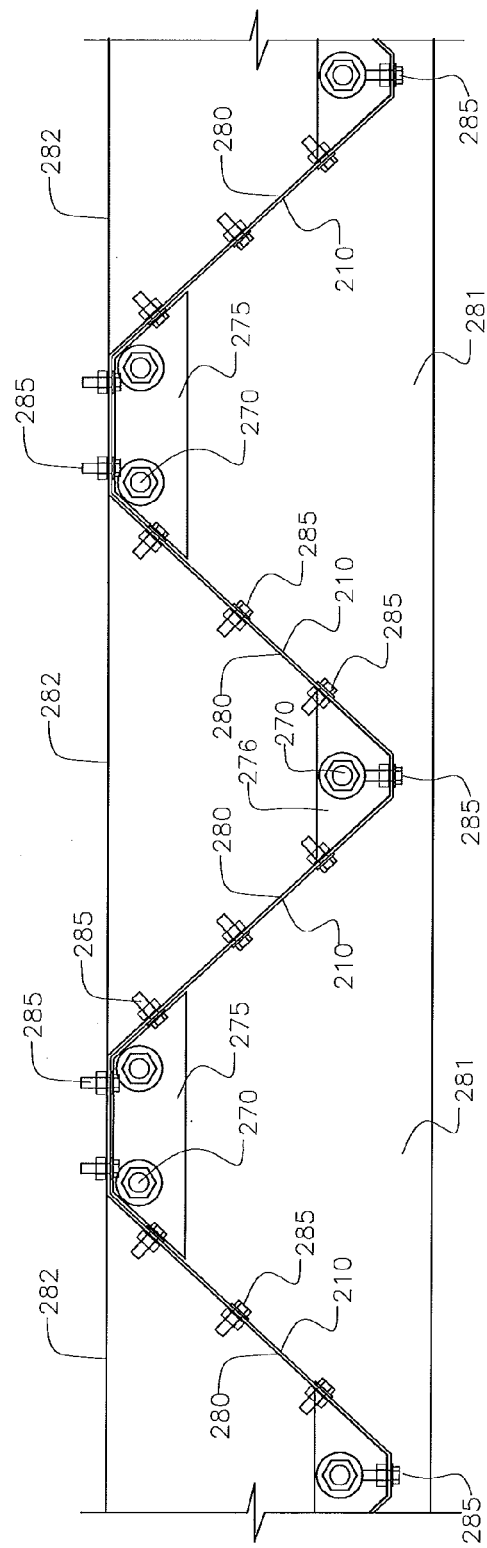
FIG. 20 is a cross section plan view of the tornado-resisting connectors of the structure of FIG. 1
Figure 30:
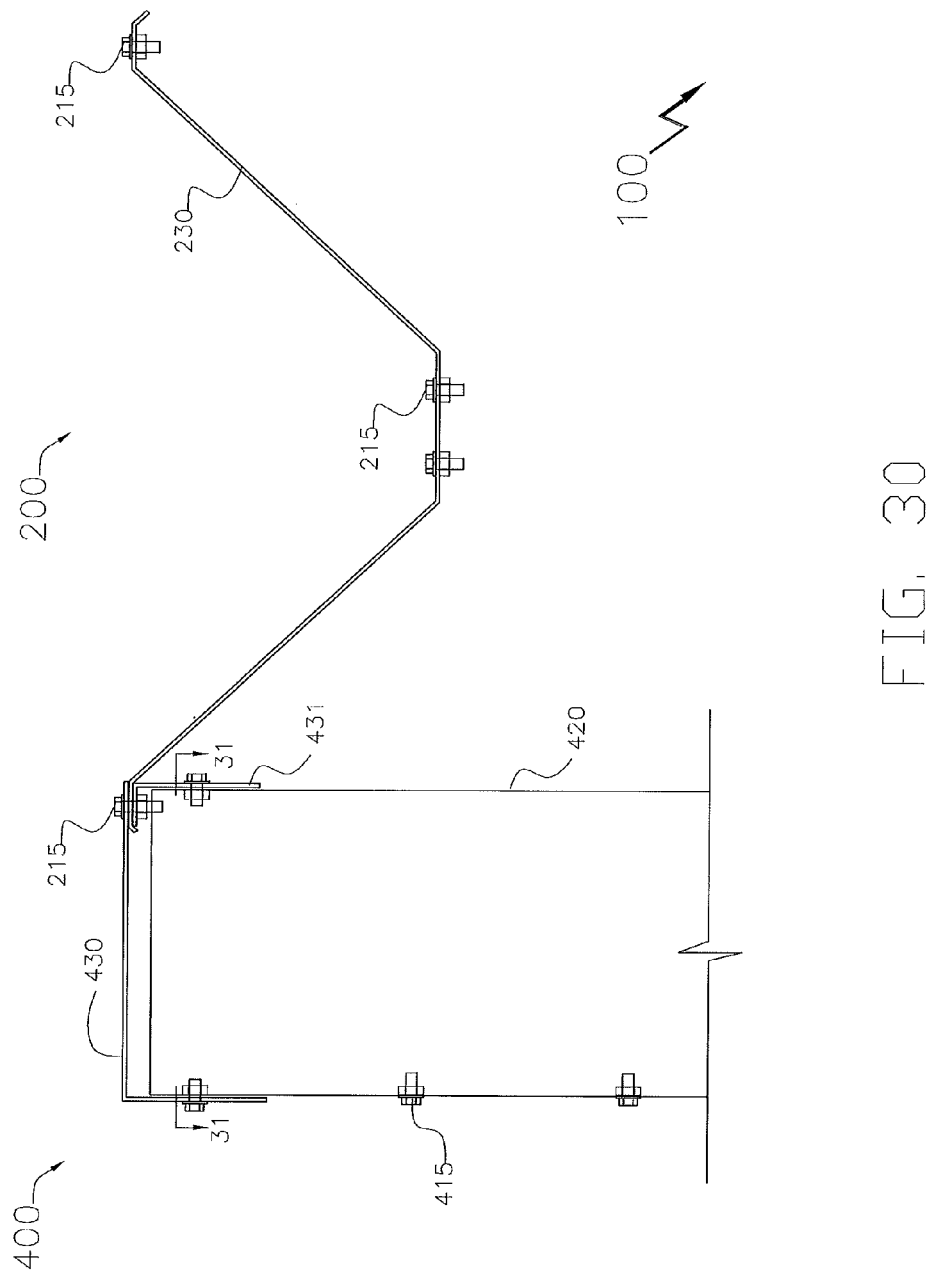
FIG. 30 is a cross section view of the connection between a tornado-resisting roof panel and the top end of a tornado-resisting end wall panel of the structure of FIG. 1

A tornado-resisting end wall 400 of shelter 100 is illustrated in FIG. 3. The main components of end wall 400 include tornado-resisting end wall panels 410 from foundation 490 to the main tornado-resisting system at the top, tornado-resisting end wall panels 420 above exit top beams 450, exit side posts 440, tornado-resisting end wall connector 480, and double end wall panels 422. All of these main end wall components must be strong enough to withstand the ICC 500 required tornado wind pressures and debris missile impacts. Also shown in FIG. 3 are vents 901 and their tornado impact-protective systems 902. Typical connection between a main tornado-resisting system panel and the top end of an end wall panel is shown in FIG. 30. A cross section plan view of the tornado-resisting end wall connector 480 is shown in FIG. 20.

Figure 4:
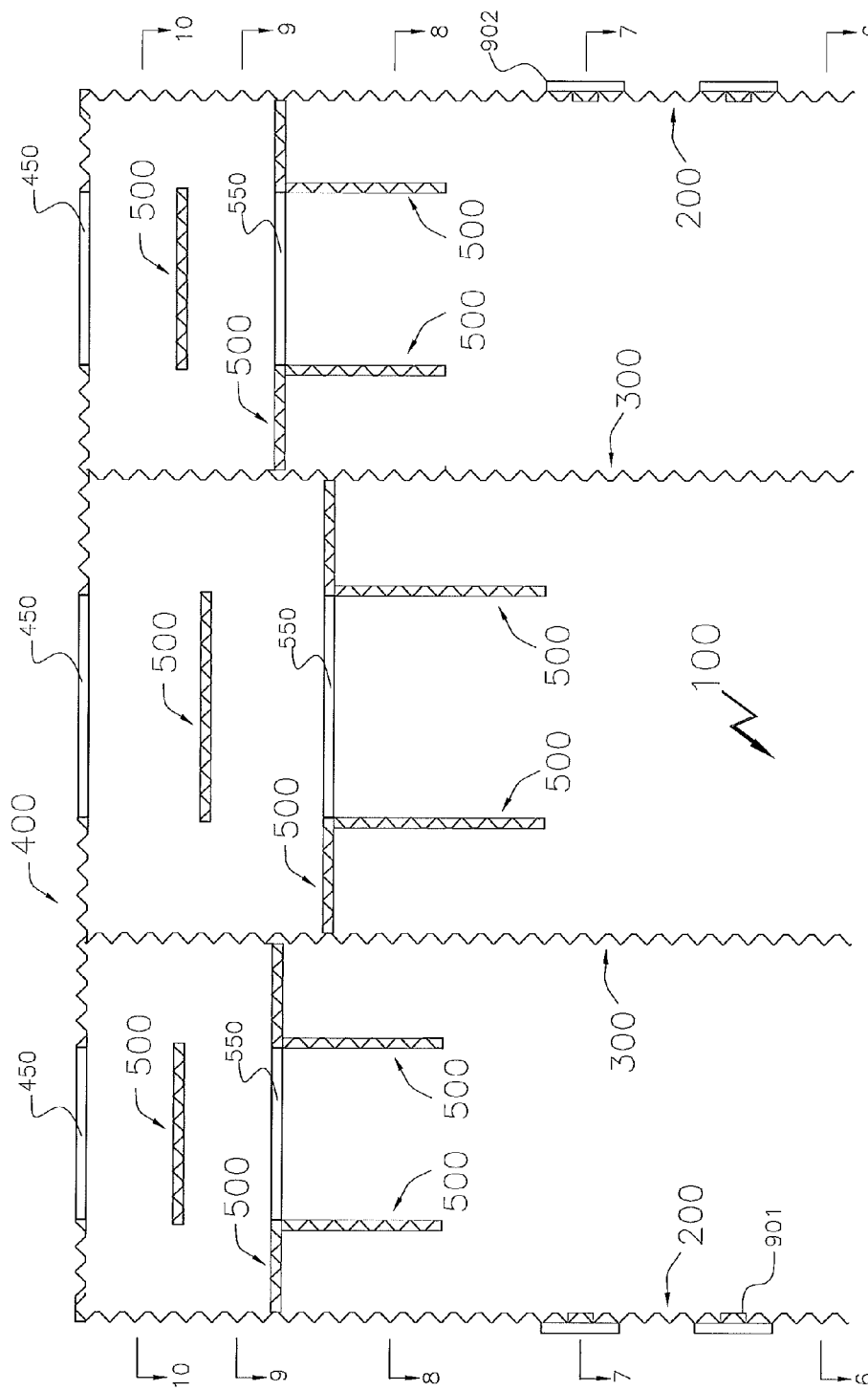
FIG. 4 is a more detailed floor plan near one end of the structure of FIG. 1

A more detailed floor plan near one end of shelter 100 is shown in FIG. 4 with the locations of two bottom ends of main tornado-resisting systems 200, two longitudinal internal load bearing walls 300, a tornado-resisting end wall 400, three end wall exit top beams 450, alcove/baffled entry systems 500 with beams 550, side bottom vents 901 and their tornado impact-protective systems 902. The baffled entry systems 500 are made of the tornado-resisting panels; protect the shelter occupants from the direct and second impacts of all tornado debris missiles while allowing many other occupants entering shelter 100 during tornadoes; directly support the floor diaphragms above them; in-directly provide lateral support to the end wall panels; provide IBC required exits for thousands of occupants; and eliminate expensive tornado-resisting doors and hardware. Two longitudinal internal load bearing walls 300 are used to strengthen the main tornado-resisting systems 200. More longitudinal internal load bearing walls 300 may be used to strengthen wider main tornado-resisting systems. These longitudinal internal load bearing walls 300 and their connections to the main tornado-resisting systems 200 and foundation 390 must be designed to withstand the maximum axial tensile forces, compressive forces, shear forces, and bending moments.

Figure 5:
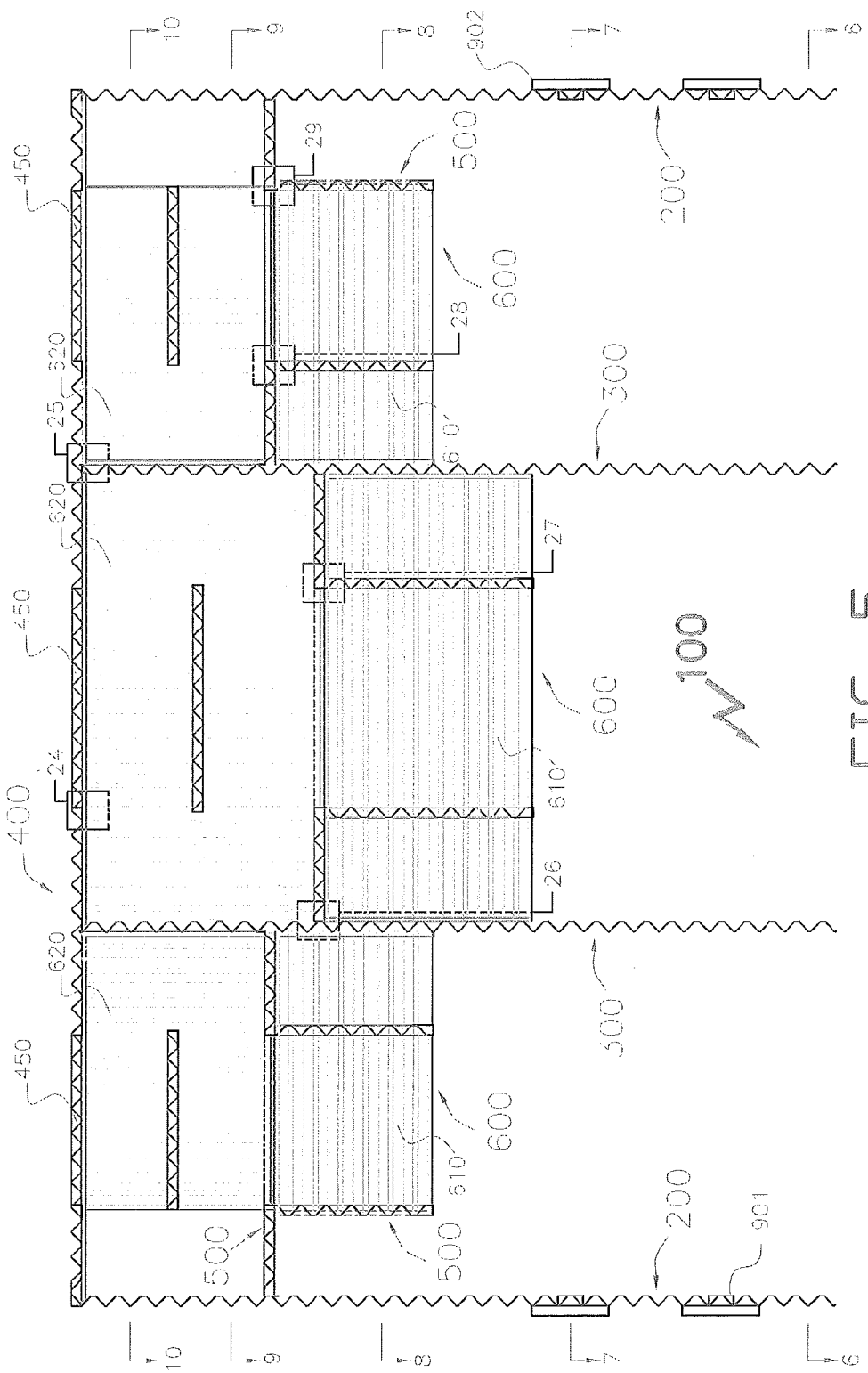
FIG. 5 is a more detailed floor diaphragm plan near one end of the structure of FIG. 1

Horizontal floor diaphragms 600 are shown in FIG. 5 together with locations of side walls 200, longitudinal internal walls 300, end wall 400, end wall exit top beams 450, baffled entry system 500, transverse mezzanine floor panels 610, longitudinal mezzanine floor panels 620, vents 901, and vent protective panels 902 of shelter 100. Locations of connection detail FIGS. 24-29 are also shown in FIG. 5. Horizontal floor diaphragm panels 610 and 620 and their connections to longitudinal walls 300, end wall 400, end wall beams 450, and baffled entry walls 500 must be designed to withstand the ICC 500 required live loads and tornado wind pressures and forces.

Figure 6:
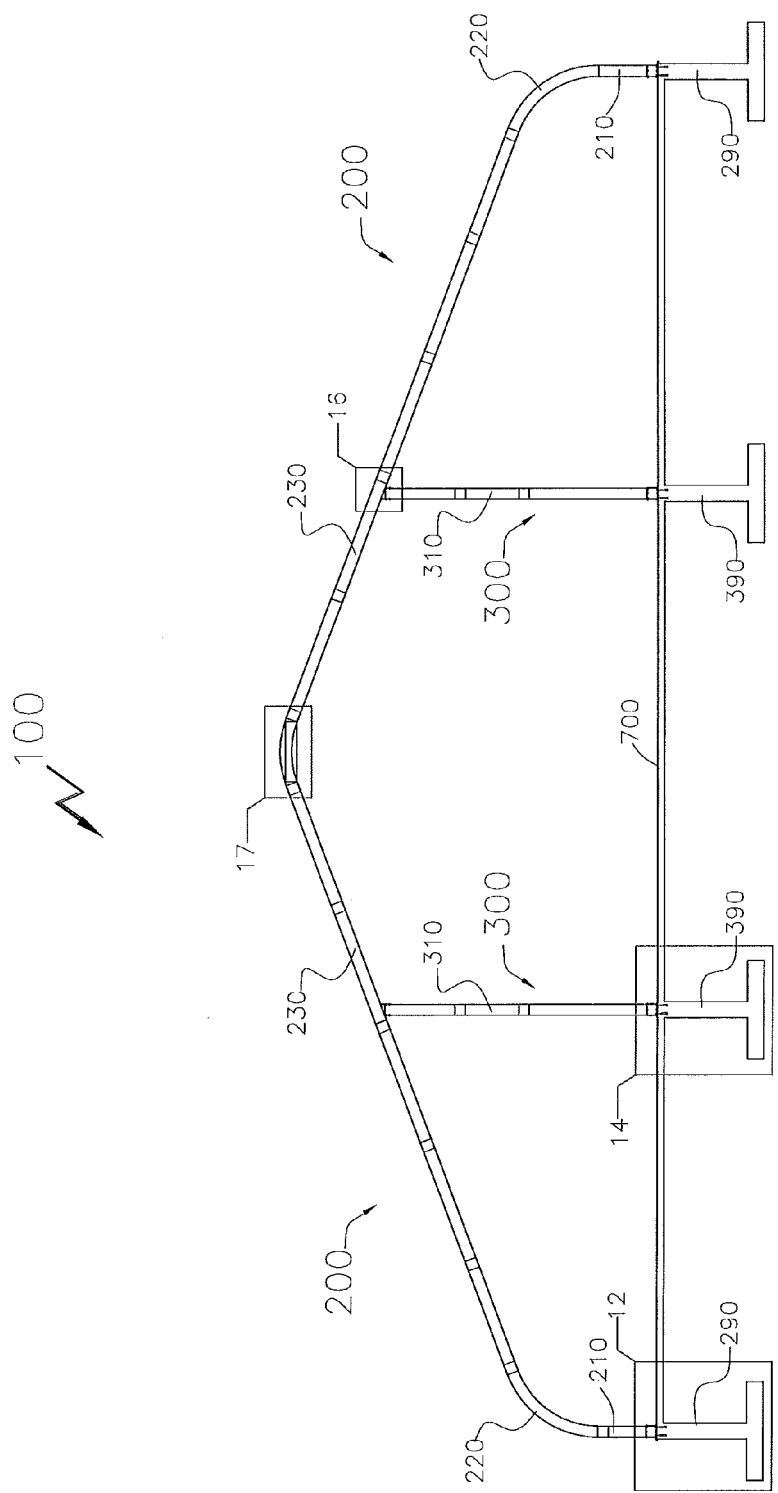
FIG. 6 is an elevation view of a typical main tornado-resisting system of the structure of FIG. 1
Figure 16:
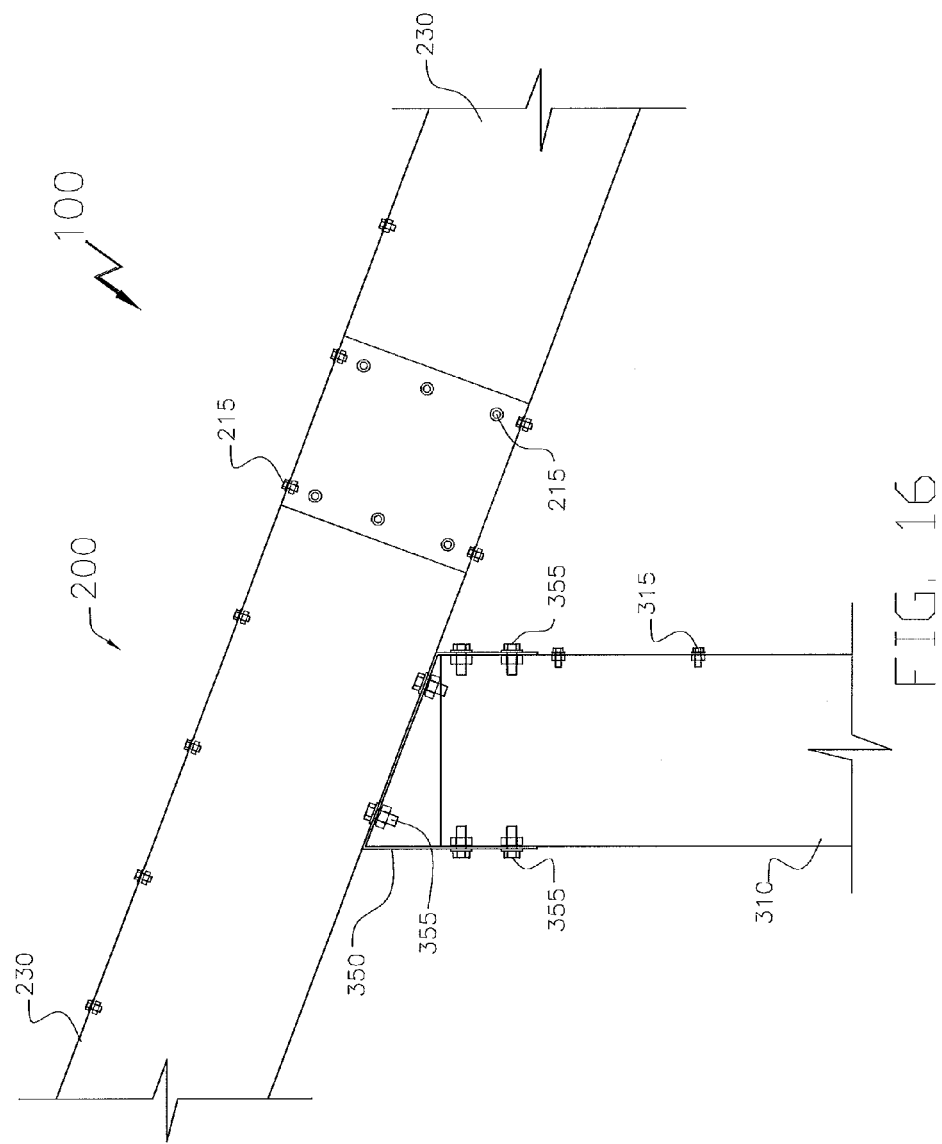
FIG. 16 is a view of a connection between a tornado-resisting roof panel and the top of a longitudinal interior load bearing wall of the structure of FIG. 1

Shown in FIG. 6 is a typical main tornado-resisting system 200 of shelter 100. A main tornado-resisting system 200 of shelter 100 is comprised of tornado-resisting side wall panels 210, eave panels 220, roof panels 230, a peak panel 240 and a bracing panel 250. The peak panel 240 and bracing panel 250 are detailed in FIG. 17. All of the above tornado-resisting panels have the same trapezoidal cross section of tornado impact-protecting panel 902 shown in FIG. 13 but may have varying thicknesses and radii along the long axis of the panels. Each end of a main tornado-resisting system 200 is connected to and supported by a tornado-resisting foundation 290 detailed in FIG. 12. The main tornado-resisting system 200 is strengthened by two internal load bearing walls 300 made of wall panels 310. More internal load bearing walls 300 may be used to strengthen wider main tornado-resisting systems. The internal wall 300 is supported by foundation 390 detailed in FIG. 14. Tornado-resisting foundations 290 and 390 are connected together by reinforced concrete slab 700. Connection details between the main tornado-resisting system 200 and load bearing wall 300 are shown in FIG. 16. All of the main tornado-resisting systems 200, internal load bearing walls 300, foundations 290 and 390, and all the connections must be designed to withstand ICC 500 specified live loads and tornado wind forces.

Figure 7:
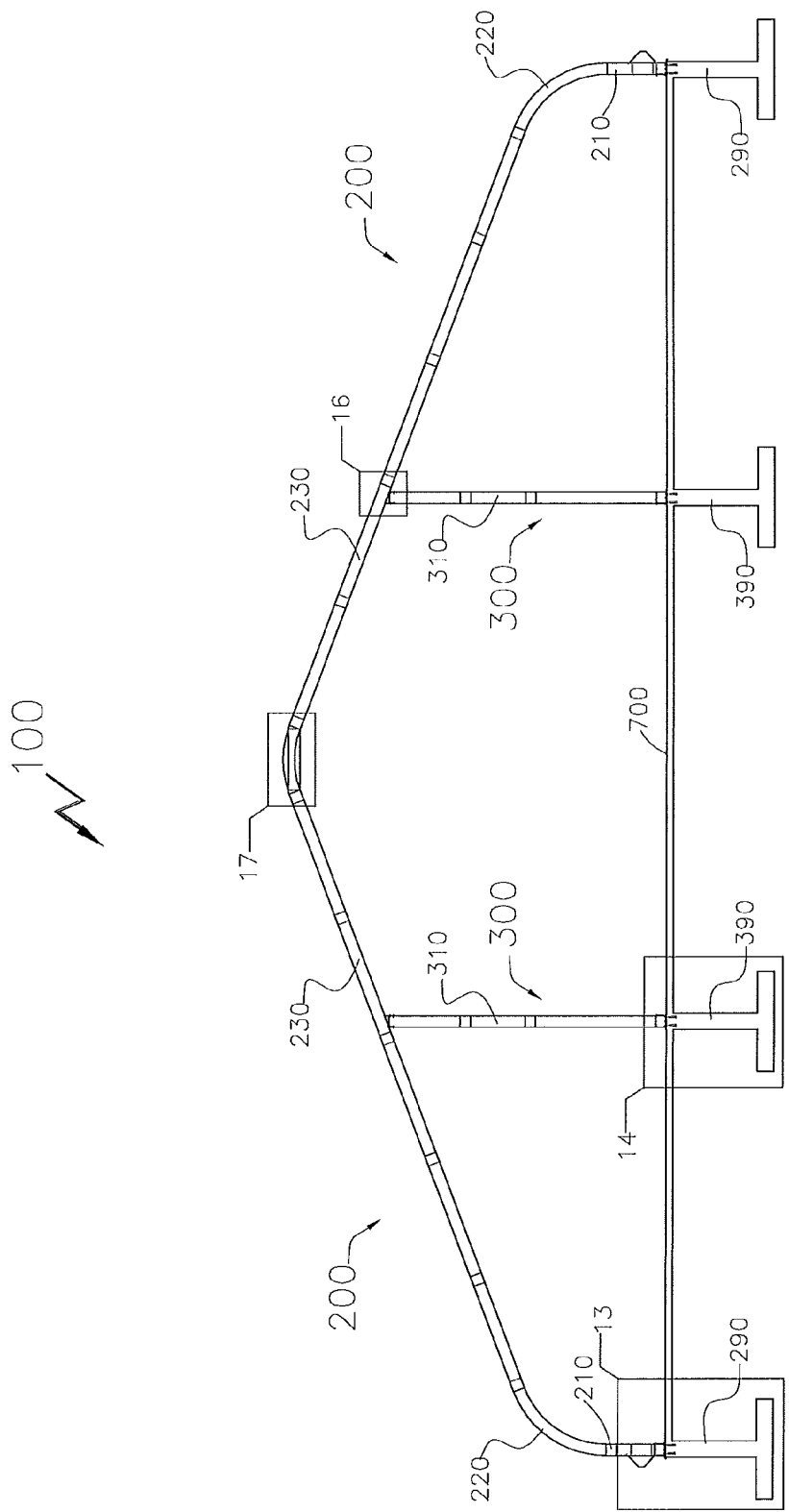
FIG. 7 is an elevation view of a main tornado-resisting system at side vents of the structure of FIG. 1
Figure 13:
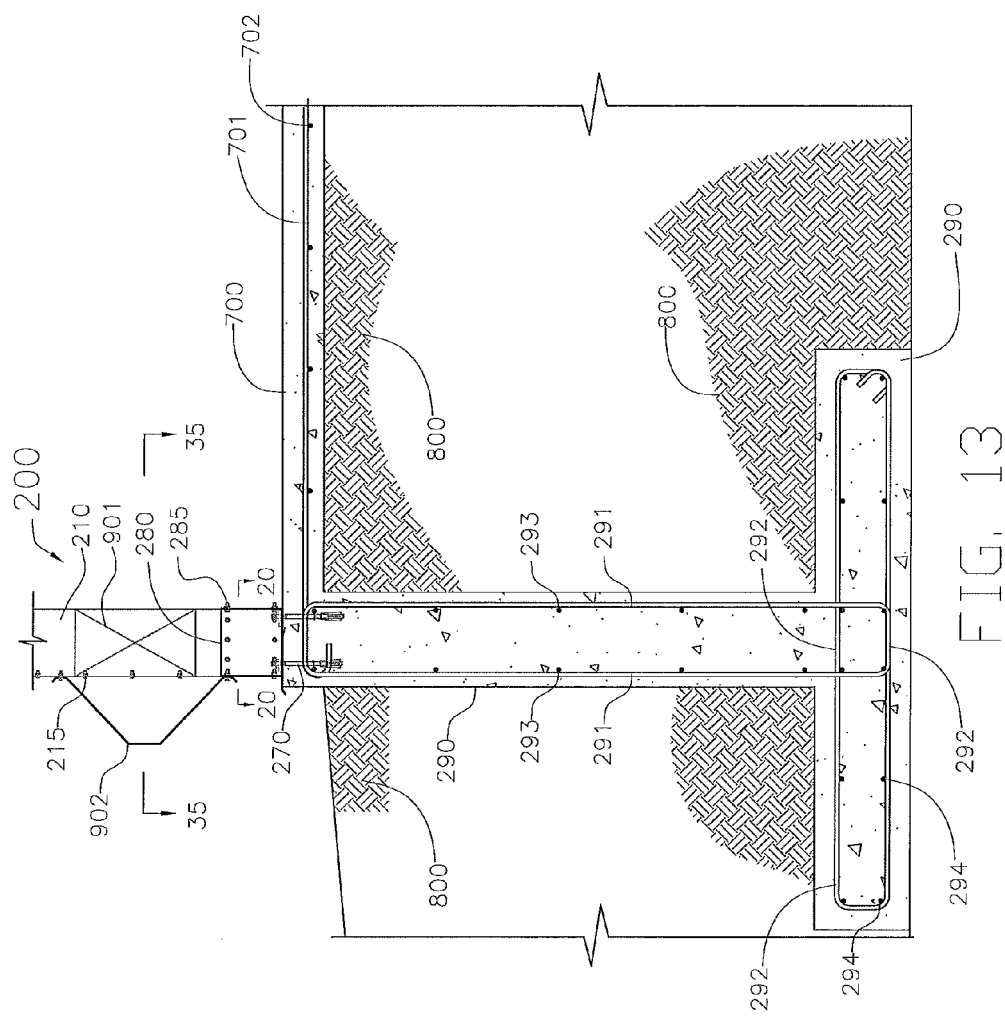
FIG. 13 is a view of the connections between a tornado-resisting panel, a base vent, a tornado-resisting vent cover panel, a tornado-resisting connector, and foundation of the structure of FIG. 1

FIG. 7 is similar to FIG. 6 except with vents 901 and tornado impact-protective panels 902 on both sides as detailed in FIG. 13.

Figure 8:
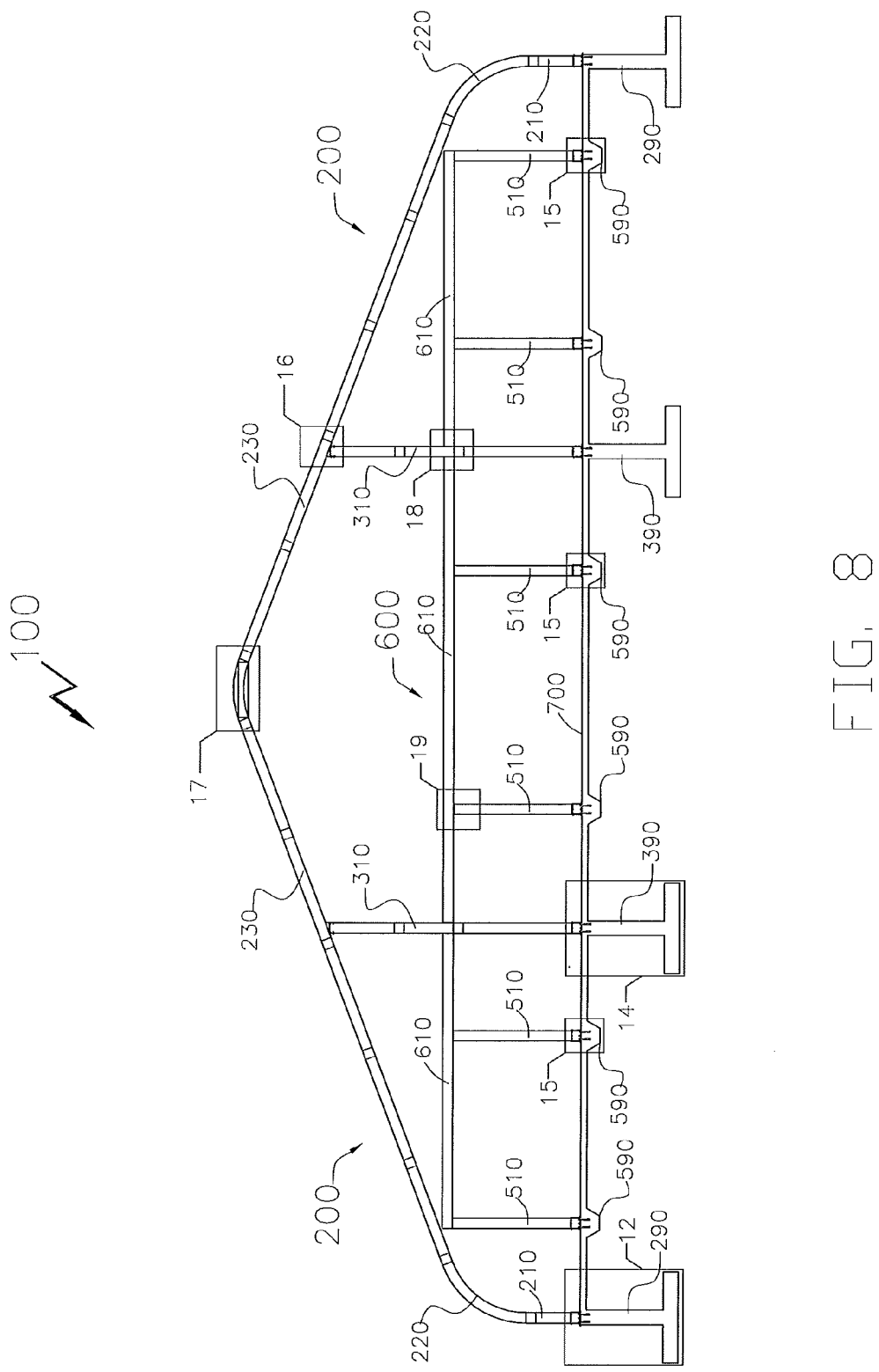
FIG. 8 is an elevation view of a main tornado-resisting system across a floor diaphragm and longitudinal baffled entry walls of the structure of FIG. 1
Figure 15:
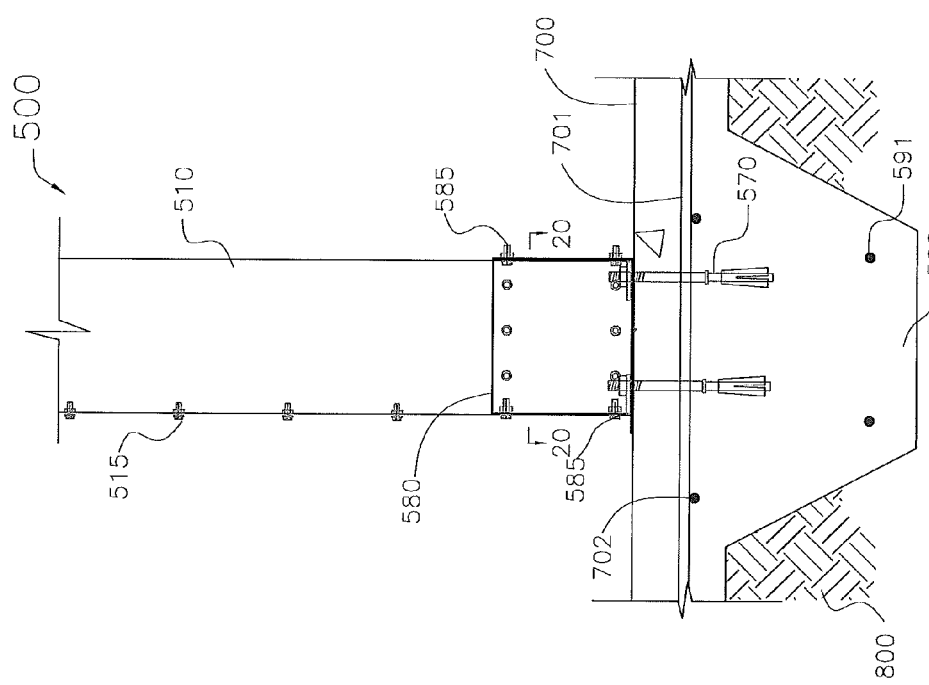
FIG. 15 is a view of a typical connection of a tornado-resisting baffled wall to foundation of the structure of FIG. 1
Figure 18:
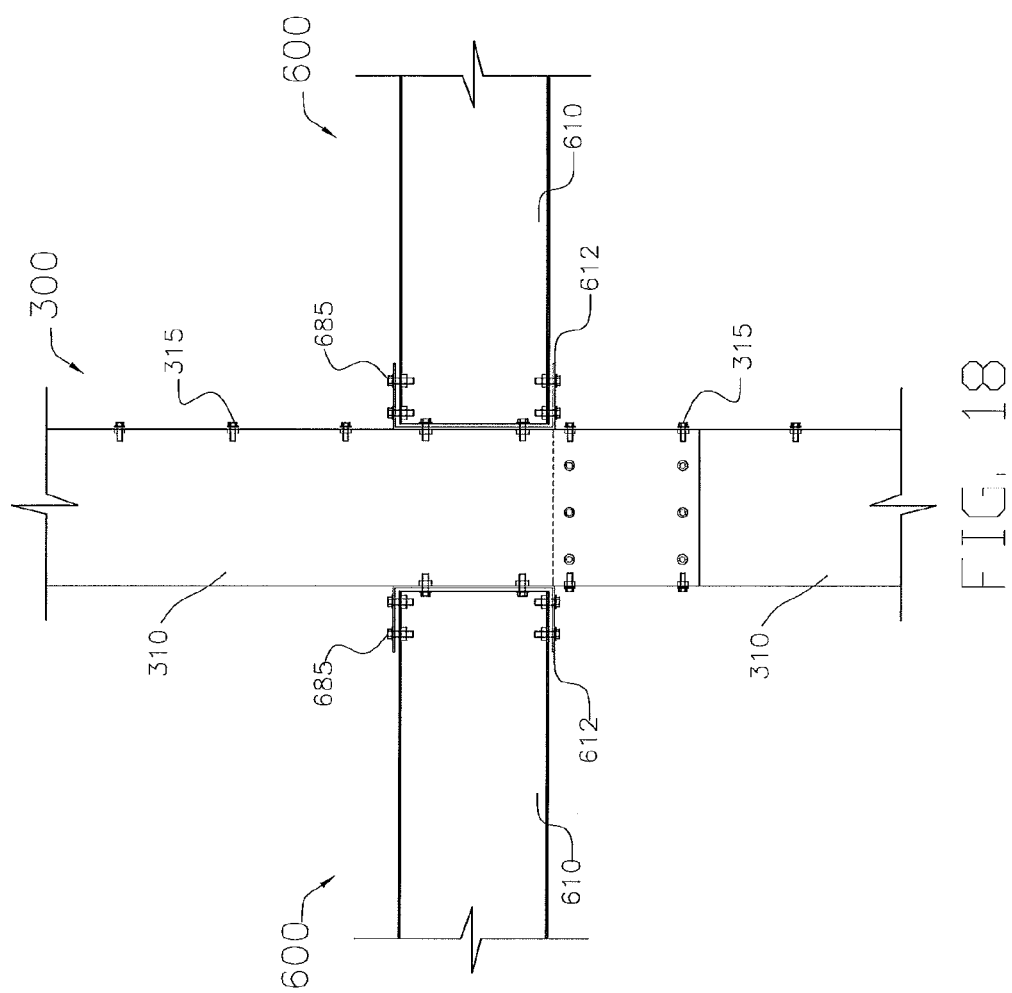
FIG. 18 is a view of the connection between a floor diaphragm and a longitudinal load bearing wall of the structure of FIG. 1
Figure 19:
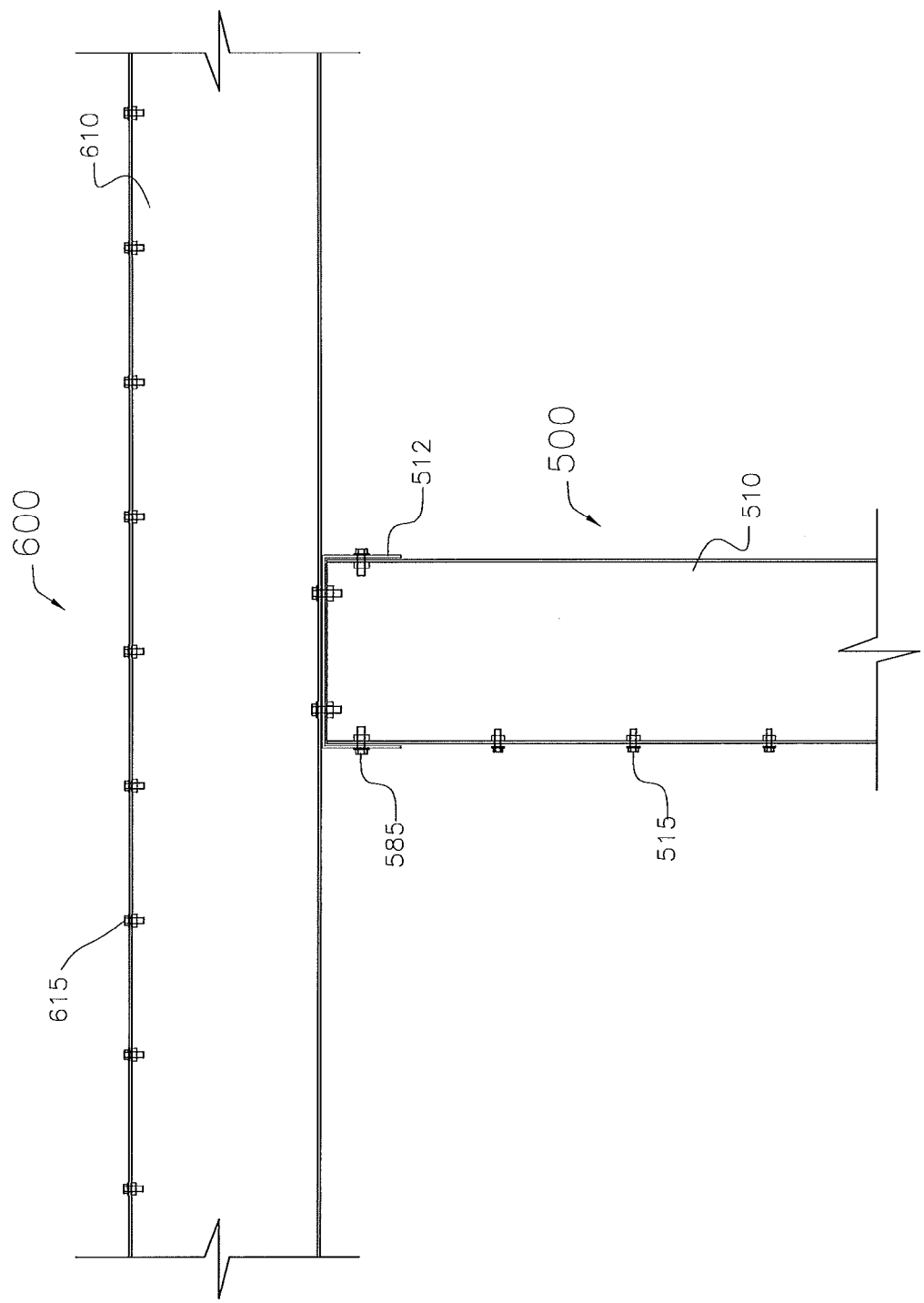
FIG. 19 is a view of the connection between a floor diaphragm and a tornado-resisting baffled entry wall of the structure of FIG. 1

FIG. 8 is similar to FIG. 6 but contains also floor diaphragm panels 610, baffled entry wall panels 510 and their foundations 590 detailed in FIG. 15. Connection details between floor diaphragm panels 610 and longitudinal wall panels 310 are shown in FIG. 18. Connection details between floor diaphragm panels 610 and baffled entry wall panels 510 are shown in FIG. 19.

Figure 9:
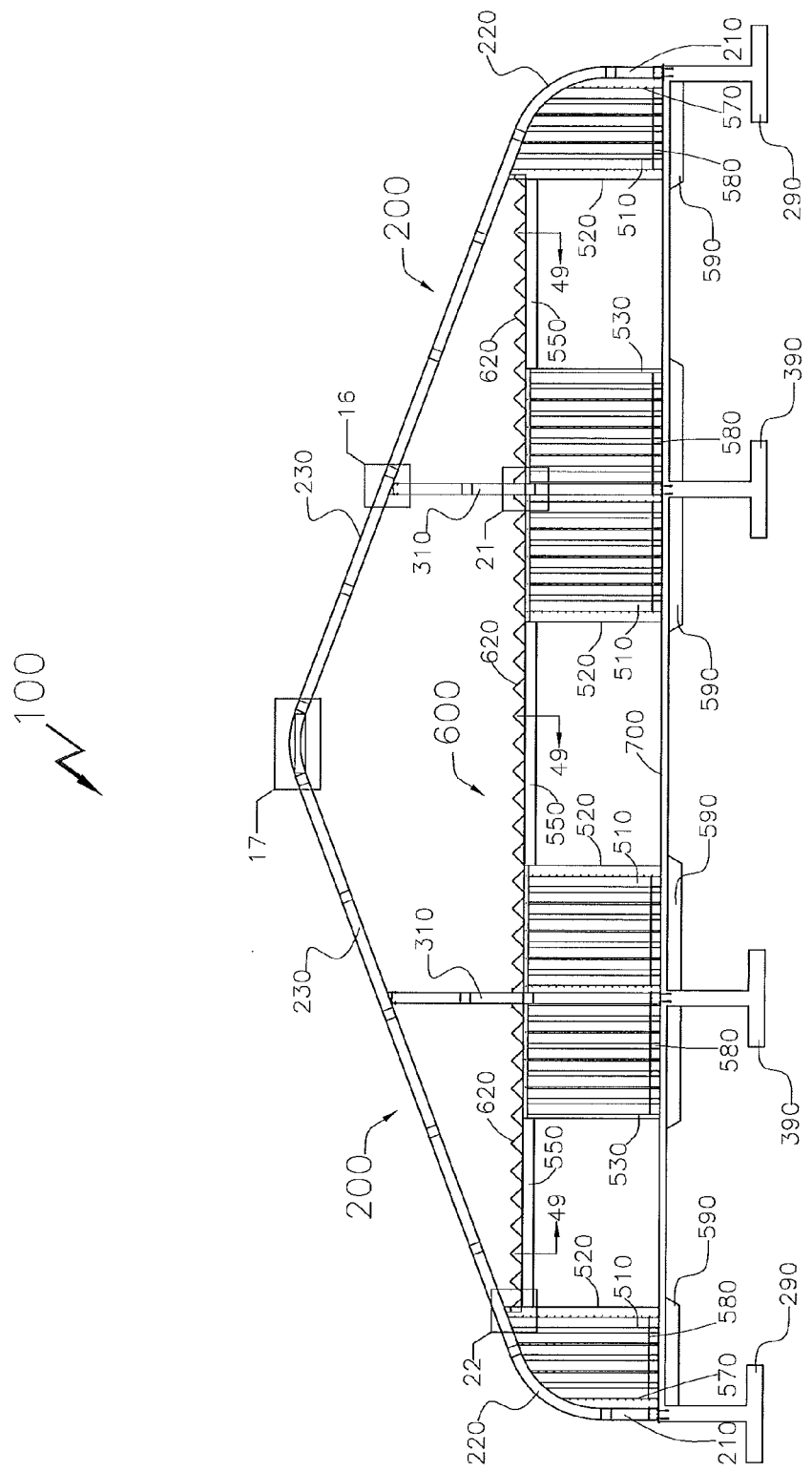
FIG. 9 is an elevation view of a main tornado-resisting system at front of side baffled entry walls of the structure of FIG. 1
Figure 21:
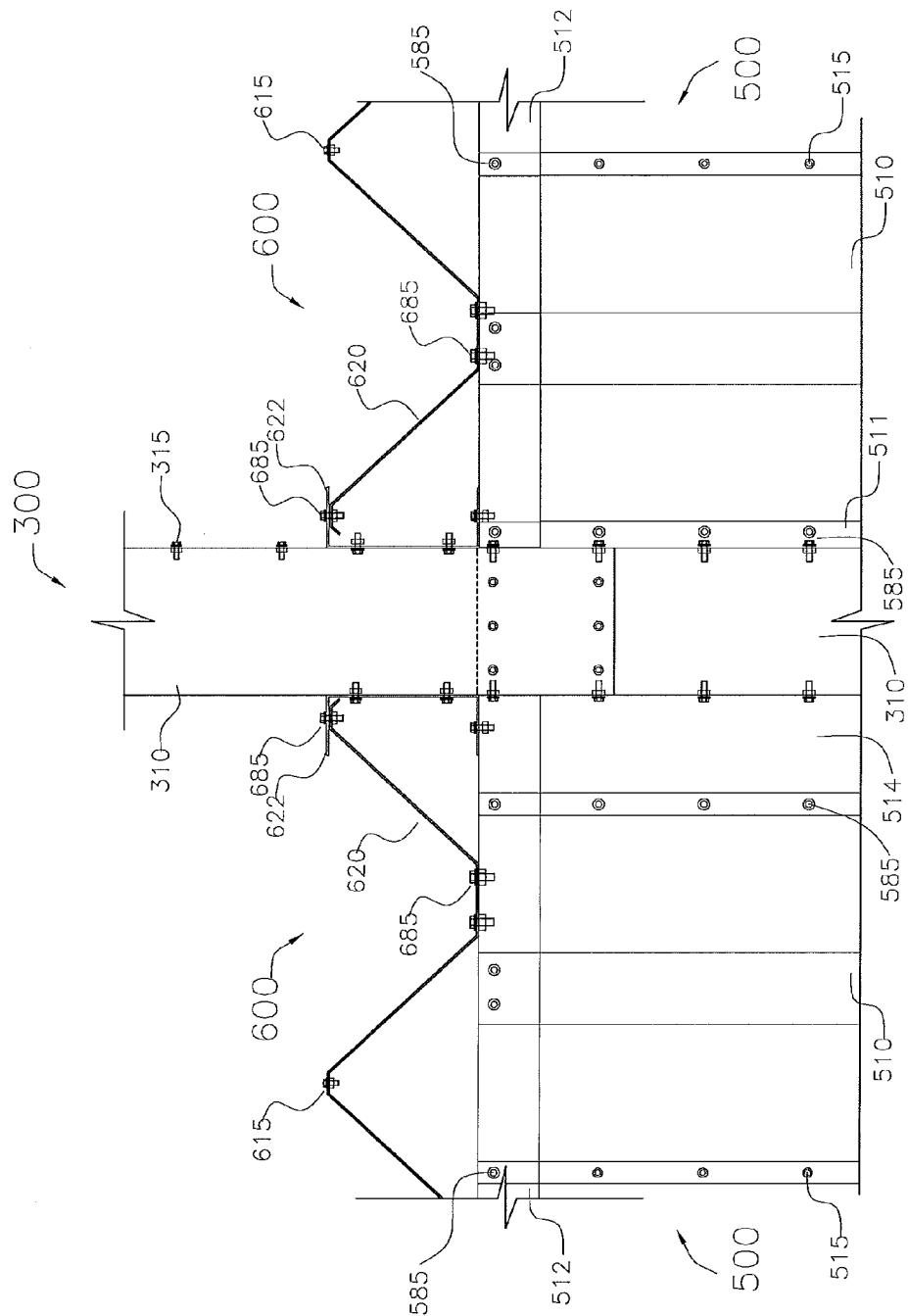
FIG. 21 is a view of the connections between a floor diaphragm, a longitudinal load bearing wall, and tornado-resisting baffled entry walls of the structure of FIG. 1
Figure 22:
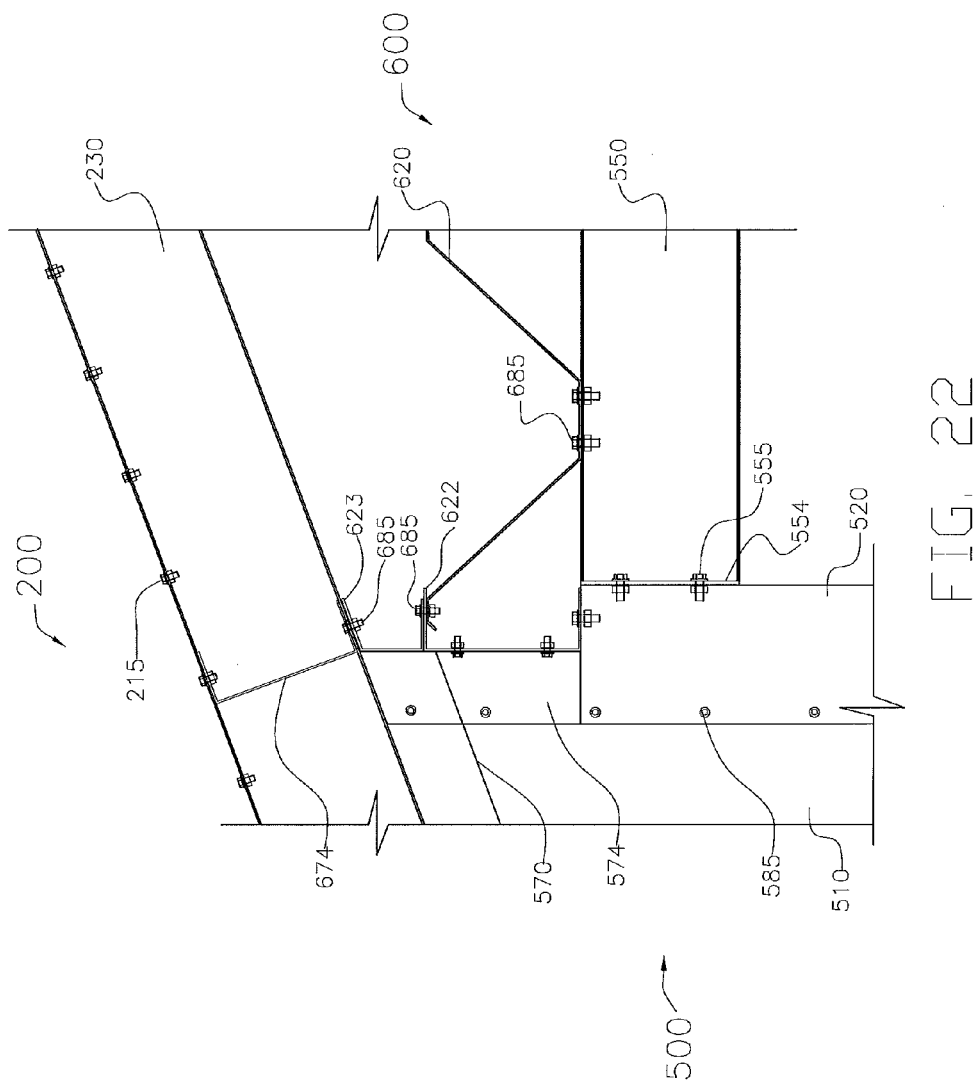
FIG. 22 is a view of the connections between a floor diaphragm, a tornado-resisting roof panel, and a tornado-resisting baffled entry wall of the structure of FIG. 1
Figure 49:
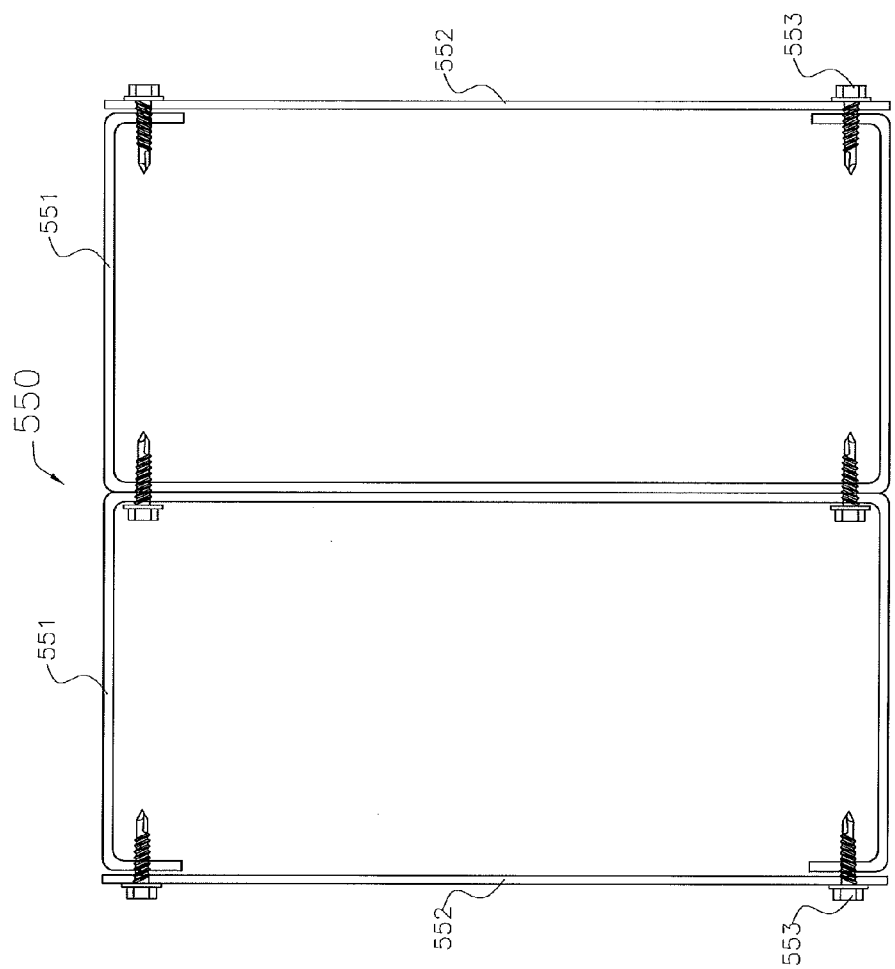
FIG. 49 is a cross section view of a cold-formed steel beam of the tornado shelters

Shown in FIG. 9 is an elevation view of a main tornado-resisting system 200 at front of side baffled entry walls 500 supporting longitudinal floor diaphragm panels 620 of shelter 100. The baffled entry walls are made of tornado-resisting panels 510, tornado-resisting connectors 580, corner posts 520 and 530, beams 550. These entry walls are supported by foundations 590. Connection details between longitudinal internal wall 300, entry walls 500, and floor diaphragms 600 are shown in FIG. 21. Connection details between a main tornado-resisting system 200, entry wall 500, beam 550, and floor diaphragm 600 are shown in FIG. 22. Cross section views of the beams 550 are shown in FIG. 49.

Figure 10:
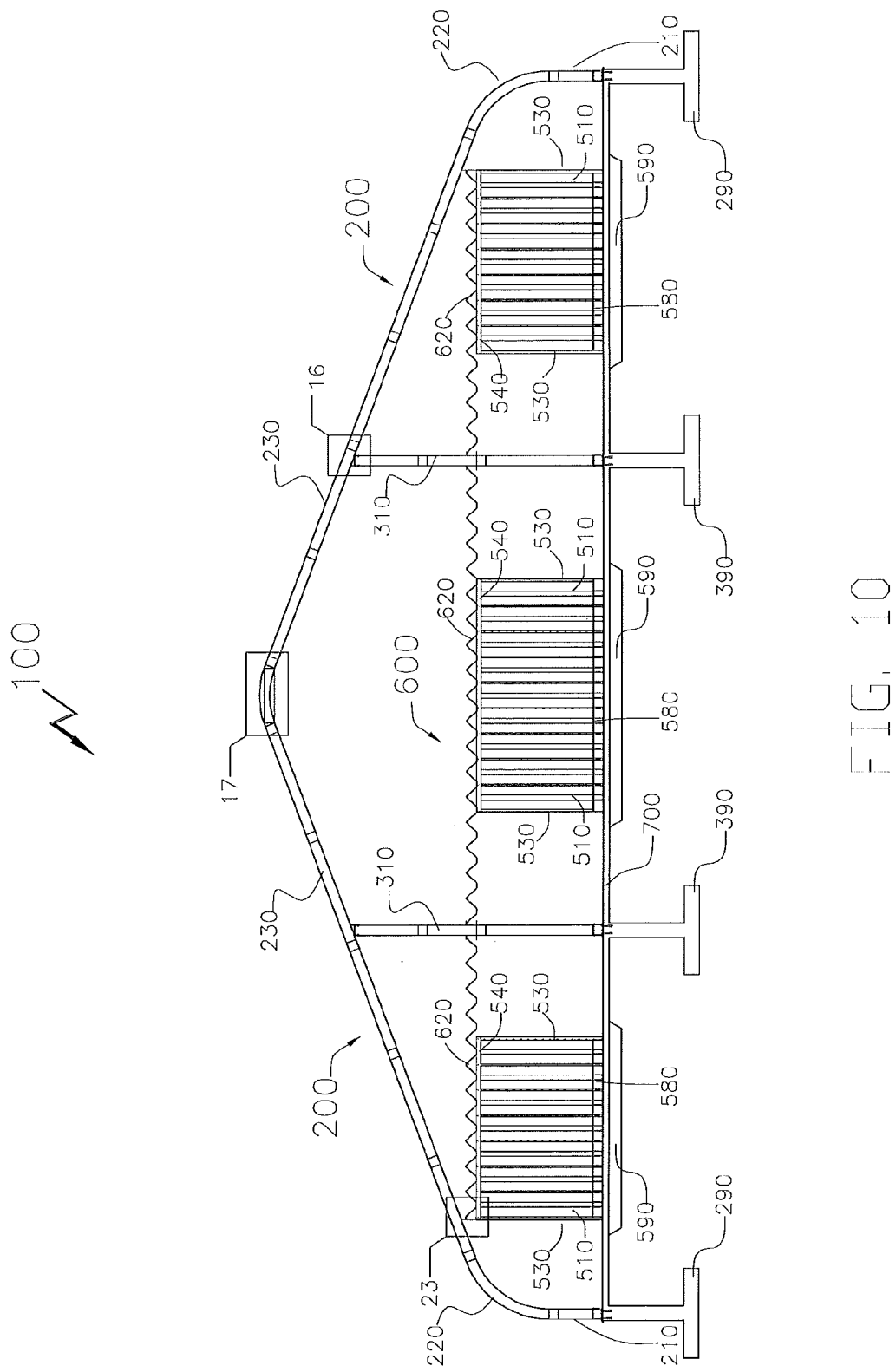
FIG. 10 is an elevation view of a main tornado-resisting system at front of main baffled entry walls of the structure of FIG. 1
Figure 23:
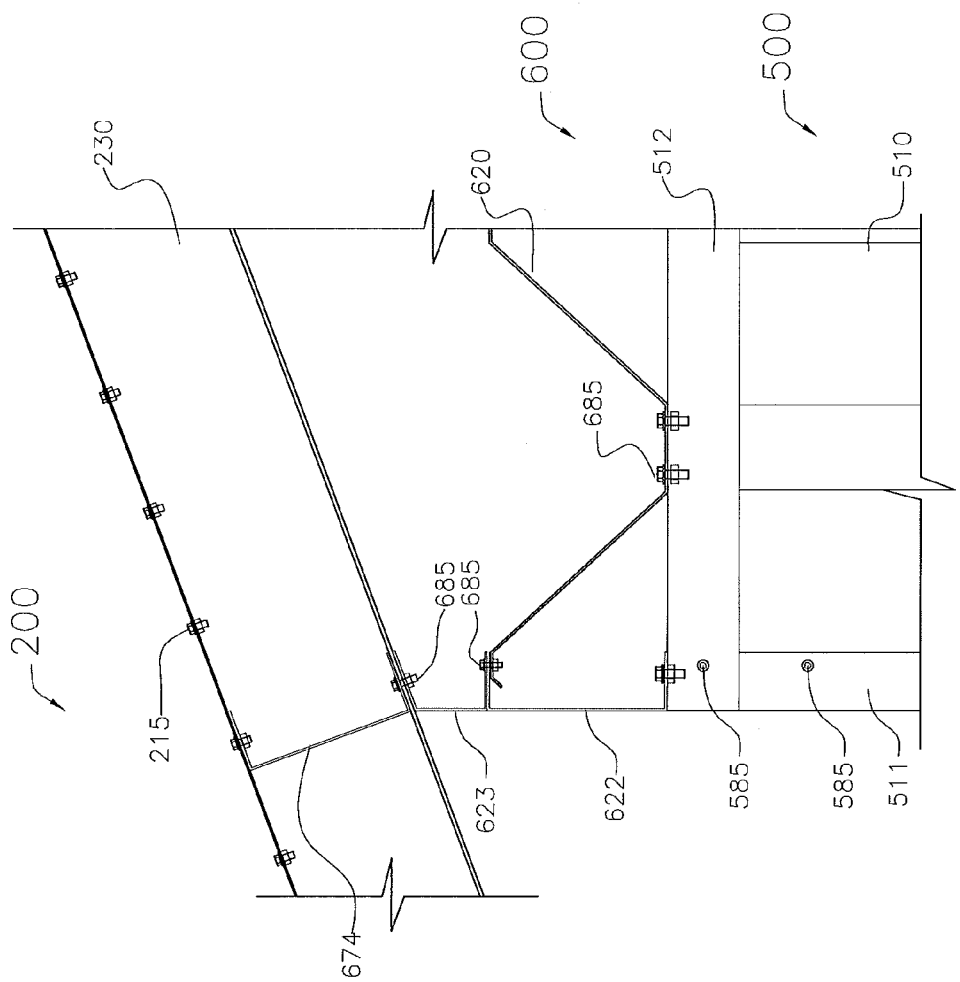
FIG. 23 is a view of the connection between a floor diaphragm and a tornado-resisting roof panel of the structure of FIG. 1

FIG. 10 is an elevation view of a main tornado-resisting system 200 at front of the main baffled entry walls of shelter 100. These main baffled entry walls 500 are comprised of tornado-resisting panels 510, end posts 530, top channels 540 and bottom connectors 580. Connection details of the main tornado-resisting system 200, entry wall 500, and floor diaphragm 600 are shown in FIG. 23.

Figure 11:
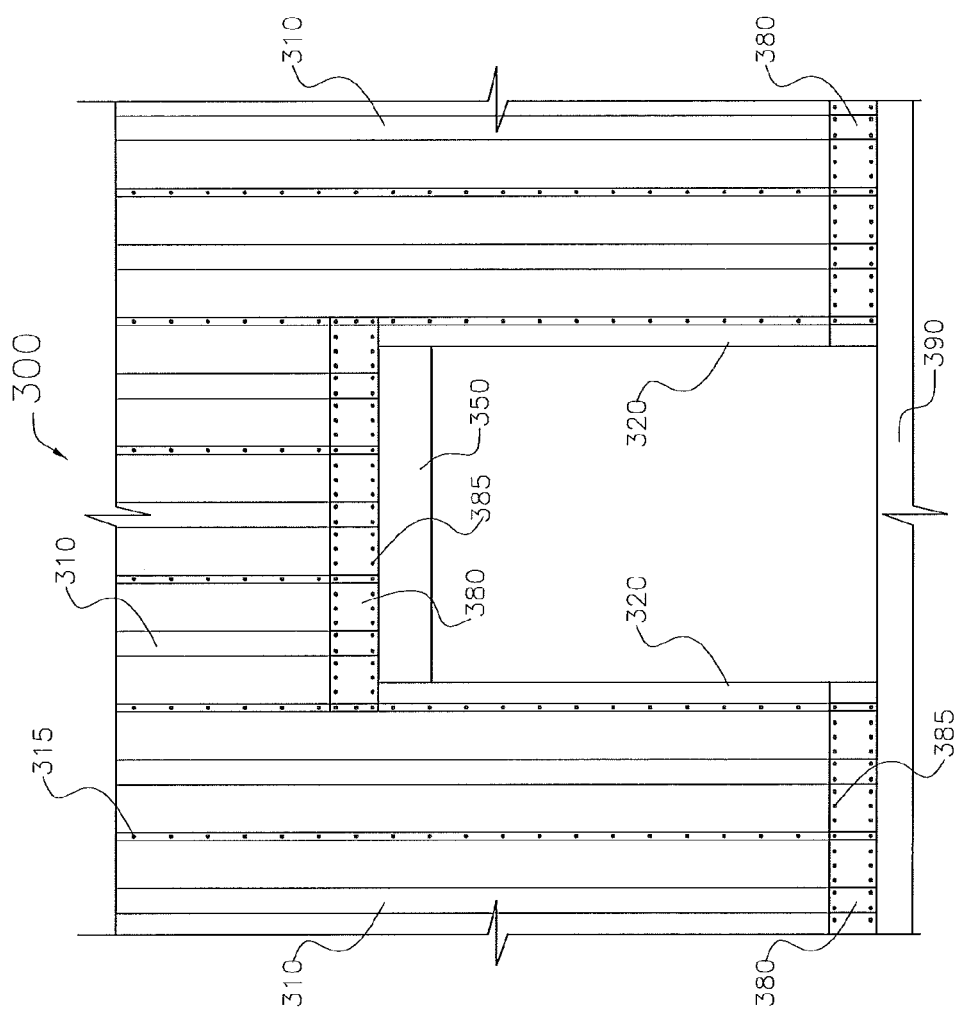
FIG. 11 is an elevation view of a typical opening within a longitudinal interior load bearing wall of the structure of FIG. 1

Shown in FIG. 11 is an elevation view of a typical opening within a longitudinal interior load bearing wall 300 of shelter 100 in FIG. 1. These openings are provided to allow occupants to move between the three bays/compartments of shelter 100 so that occupants can get in and out of shelter 100 even if 5 of the 6 exit gates are blocked by tornado debris. Tornado-resisting connector 380 is used to connect the wall panels 310 to the foundation 390 and beam 350. Beam 350 is supported by posts 320. Beam 350 may have the same cross section shown in FIG. 49.

Figure 12:
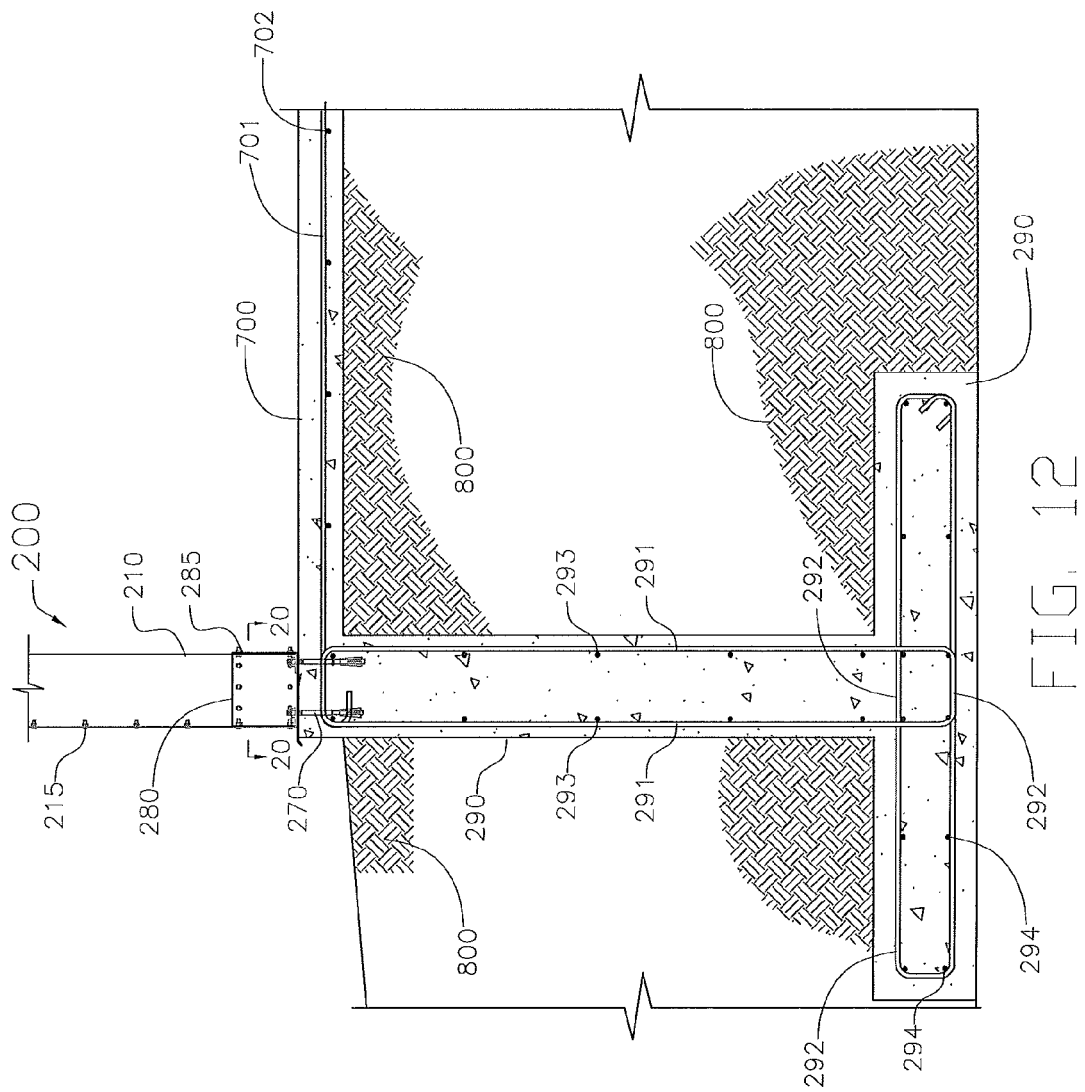
FIG. 12 is a view of a typical connection of a main tornado-resisting system to foundation of the structure of FIG. 1

FIG. 12 is a view of a typical connection of a main tornado-resisting system 200 to its foundation 290 of shelter 100. Bottom end of a tornado-resisting panel 210 is connected to tornado-resisting connector 280 by 20 connection bolts 285 in two rows. Details of connector 280 are shown in FIG. 20. Connector 280 is connected to foundation 290 by 4 anchors 270. Tornado-resisting foundation 290 is reinforced by vertical reinforcements 291, transverse reinforcements 292, and longitudinal reinforcements 293 and 294. Top of foundation 290 is connected to slab 700 that is reinforced with slab reinforcements 701 and 702. Foundation 290 must have enough weight and width, utilizing the weight of soil 800, to resist the large uplift forces from the ICC 500 specified tornado wind forces. Foundation 290 and anchors 270 must be designed based on the structural requirements of ACI 318.

Figure 35:
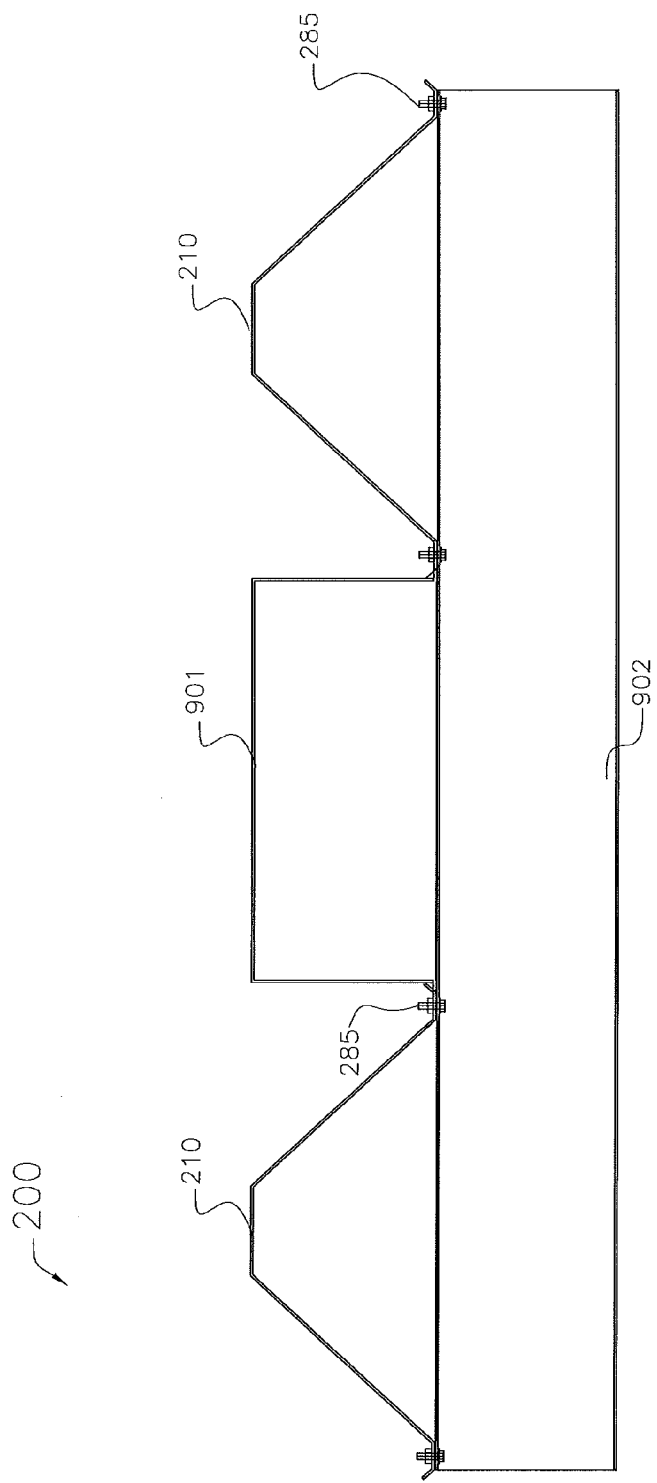
FIG. 35 is a view of the connection between a vent, a tornado-resisting vent cover, and tornado-resisting panels of the structure of FIG. 1

FIG. 13 is similar to FIG. 12 except with a vent 901 and its tornado impact-protective system 902. More connection details of vent 901 and its protective system 902 are shown in FIG. 35. As illustrated in FIGS. 12 and 35, tornado impact-protective system 902 has the same trapezoidal cross section as tornado-resisting panel 210. In fact, the tornado impact-protective system 902 is simply another usage of a tornado-resisting panel.

Figure 14:
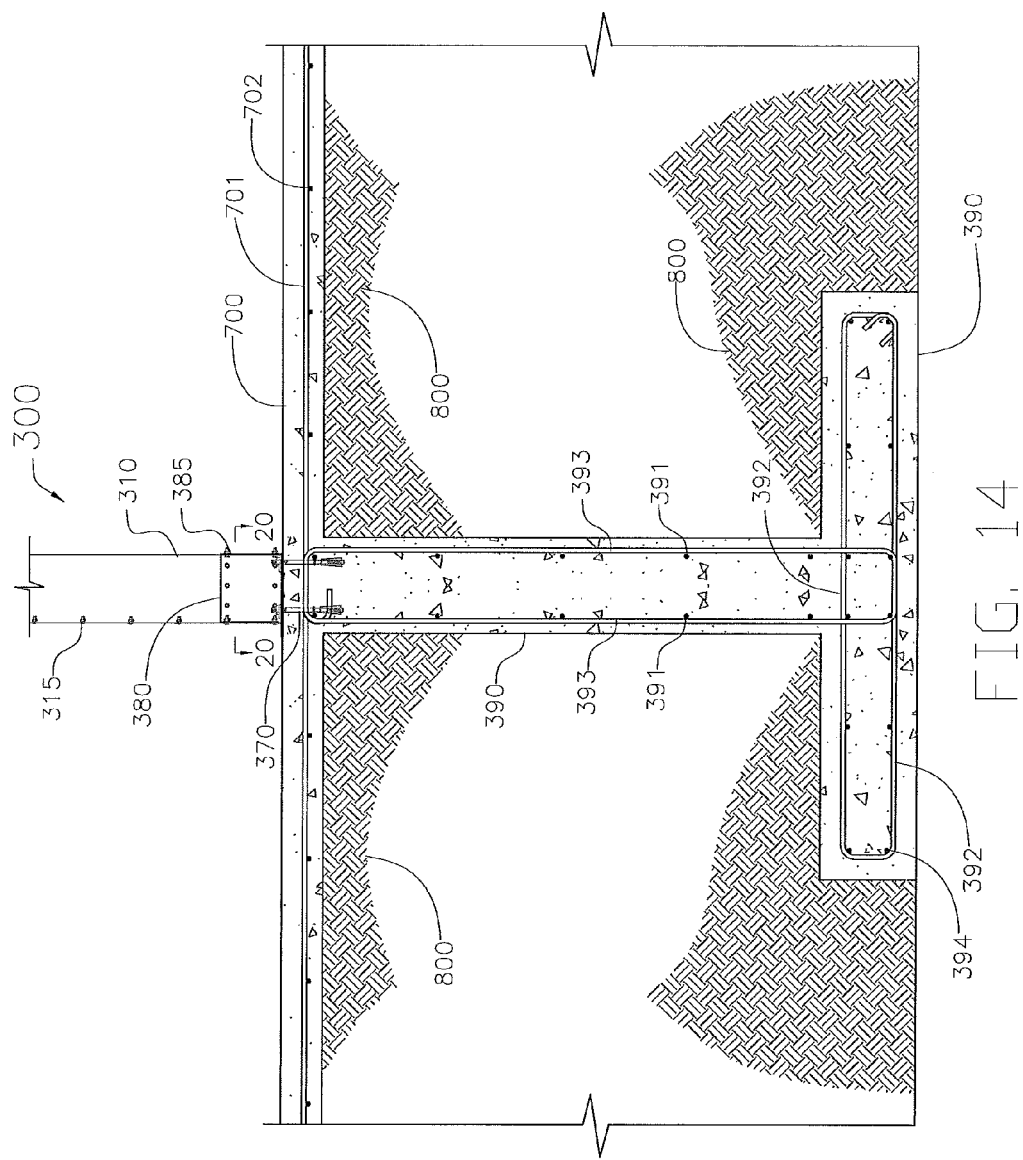
FIG. 14 is a view of a typical connection of a longitudinal interior load bearing wall to foundation of the structure of FIG. 1

FIG. 14 is also similar to FIG. 12 except for longitudinal interior load bearing wall 300.

Shown in FIG. 15 is a view of a typical connection of a tornado-resisting baffled wall 500 to its foundation 590 of shelter 100. Bottom end of a baffled wall panel 510 is connected by tornado-resisting connector 580 by 20 connection bolts 585 in two rows. Connector 580 is secured to foundation 590 by 4 anchors 570. Since a baffled wall 500 is subjected to much smaller tornado wind forces than a main tornado-resisting system wall or a longitudinal interior load bearing wall 300, foundation 590 is much smaller than foundations 290 and 390.

FIG. 16 illustrates a typical connection between a main tornado-resisting system 200 and a longitudinal interior load bearing wall 300 of shelter 100. The bottom flange of a roof panel 230 is connected to the web of a wall top tornado-resisting connector 350 by 4 bolts 355. Each flange of connector 350 is connected to the top wall panel 310 by 4 bolts 355. The connector 350 and bolts 355 must be able to safely transfer the maximum connection forces from panel 230 into connector 350 and then into wall panel 310. Also shown in FIG. 16 is a side view of a typical overlap between two adjacent tornado-resisting panels. Each overlap of roof panels 230 are connected by total 20 bolts 215 distributed in two rows. The locations of the ten bolts in each row are the same as those illustrated in FIG. 20.

Figure 17:
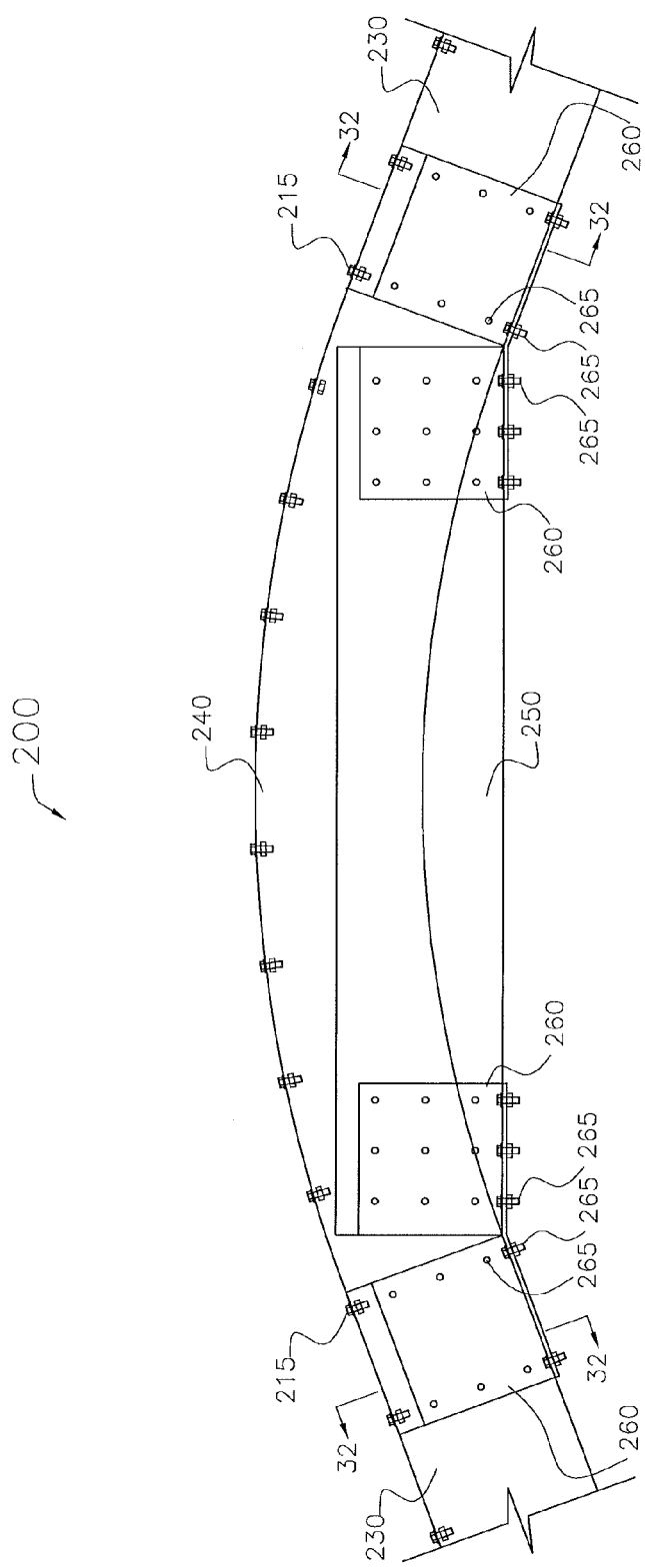
FIG. 17 is an elevation view of a connection between a tornado-resisting peak panel and a bracing panel of the structure of FIG. 1

Connections of bracing panel 250 to peak panel 240 of a main tornado-resisting system 200 are shown in FIG. 17. Each end of bracing panel 250 is connected to an end of bracing connector 260 by 24 bolts 265. The other end of bracing connector 260 is connected to the end overlap of peak panel 240 and roof panel 230 by 16 bolts 265. The two ends of connector 260 are connected together by the continuous bottom flange from one end to the other end of connector 260. The minimum thickness of connector 260 is controlled by the above continuous bottom flange to safely transfer the maximum combined tensile force from the bracing panel. Connection details between connector 260 and peak panel 240 and roof panel 230 are provided in FIG. 32.

FIG. 18 is a view of the connection between floor diaphragms 600 and longitudinal load bearing wall 300 of shelter 100. Each end of floor diaphragm panel 610 is connected to the two flanges of floor diaphragm end channel 612 by 8 bolts 685. The web of channel 612 is connected to wall panel 310 by 4 bolts 685. End channel 612 and bolts 685 must ensure the safe transfer of maximum forces from diaphragm panel 610 into wall panel 310.

Shown in FIG. 19 is a view of the connection between floor diaphragm 600 and baffled entry wall 500 of shelter 100. Each top end of wall panel 510 is connected to the two flanges of wall top channel 512 by 4 bolts 585. The web of channel 512 is connected to the bottom flange of floor diaphragm panel 610 by 4 bolts 585. Top channel 512 and bolts 585 must ensure the safe transfer of maximum forces from diaphragm panel 610 into wall panel 510.

FIG. 20 is a typical cross section plan view of tornado-resisting connector 280. Bottom end of each tornado-resisting panel 210 is connected to tornado-resisting connector 280 by 20 bolts 285. These bolts 285 are distributed in two rows with 10 bolts 285 in each row. Tornado-resisting connector is comprised of clip 280, base plate 281, and vertical back flange 282. Four anchors 270 are used to secure the tornado-resisting connector to the foundation. Tornado-resisting washers 275 and 276 are used to reduce the deformation of base plate 281 and to increase the load capacity of the connector.

Shown in FIG. 21 is a view of the connection between floor diaphragms 600, longitudinal internal load bearing wall 300, and baffled entry walls 500 of shelter 100. The top flange of floor diaphragm panel 620 on each side of diaphragm 600 is connected to the top flange of diaphragm side channel 622 by bolts 685 at 6$^{15}/_{16}$ inch spacing. The web of channel 622 is connected to each wall panel 310 by 4 bolts 685. The bottom flange of channel 622 is connected to the web of cap channel 512 of wall 500 by two bolts 685. The web of each diaphragm panel 620 is connected to cap channel 512 by 4 bolts 685. The top end of each wall panel 510 is connected to cap channel 512 by 4 bolts 585. The flange of panel 510 on each side of wall 300 is connected to one leg of vertical connection angle 511 or 514 by bolts 585 at 6$^{15}/_{16}$ inch spacing. Another leg of angle 511 or 514 is connected to wall panel 510 by bolts 585 at 6$^{15}/_{16}$ inch spacing.

FIG. 22 illustrates connections between floor diaphragm 600, beam 550, post 520, wall 500, and main tornado-resisting system 200 of shelter 100. The web of each floor diaphragm panel 620 is connected to the top flange of beam 550 by 4 bolts 685. The beam 550 end plate 554 is connected to post 520 by 4 bolts 555. Post 520 is connected to baffled wall panel 510 by bolts 585 at 6$^{15}/_{16}$ inch spacing. The cap plate of post 520 is connected to the bottom flange of channel 622 by two bolts 685. The web of channel 622 is connected to wall panel 510 through a vertical connection angle 574. Top flange of bent plate connector 623 is connected to the bottom flange of each roof panel 230 by two bolts 685. Gusset plate 674 is used to enclose the gap between the trapezoidal roof panel 230 and the top flange of bent plate connector 623. The vertical leg of curved angle 570 is bolted to the flange of wall panel 510. The horizontal leg of angle 570 is bolted to the bottom flange of roof panel 230.

FIG. 23 is similar to FIG. 22 except that beam 550 is replaced by baffled entry wall 500 and there is no post 520 and baffled entry wall on the left side of diaphragm side channel 622.

Figure 24:
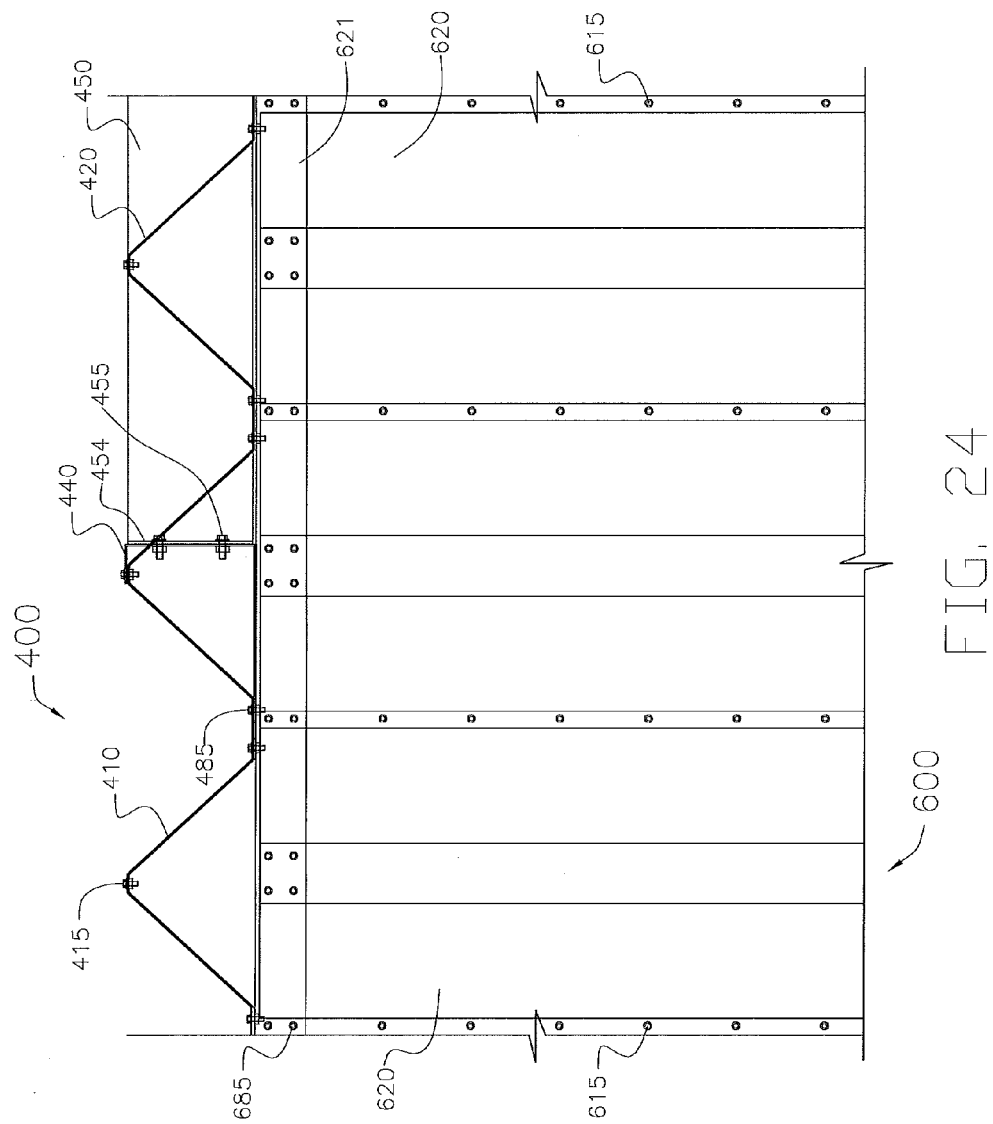
FIG. 24 is a view of the connection between a floor diaphragm and a tornado-resisting end wall of the structure of FIG. 1

Shown in FIG. 24 is a plan view of connections between floor diaphragm 600 and tornado-resisting end wall 400 of shelter 100. Each top flange of floor panel 620 is connected to the top flange of floor end channel 621 by two bolts 685. Each bottom flange of floor panel 620 is connected to the bottom flange of floor end channel 621 by 4 bolts 685. The web of floor end channel 621 is connected to the wider flange of each end wall panel 410 or 420 by 4 bolts 485. As shown in FIG. 3, end wall panels 410 are supported by foundation 490 whereas end wall panels 420 are supported by beam 450. Floor panels 620 are overlapped side by side at the narrow flanges and connected to each other by bolts 615 at 6$^{15}/_{16}$ inch spacing. Similarly, end wall panels 410 are also overlapped side by side at the narrow flanges and connected to each other by bolts 415 at 6$^{15}/_{16}$ inch spacing. Beam end plate 454 of beam 450 is connected to post 440 by 4 bolts 455. Narrow flange of post 440 is connected to the narrow flange of wall panel 410 by bolts 485 at 6$^{5}/_{16}$ inch spacing. Wide flange of post 440 is connected to the wide flange of wall panel 410 also by bolts 485 at 6$^{15}/_{16}$ inch spacing.

Figure 25:
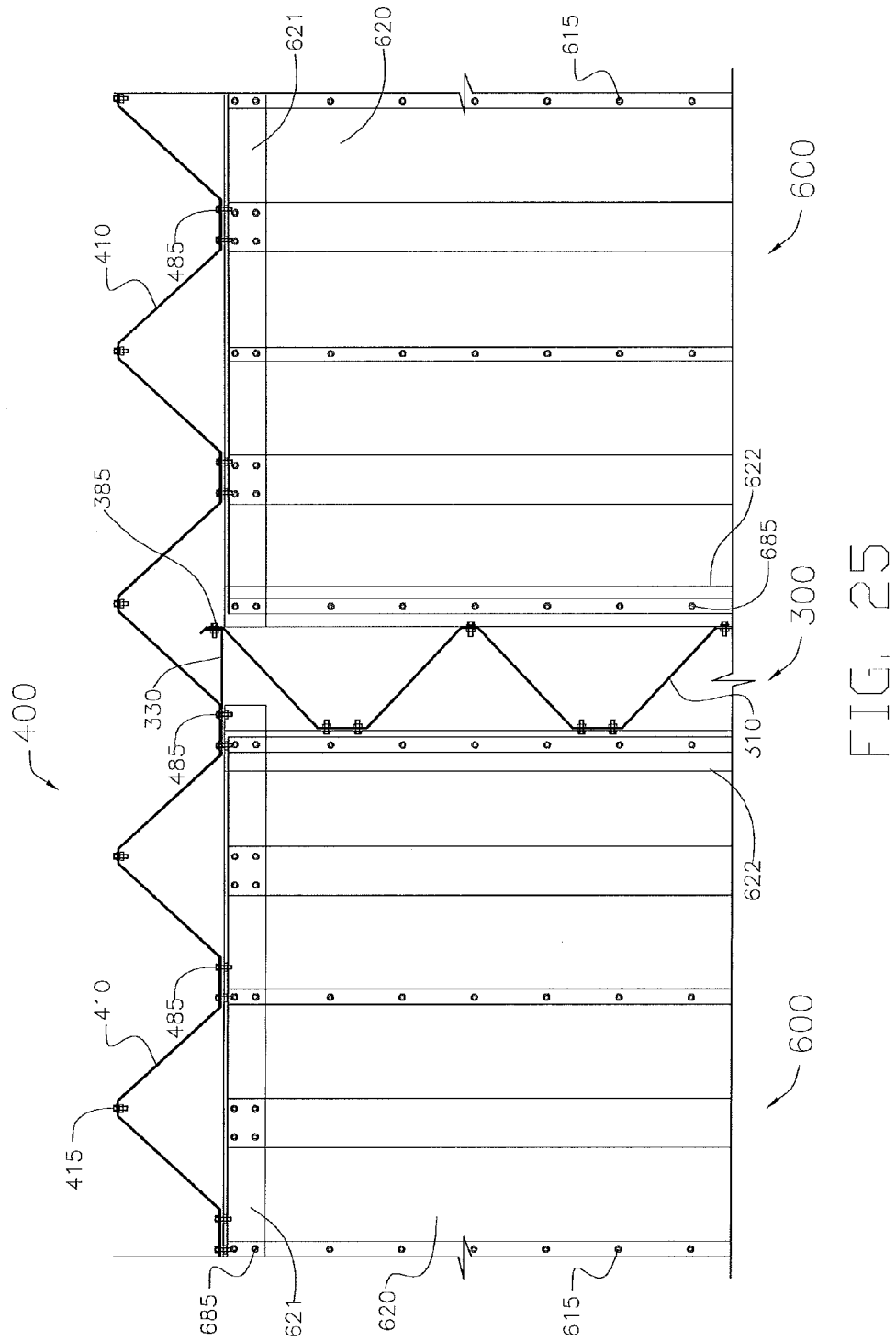
FIG. 25 is a view of the connections between floor diaphragms, a tornado-resisting end wall, and a longitudinal load bearing wall of the structure of FIG. 1

FIG. 25 is a plan view of connections between floor diaphragms 600, longitudinal interior load bearing wall 300, and tornado-resisting end wall 400 of shelter 100. The narrow flange of floor panel 620 on each side of wall 300 is connected to the top flange of floor side channel 622 by bolts 685 at 6$^{15}/_{16}$ inch spacing. The web of side channel 622 is connected to the narrow or wide flanges of each wall panel 310 by 4 bolts 385. Wall panels 310 are overlapped side by side at the narrow flanges and connected to each other by bolts 315 at 6$^{15}/_{16}$ inch spacing. The gap between the end wall 400 and wall 300 is enclosed by vertical angle 330. The two legs of angle 330 are connected to walls 300 and 400 by bolts 385 at 6$^{15}/_{16}$ spacing. The connections between diaphragm 600 and end wall 400 are the same as described above for FIG. 24.

Figure 26:
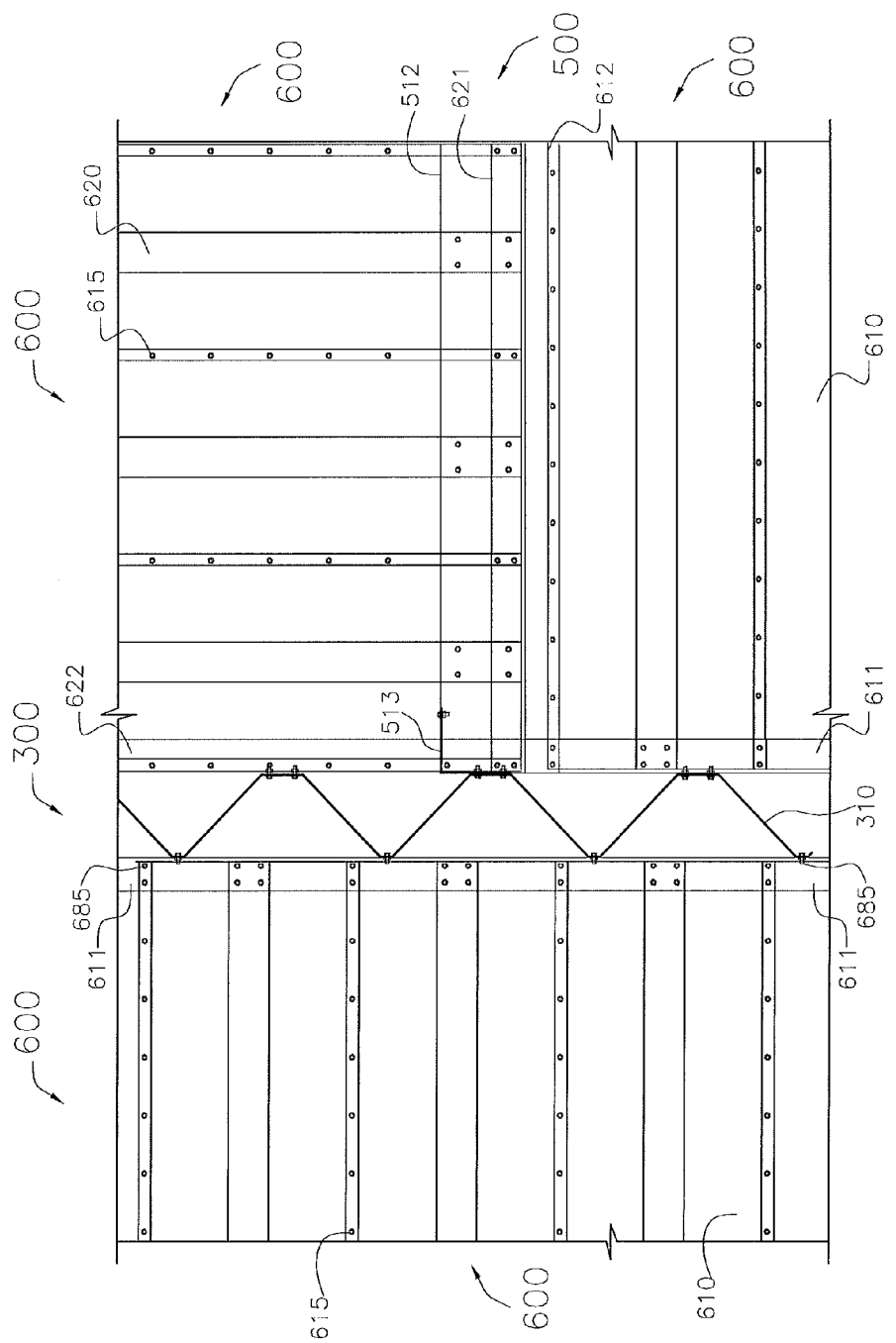
FIG. 26 is a view of the connections between floor diaphragms, a tornado-resisting baffled entry wall, and a longitudinal load bearing wall of the structure of FIG. 1

Shown in FIG. 26 is a plan view of connections between floor diaphragms 600, longitudinal interior load bearing wall 300, and baffled entry wall 500 of shelter 100. The connections between floor panel 620 and wall panel 310 are the same as those described above for FIG. 25. Each top flange of floor panel 610 is connected to the top flange of floor end channel 611 by two bolts 685. Each bottom flange of floor panel 610 is connected to the bottom flange of floor end channel 611 by 4 bolts 685. The web of floor end channel 611 is connected to the narrow or wide flange of each wall panel 310 by 4 bolts 685. Each top flange of floor panel 620 is connected to the top flange of floor end channel 621 by two bolts 685. Each bottom flange of floor panel 620 is connected to the bottom flange of floor end channel 621 and top cap channel 512 of baffled entry wall below the floor panels by 4 bolts 685. The web of floor end channel 621 is connected to the web of floor side channel 612 by two rows of bolts 685 at 24.5 inch spacing along the panel length direction. Top flange of floor channel 612 is connected to the top flange of floor panel 610 by bolts 685 at 6$^{15}/_{16}$ inch spacing. Gap between wall 500 and wall 300 is enclosed by vertical angle 513.

Figure 27:
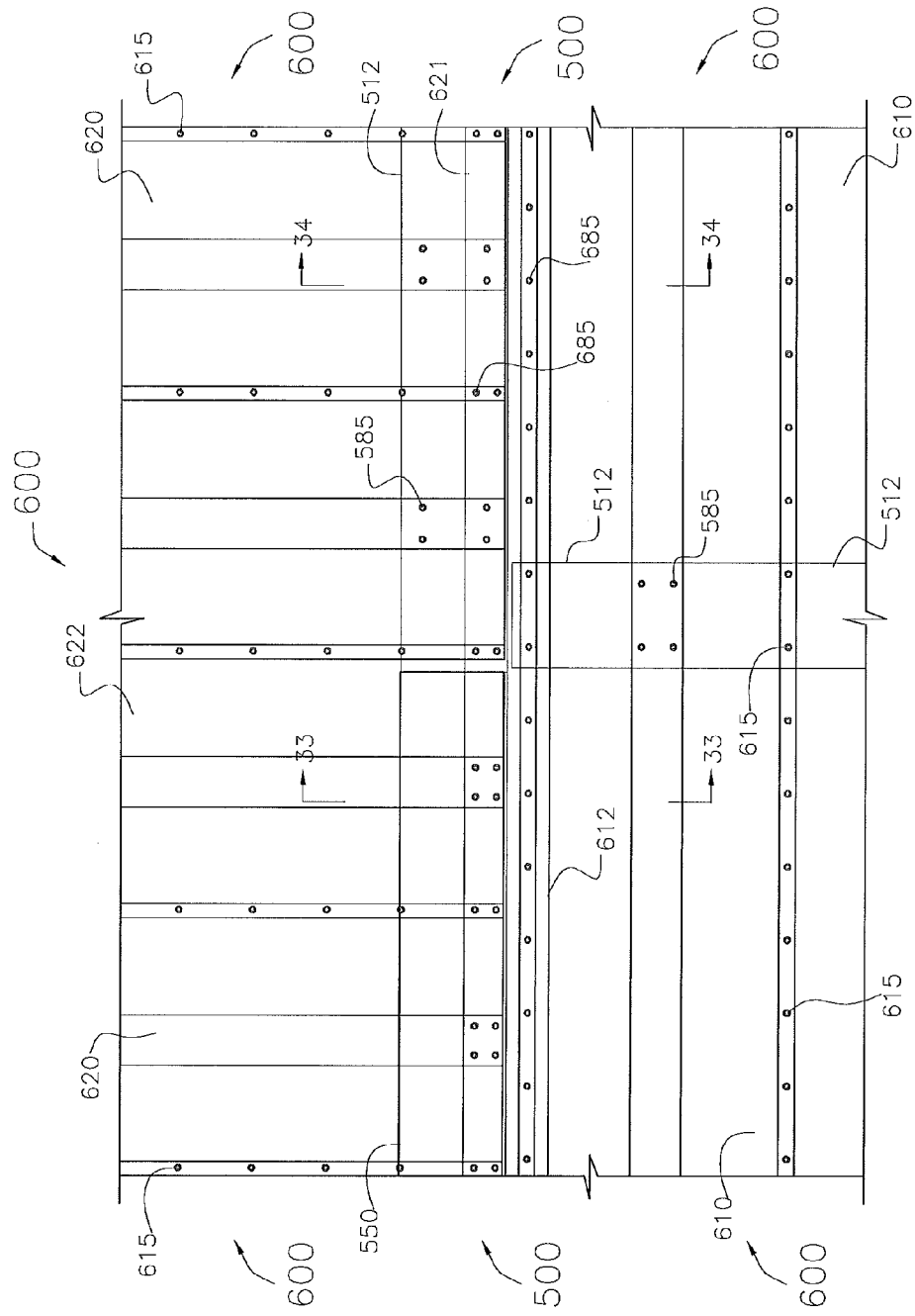
FIG. 27 is a view of the connections between floor diaphragms, tornado-resisting baffled entry walls, and a beam of the structure of FIG. 1

FIG. 27 is a plan view of the connections between floor diaphragms 600, baffled entry walls 500, and beam 550 of shelter 100. The bottom flange of each floor panel 610 is connected to the cap channel 512 of wall 500 by 4 bolts 585. The top flange of panel 610 is connected to the top flange of floor side channel 612 by bolts 685 at 6¹⁵⁄₁₆ inch spacing. The web of floor end channel 621 is connected to the web of floor side channel 612 by two rows of bolts 685 at 24.5 inch spacing along the channel length direction. Each top flange of floor panel 620 is connected to the top flange of floor end channel 621 by two bolts 685. Each bottom flange of floor panel 620 is connected to the bottom flange of floor end channel 621 and top cap channel 512 of baffled entry wall or beam 550 below the floor panels by 4 bolts 685. Marked in FIG. 27 are also locations of sectional view FIGS. 33 and 34.

Figure 28:
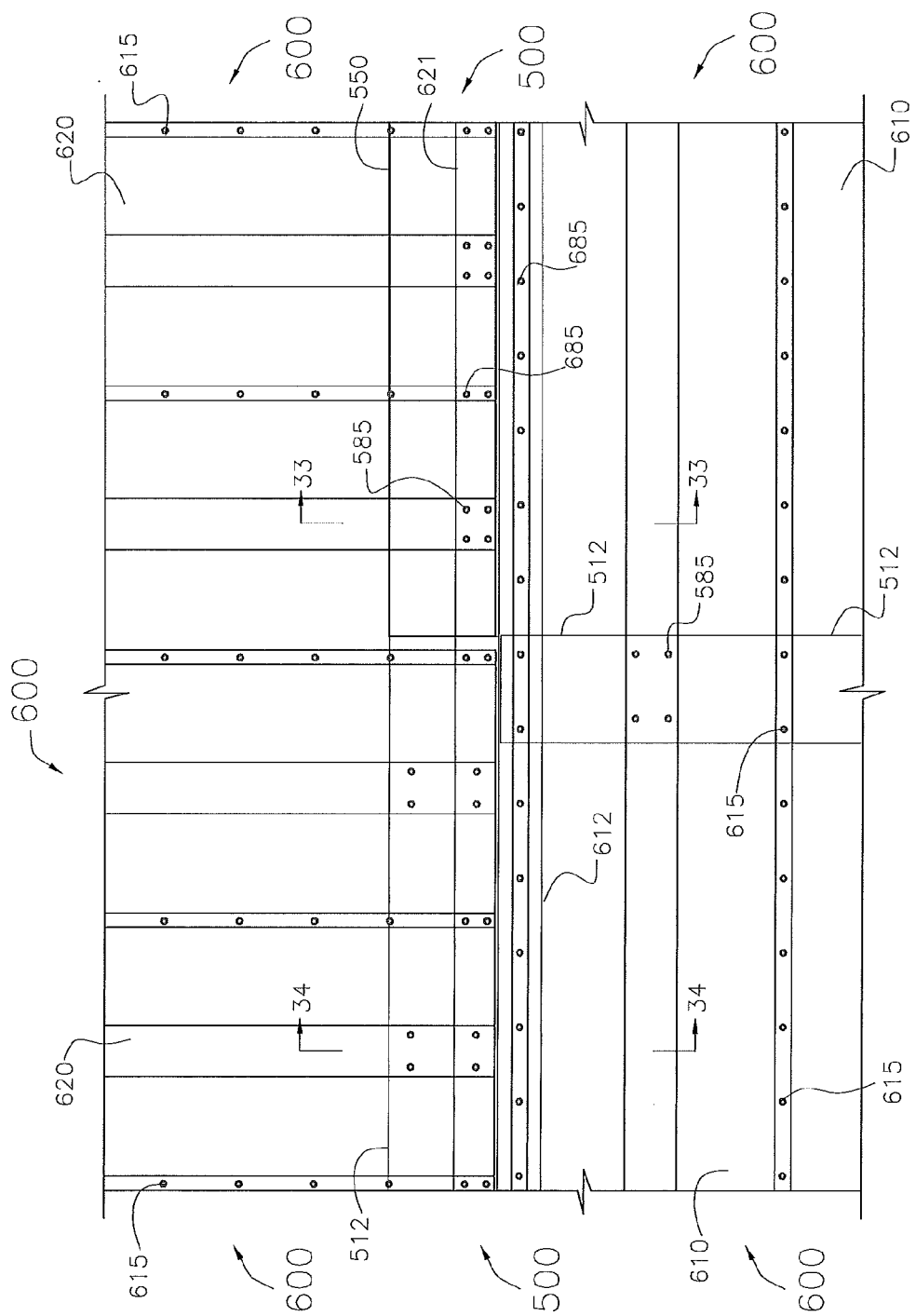
FIG. 28 is another view of the connections between floor diaphragms, tornado-resisting baffled entry walls, and a beam of the structure of FIG. 1

FIG. 28 is similar to FIG. 27 except that beam 550 is on the opposite side. The locations of FIGS. 27 and 28 are marked in FIG. 5.

Figure 29:
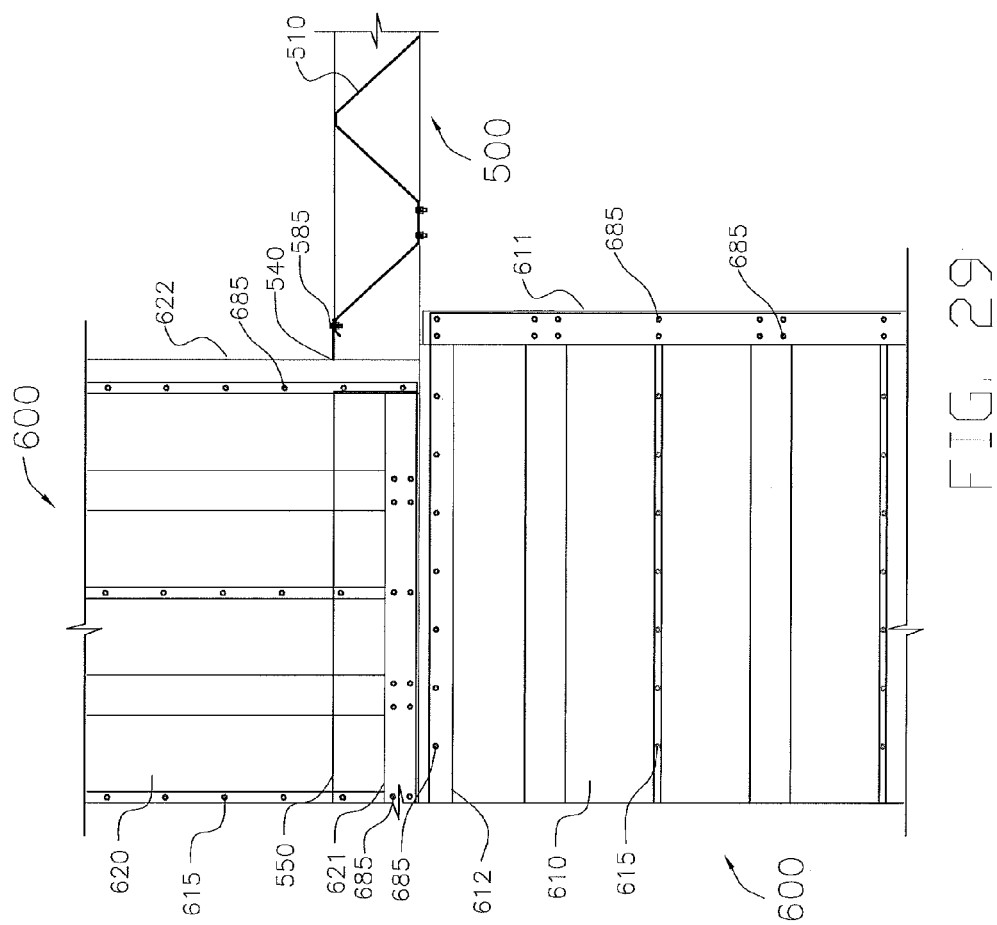
FIG. 29 is an additional view of the connections between floor diaphragms, tornado-resisting baffled entry walls, and a beam of the structure of FIG. 1

Shown in FIG. 29 is another plan view of connections between floor diaphragms 600, baffled wall 500, and beam 550 of shelter 100. Each top flange of floor panel 610 is connected to the top flange of floor end channel 611 by two bolts 685. Each bottom flange of floor panel 610 is connected to the bottom flange of floor end channel 611 by 4 bolts 685. The top flange of panel 610 is connected to the top flange of floor side channel 612 by bolts 685 at 6¹⁵⁄₁₆ inch spacing. Each top flange of floor panel 620 is connected to the top flange of floor end channel 621 by two bolts 685. Each bottom flange of floor panel 620 is connected to the bottom flange of floor end channel 621 and top flange of beam 550 below the floor panels by 4 bolts 685. The top flange of panel 620 is connected to the top flange of floor side channel 622 by bolts 685 at 6¹⁵⁄₁₆ inch spacing. Beam 550 is connected and supported by post 540. Post 540 is connected to wall panel 510 by bolts 585 at 6¹⁵⁄₁₆ inch spacing.

FIG. 30 is a cross section view of a typical connection between main tornado-resisting system 200 and top of end wall 400. The top end of the exterior flange of each tornado-resisting end wall panel 420 is bolted to the vertical leg of outer angle 430. The horizontal leg of angle 430 is connected to the top flange of roof panel 230 and the horizontal leg of inner angle 431 by bolts 215 at 6¹⁵⁄₁₆ inch spacing. The top end of the interior flange of each wall panel 420 is bolted to the vertical leg of inner angle 431. Location of section view FIG. 31 is also shown in FIG. 30.

Figure 31:
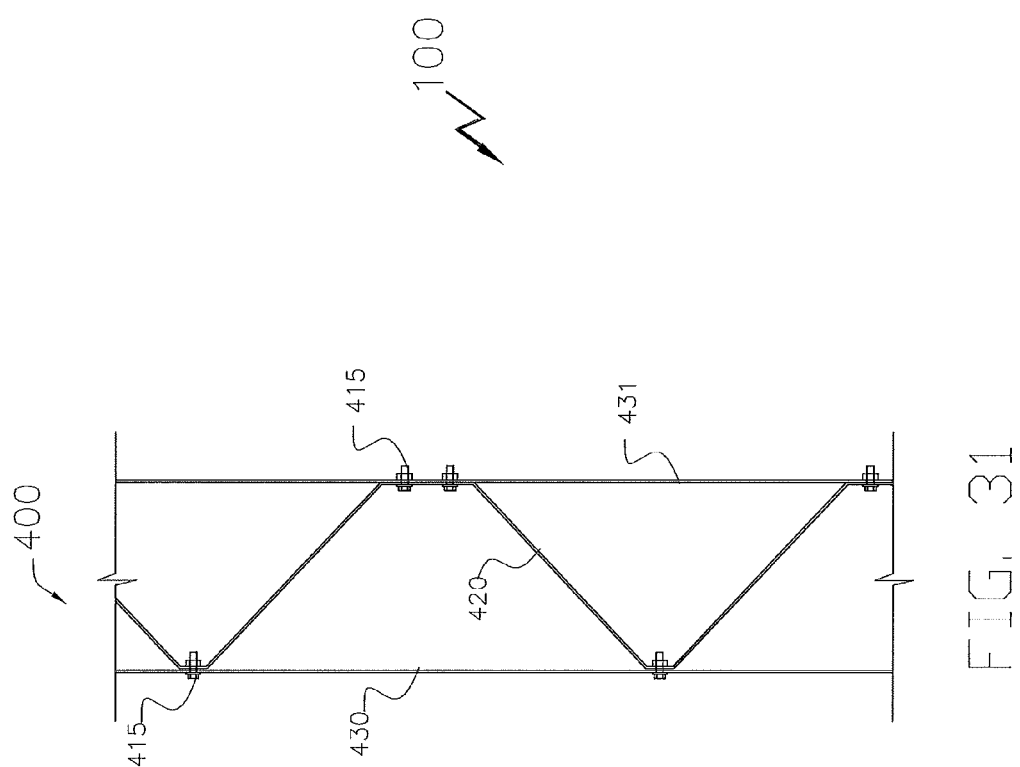
FIG. 31 is a plan view of the connection at the top end of tornado-resisting end wall panels of the structure of FIG. 1

Shown in FIG. 31 is a section plan view of the connections between the top end of wall panel 420, outer angle 430, and inner angle 431.

Figure 32:
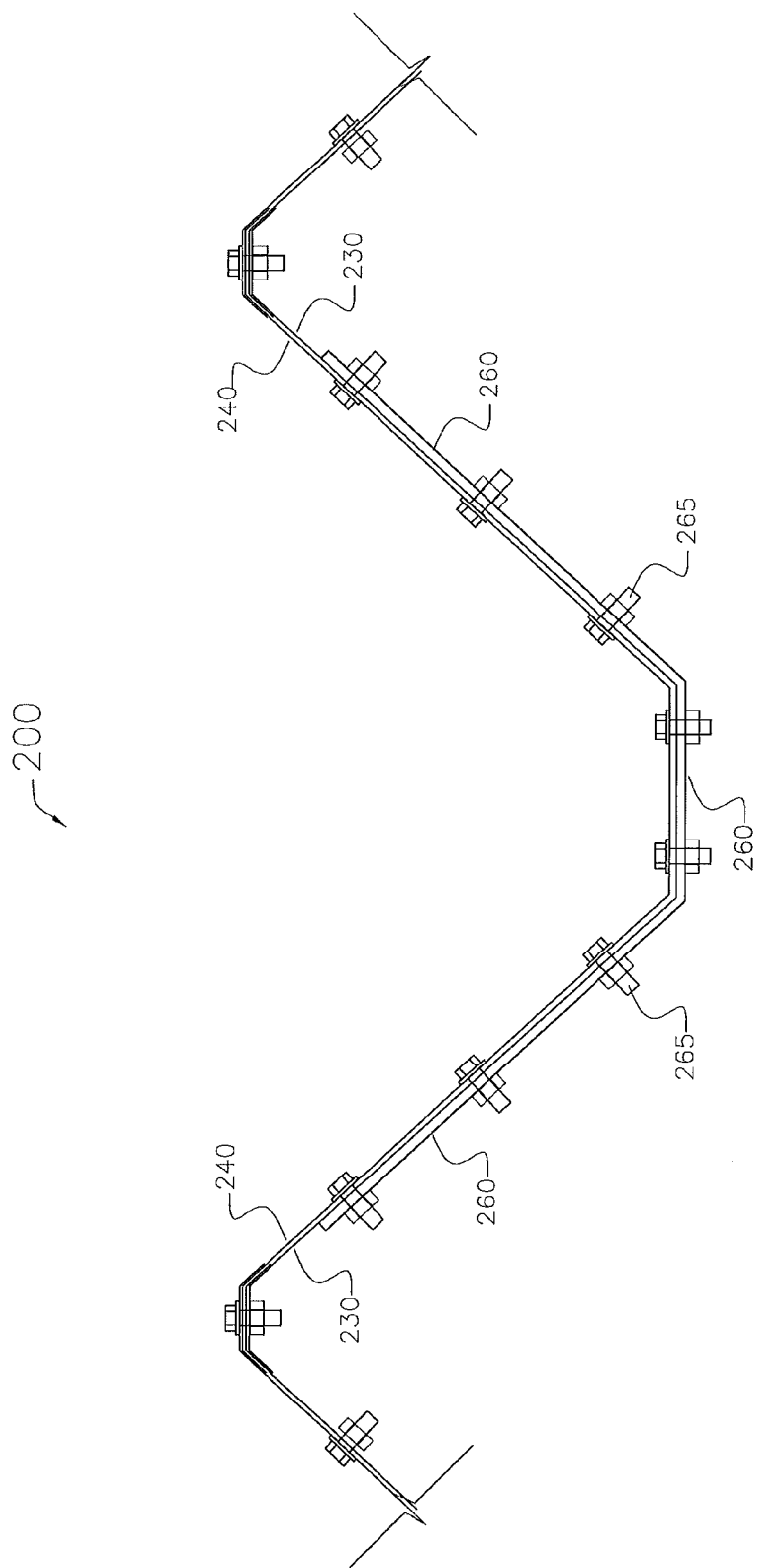
FIG. 32 is a cross section view of a bracing panel connection plate of structure of FIG. 1

FIG. 32 is a cross section view of a bracing panel connection plate 260 at the overlap of peak panel 240 and roof panel 230 of main tornado-resisting system 200 of shelter 100. The locations of bolts 265 are typical bolt locations at ends of all tornado-resisting panels of shelter 100.

Figure 33:
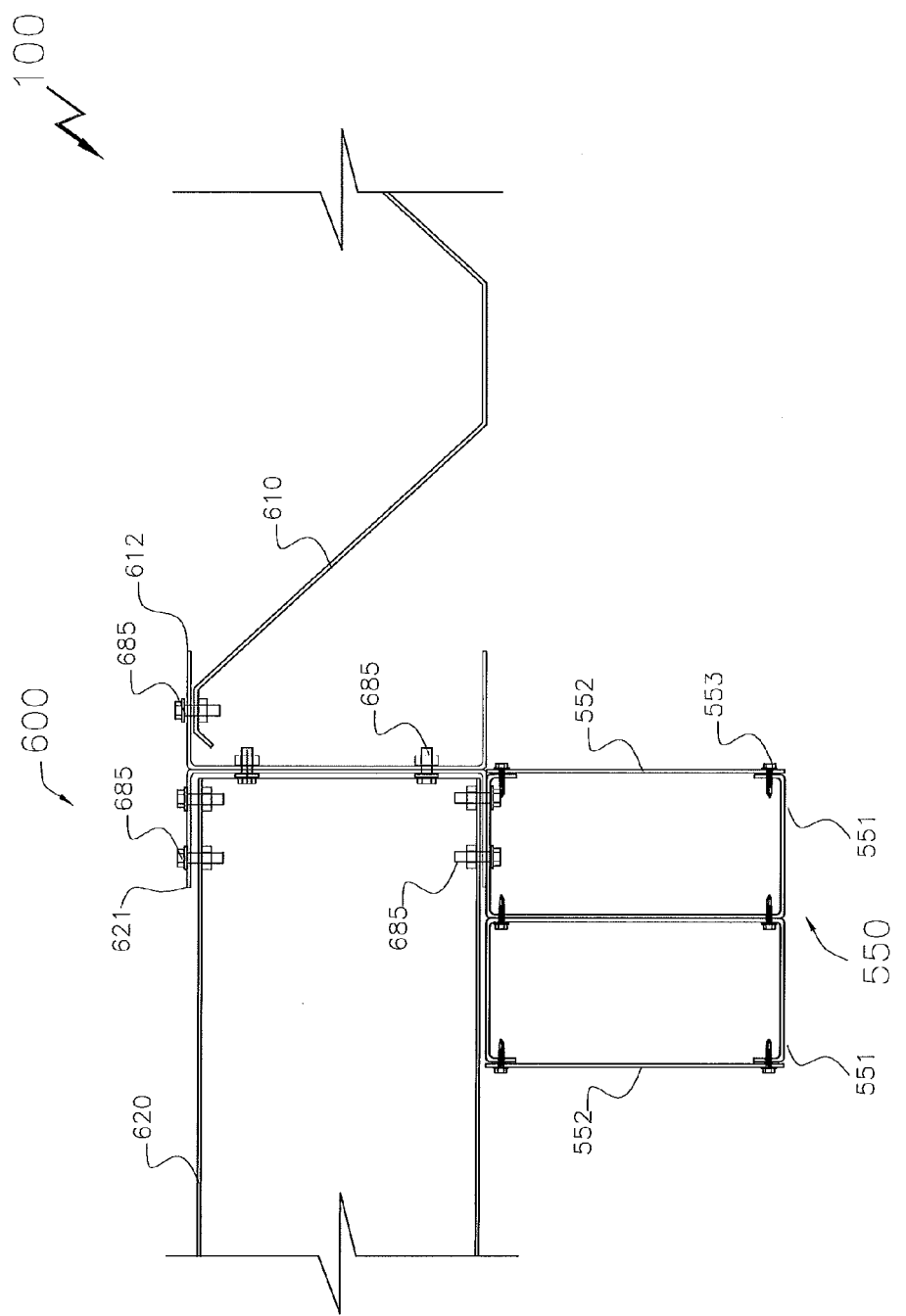
FIG. 33 is a cross section view of the connections between floor diaphragm panels, channels and beam of the structure of FIG. 1

Shown in FIG. 33 is a cross section view of the connections between floor diaphragm panel 610, floor diaphragm edge channel 612, floor diaphragm panel 620, and beam 550 of shelter 100. The top flange of panel 610 is connected to the top flange of floor side channel 612 by bolts 685 at 6¹⁵⁄₁₆ inch spacing. Web of channel 612 is connected to the web of floor diaphragm end channel 621 by two rows of bolts 685 at 24.5 inch spacing along the channel length direction. Each top flange of floor panel 620 is connected to the top flange of floor end channel 621 by two bolts 685. Each bottom flange of floor panel 620 is connected to the bottom flange of floor end channel 621 and top flange of stiffened channel 551 of beam 550 by 4 bolts 685. FIG. 33 also illustrates that beam 550 is comprised of two stiffened channels 551 and two cover plates 552 that are connected to the lips of channel 551 by self-tapping screws after bolts 685 having been installed.

Figure 34:
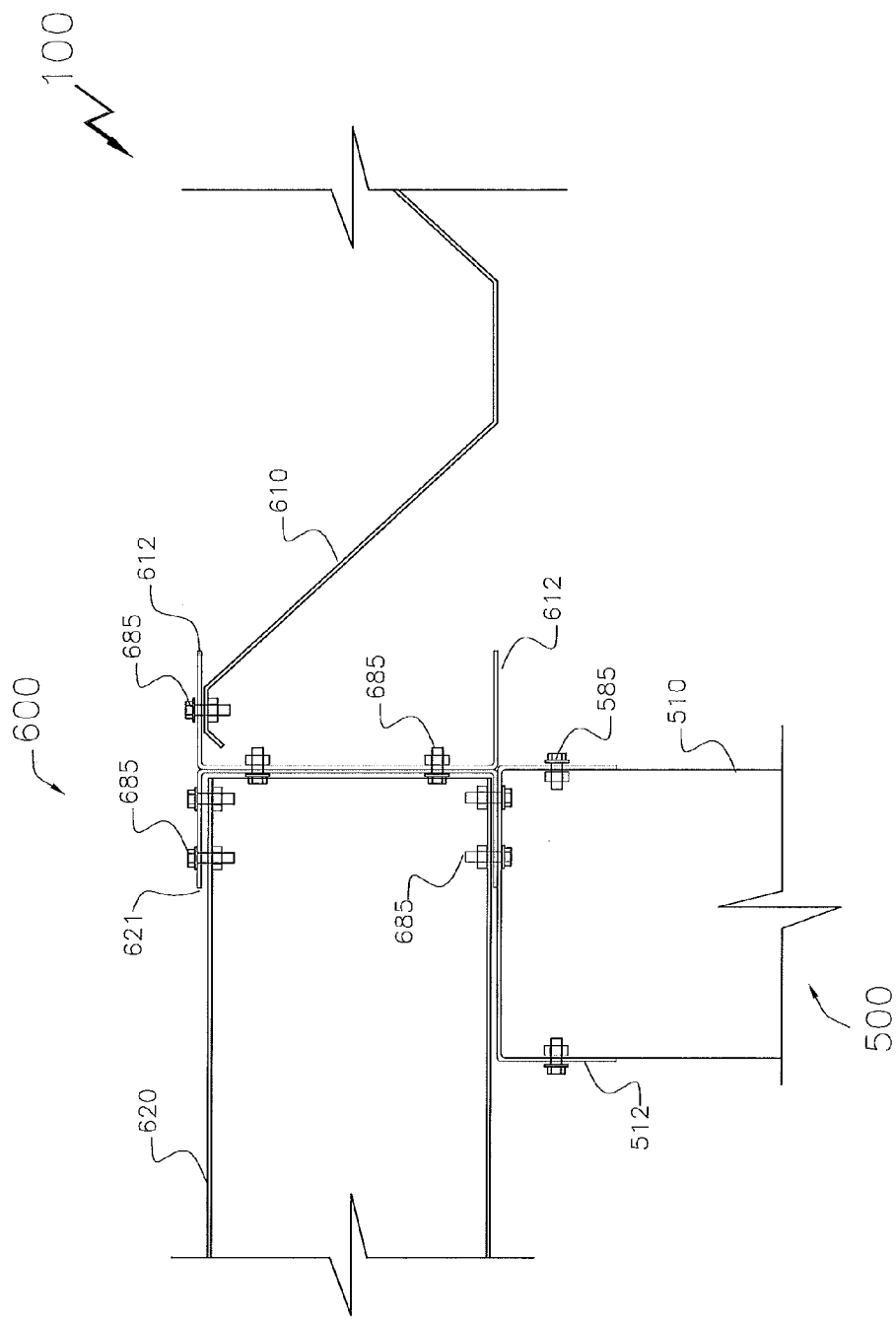
FIG. 34 is a cross section view of the connections between floor diaphragm panels and channels and tornado-resisting baffled entry wall of the structure of FIG. 1

FIG. 34 is similar to FIG. 33 except that beam 550 is replaced by baffled entry wall 500. Each bottom flange of floor panel 620 is connected to the bottom flange of floor end channel 621 and the web of cap channel 512 of wall 500 by 4 bolts 685.

A section plan view of the connections between vent 901, vent tornado impact-protective panel 902, and panels 210 of main tornado-resisting system 200 is illustrated in FIG. 35. Each side flange of vent 901 is connected to the narrow flange of panel 210 by 3 bolts 285. The narrow flanges of tornado impact-protective tornado impact-protective panel 902 are bolted to the narrow flanges of panels 210. Panel 902 shall cover not only vent 901 but also at least one panel 210 on each side of vent 901, in order to protect the vent opening from direct impact of tornado debris missiles. The frame of vent 901 must be sufficient deep and strong to protect the shelter occupants from secondary impact of tornado debris missiles.

Figure 36:
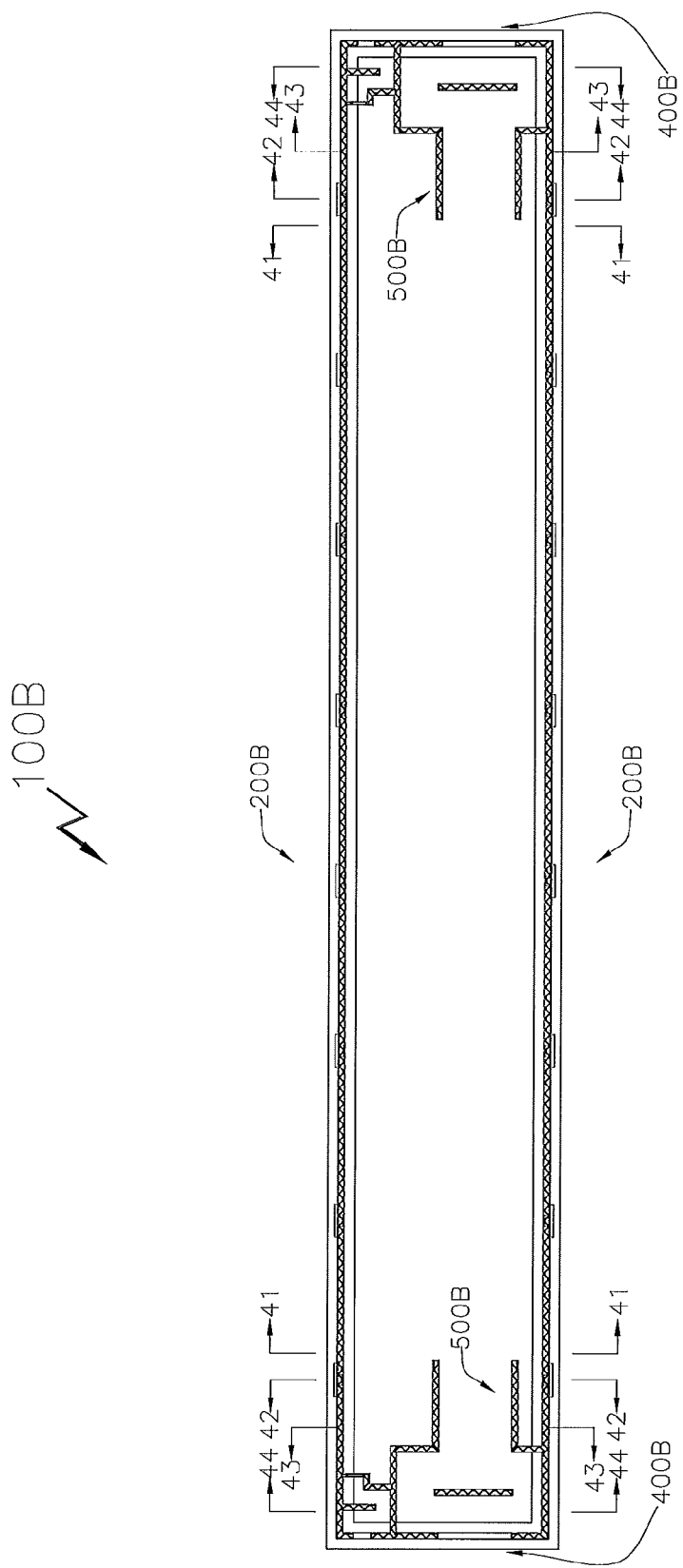
FIG. 36 is a gross plan of an alternative community tornado shelter structure constructed from a commercial package according to an exemplary embodiment of the invention

FIG. 36 shows a gross plan of an alternative mid-sized community tornado shelter structure 1006 constructed from a commercial package according to an exemplary embodiment of the current invention. A tornado shelter 100B is comprised of main tornado-resisting systems 200B, tornado-resisting end walls 400B, and baffled entry walls 500B. More detailed views of shelter 100B are provided in FIGS. 37-48.

Figure 37:
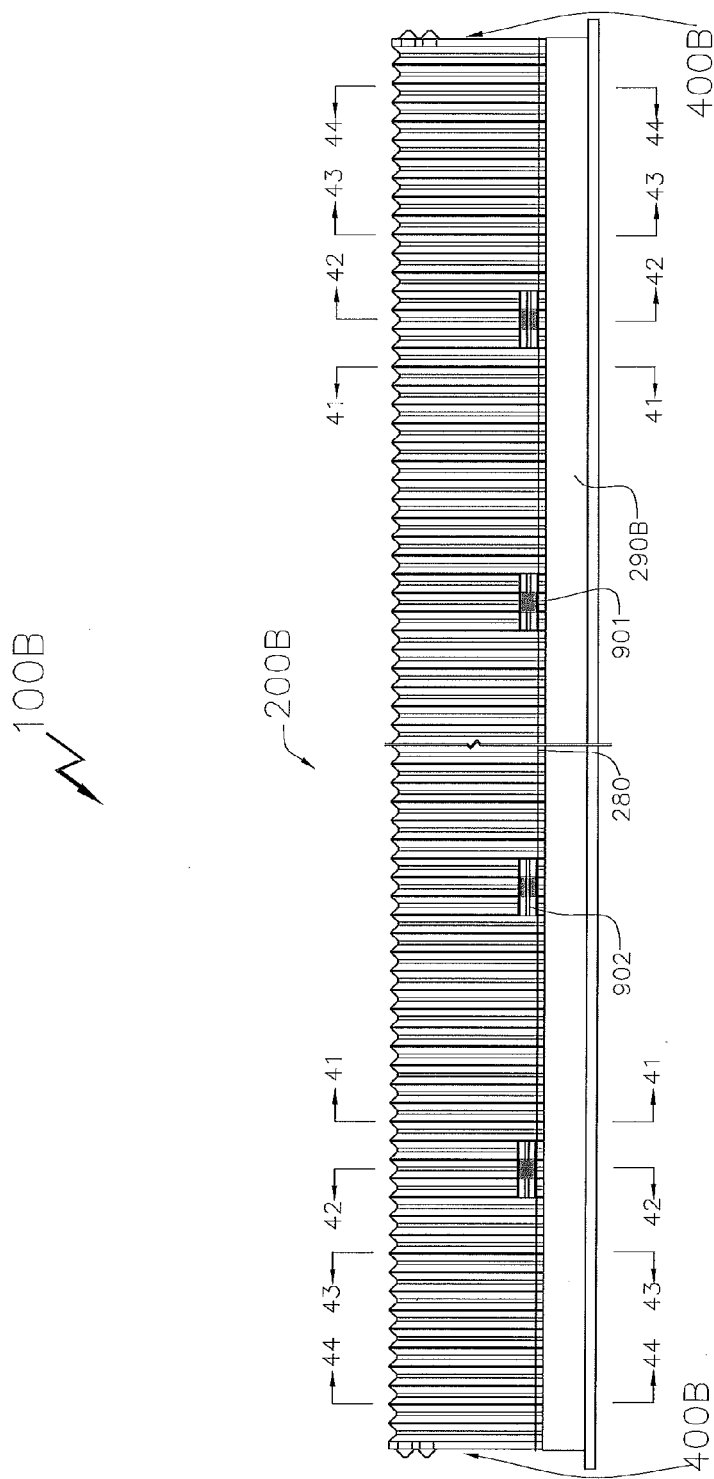
FIG. 37 is a side elevation view of the structure of FIG. 36

FIG. 37 shows a side elevation view of shelter 100B. Main tornado-resisting systems 200B, designed to withstand the ICC 500 required tornado wind pressures and debris missile impacts, serve as all of the side wall, roof, and side envelope of shelter 100B. Indicated in FIG. 37 are also locations of the cross section views, FIGS. 41-44, of shelter 100B. Locations of ICC 500 required side base vents 901 and their tornado impact-protective systems 902 for shelter 100B are also shown in FIG. 37. The main tornado-resisting systems 200B are connected to Tornado-resisting foundation 290B by tornado-resisting connectors 280.

Figure 38:
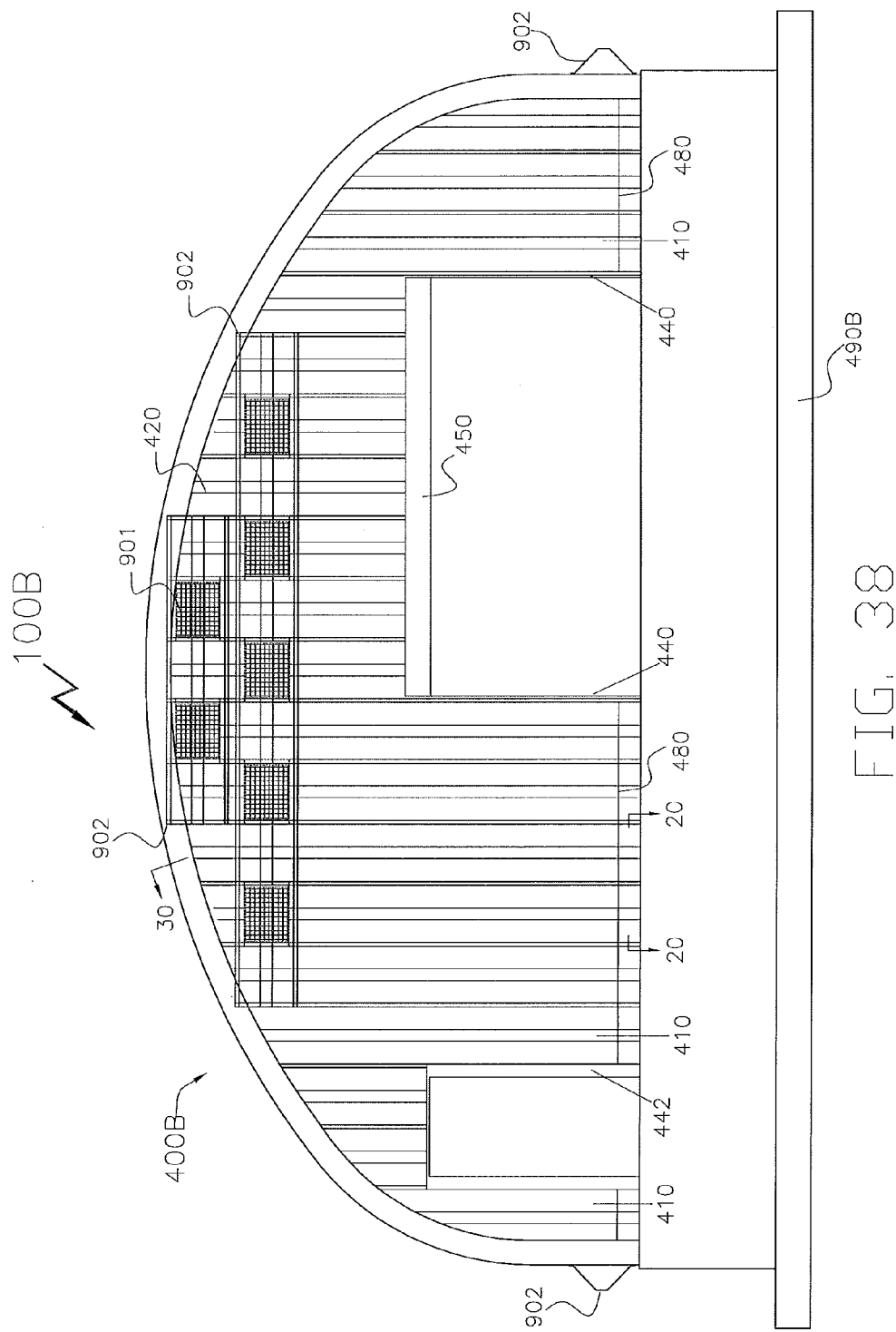
FIG. 38 is an end elevation view of the structure of FIG. 36

A tornado-resisting end wall 400B of shelter 100B is illustrated in FIG. 38. The main components of end wall 400B include tornado-resisting end wall panels 410 from foundation 490B to the main tornado-resisting system at the top, tornado-resisting end wall panels 420 above exit top beams 450, exit gate side posts 440, exit door frame 442, and tornado-resisting end wall connector 480. All of these main end wall components must be strong enough to withstand the ICC 500 required tornado wind pressures and debris missile impacts. Also shown in FIG. 38 are vents 901 and their tornado impact-protective systems 902 required for shelter 100B. Typical connection between a main tornado-resisting system panel and the top end of an end wall panel is shown in FIG. 30. A cross section plan view of the tornado-resisting end wall connector 480 is shown in FIG. 20.

Figure 39:
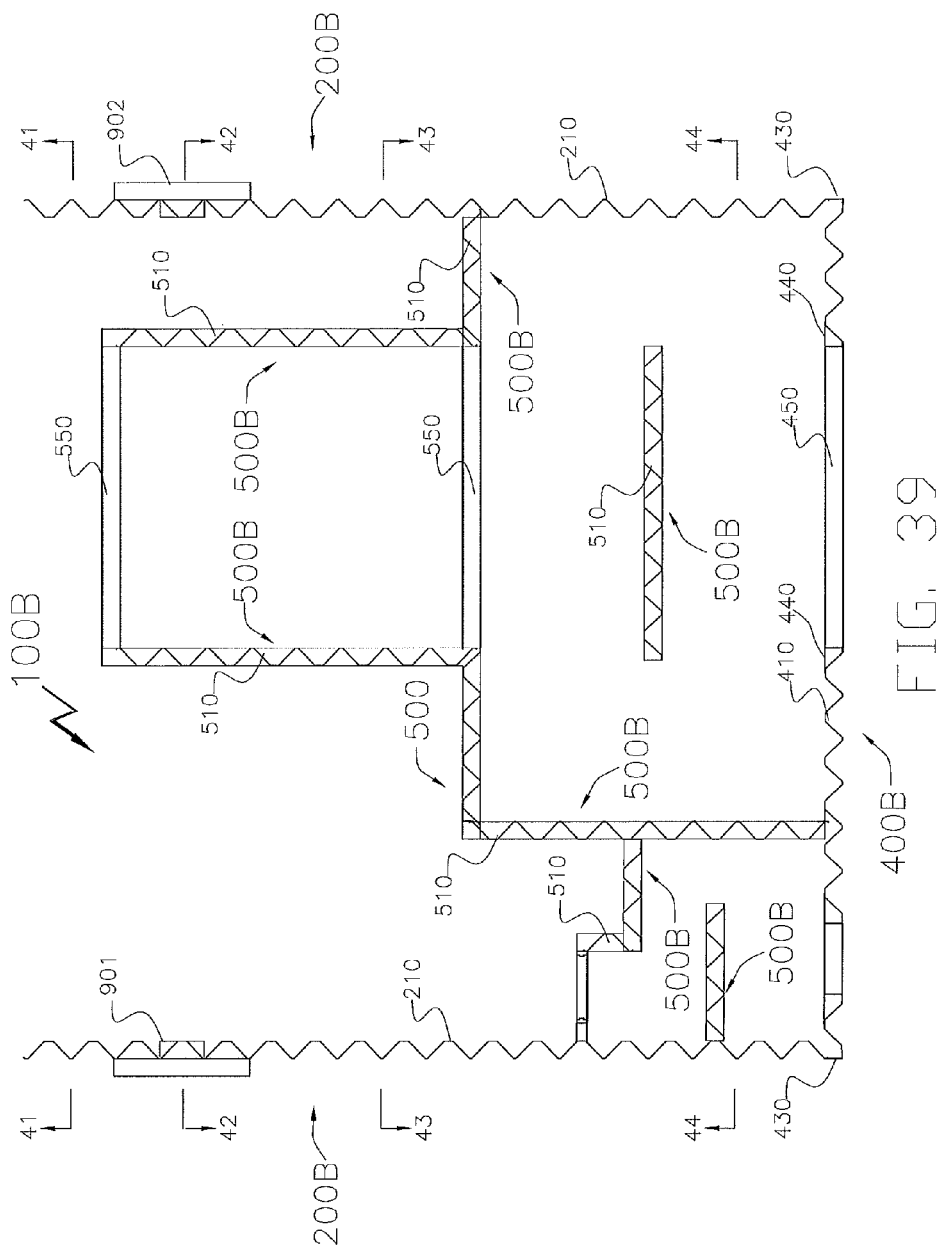
FIG. 39 is a more detailed floor plan near one end of the structure of FIG. 36

A more detailed floor plan near one end of shelter 100B is shown in FIG. 39 with the locations of two bottom ends of main tornado-resisting systems 200B, a tornado-resisting end wall 400B, end wall beams 450, alcove/baffled entry systems 500 with beams 550, side bottom vents 901 and their tornado impact-protective systems 902. Since this is a mid-sized shelter, only one main exit gate is provided at each end wall. A smaller exit is used to provide an alternative emergency exit in case the main exit is blocked by tornado debris. This smaller exit is also protected by a tornado-resisting baffled entry system.

Figure 40:
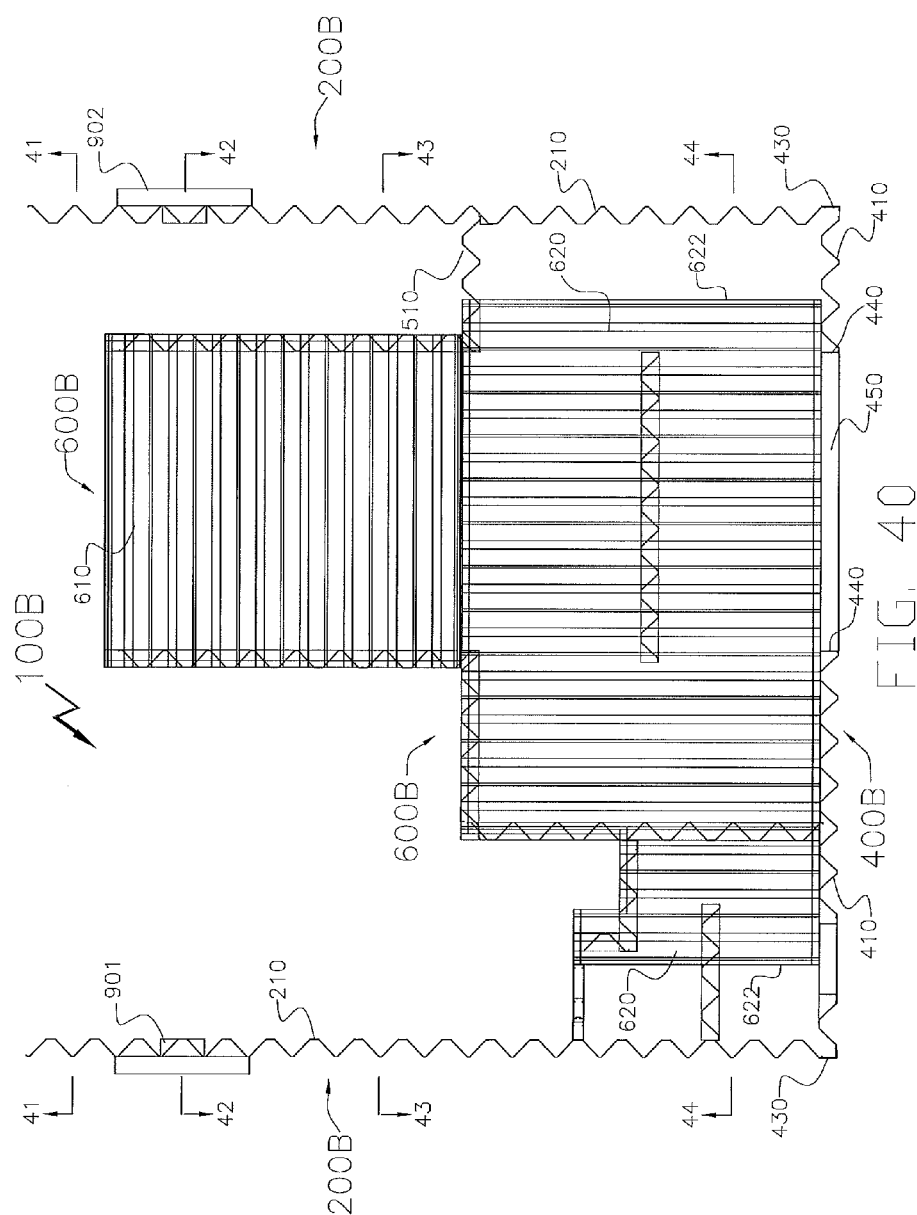
FIG. 40 is a more detailed floor diaphragm plan near one end of the structure of FIG. 36

Horizontal floor diaphragms 600B are shown in FIG. 40 together with locations of side walls 200B, end wall 400B, end wall exit top beams 450, transverse mezzanine floor panels 610, longitudinal mezzanine floor panels 620, vents 901, and vent protective panels 902 of shelter 100B. Locations of sectional views, FIGS. 41-44, are also shown in FIG. 40. Horizontal floor diaphragm panels 610 and 620 and their connections to end wall 400B, end wall beams 450, and baffled entry walls 500 must be designed to withstand the ICC 500 required live loads and tornado wind pressures and forces.

Figure 41:
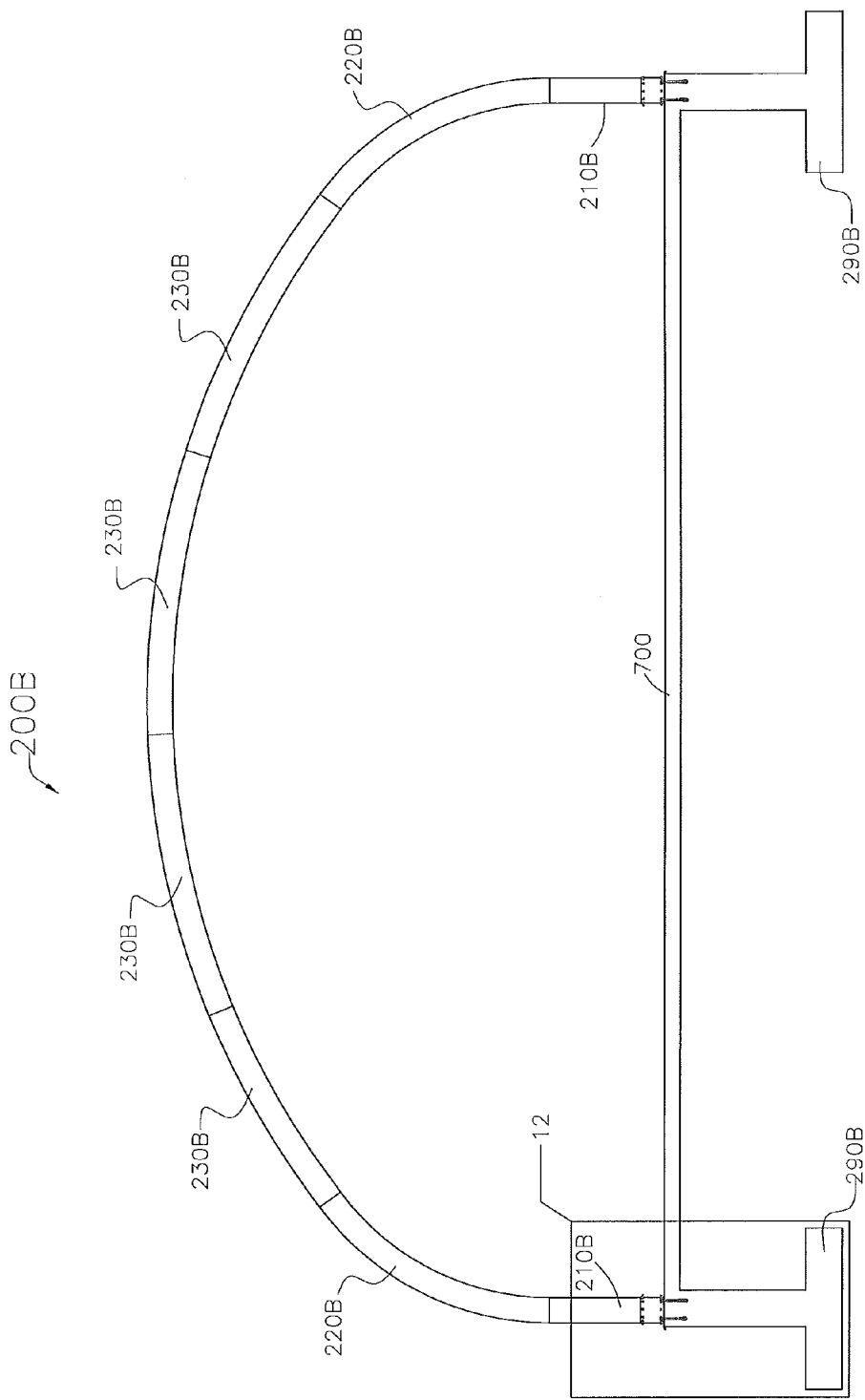
FIG. 41 is an elevation view of a typical main tornado-resisting system of the structure of FIG. 36

Shown in FIG. 41 is a typical main tornado-resisting system 200B of shelter 100B. A main tornado-resisting system 200B is comprised of tornado-resisting side wall panels 210B, eave panels 220B, and roof panels 230B. All of the above tornado-resisting panels have the same trapezoidal cross section of tornado impact-protecting panel 902 shown in FIG. 13 but may have varying thicknesses and radii along the long axis of the panels. Each end of a main tornado-resisting system 200B is connected to and supported by a tornado-resisting foundation 290B as illustrated in FIG. 12. All panels of the main tornado-resisting system 200B and all the connections must be designed to withstand ICC 500 specified live loads and tornado wind forces.

Figure 42:
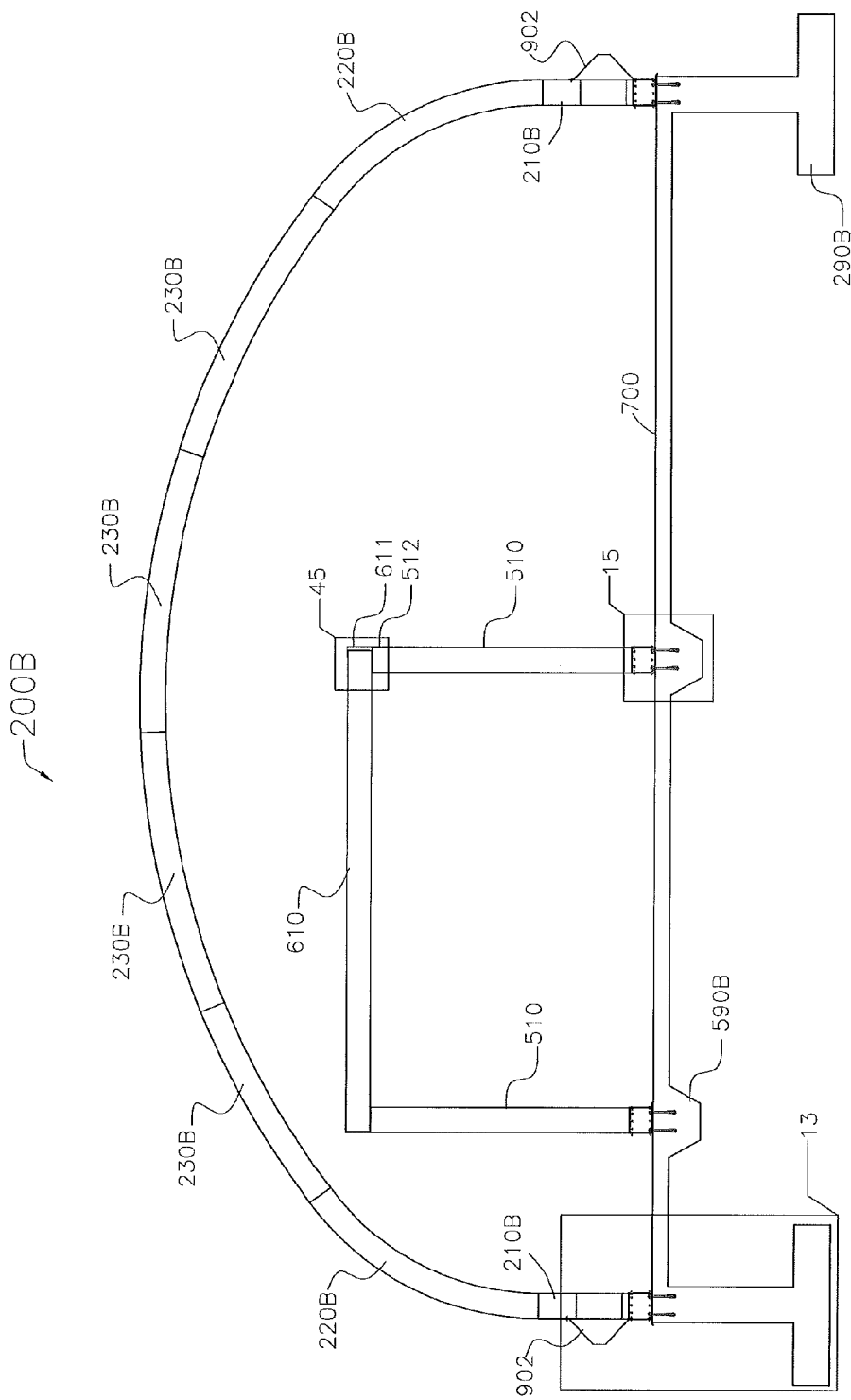
FIG. 42 is an elevation view of a main tornado-resisting system at side vents and baffled entry walls of the structure of FIG. 36

FIG. 42 is similar to FIG. 41 except with floor diaphragm 610, baffled entry wall panels 510, and side vents 902. Details of the connections between panel 210B, foundation 290B, and vent protective panel 902 are illustrated in FIG. 13. Connection between panel 510 and its foundation is shown in FIG. 15. Details of the connections between panels 610 and 510 are provided in FIG. 45.

Figure 43:
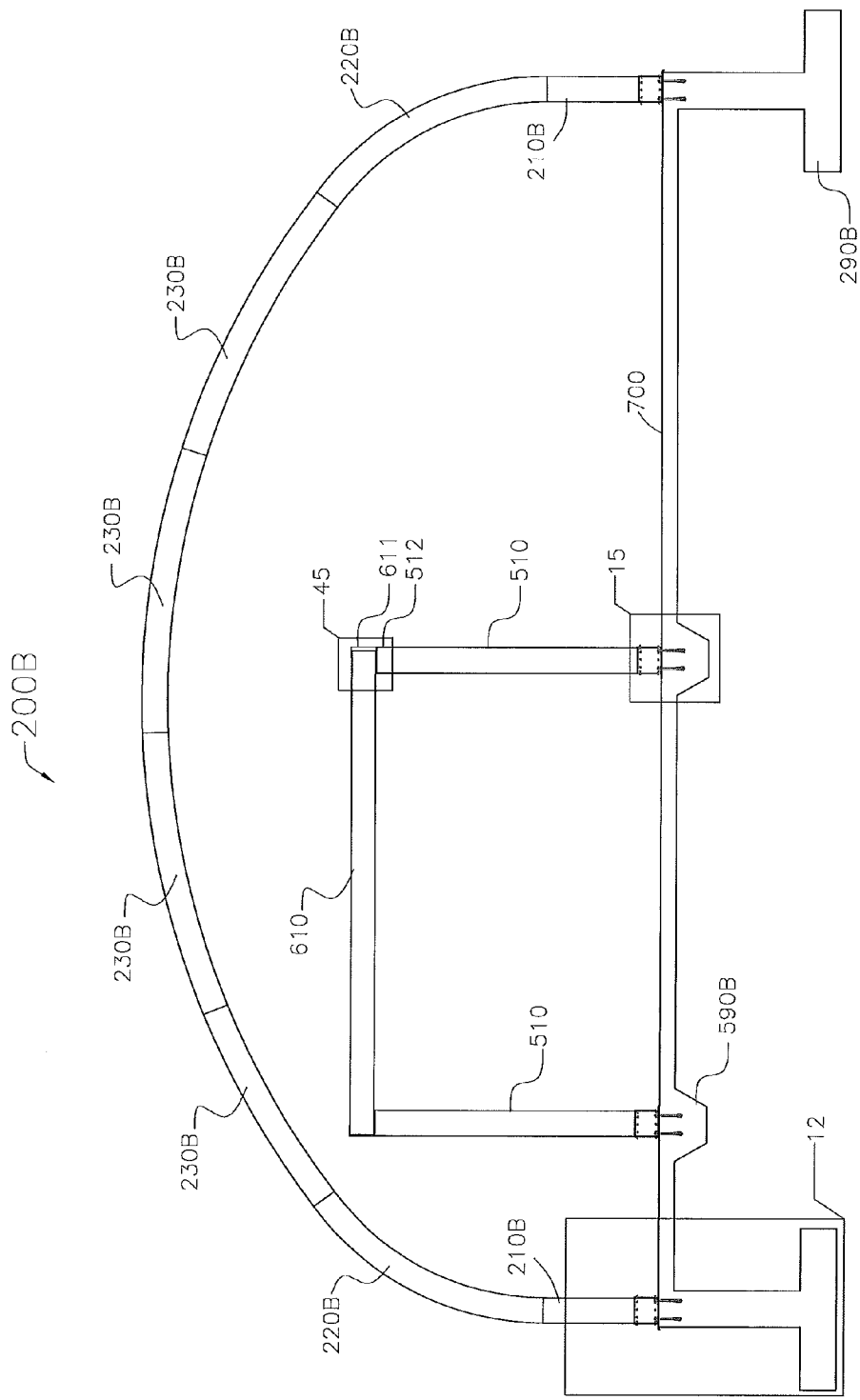
FIG. 43 is an elevation view of a main tornado-resisting system at baffled entry walls of the structure of FIG. 36

FIG. 43 is similar to FIG. 41 except with floor diaphragm 610 and baffled entry wall panels 510. Details of the connections between panels 610 and 510 are provided in FIG. 45.

Figure 44:
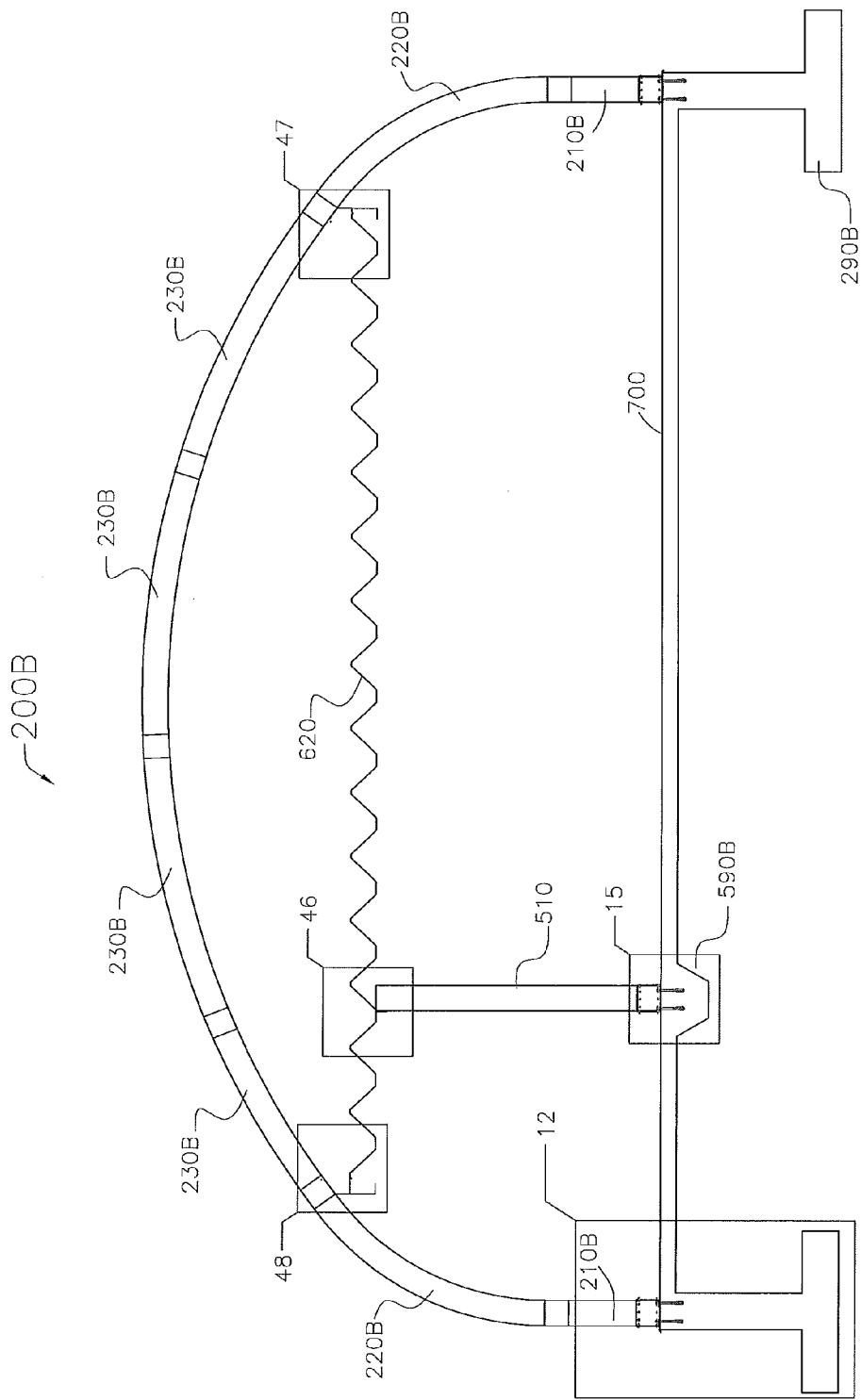
FIG. 44 is an elevation view of a main tornado-resisting system connected to the floor diaphragm at a baffled entry wall of the structure of FIG. 36

FIG. 44 is similar to FIG. 41 except with floor diaphragm panels 620, baffled entry wall panel 510, and connections. Connection between panel 510 and its foundation is shown in FIG. 15. Details of the connections between panel 610 and 510 are provided in FIG. 46. Shown in FIGS. 47 and 48 are connection details between main tornado-resisting system to the floor diaphragm.

Figure 45:
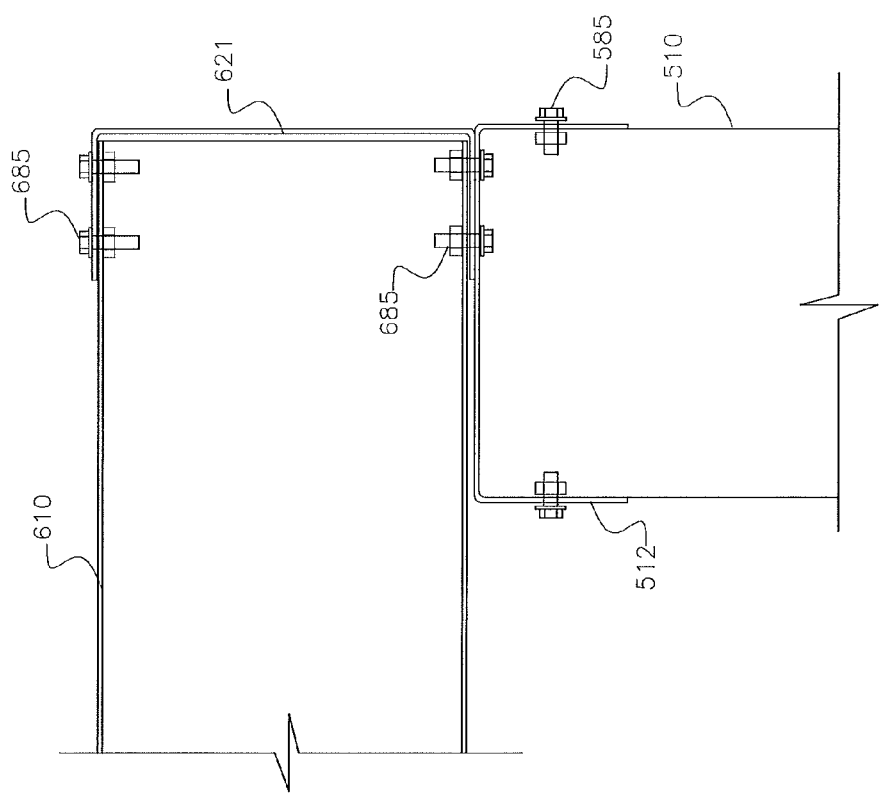
FIG. 45 is a view of a connection between a floor diaphragm and a baffled entry wall of the structure of FIG. 36

Connection details between floor diaphragm panel 610 and baffled entry wall panel 510 are shown in FIG. 45. Each top flange of panel 610 is connected to the top flange of floor end channel 621 by two bolts 685. Each bottom flange of floor panel 610 is connected to the bottom flange of floor end channel 621 and top channel 512 of entry wall panel 510 by 4 bolts 685. Vertical flanges of cap channel 512 are connected to both sides of wall panel 510 by bolts 585.

Figure 46:
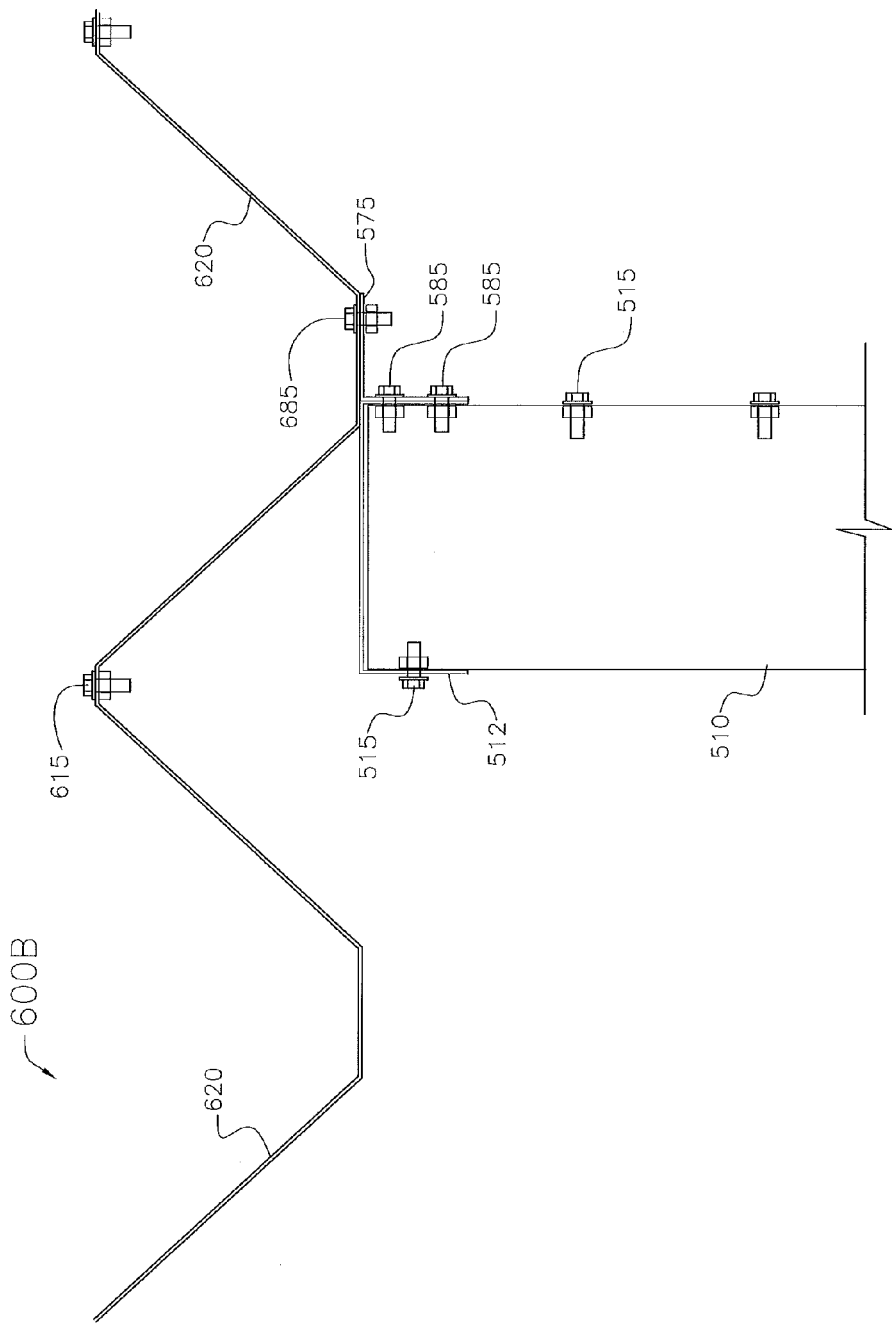
FIG. 46 is a view of another connection between a floor diaphragm and a baffled entry wall of the structure of FIG. 36

Shown in FIG. 46 is a cross section view of the connection between floor diaphragm 600B and baffled entry wall panel 510. Floor panels 620 are connected to each other at the overlapping top flanges by bolts 615 at $6^{15}/_{16}$ inch spacing. The bottom flange of floor panel 620 is connected to the horizontal leg of connection angle 575 by bolts 685 at $6^{15}/_{16}$ inch spacing in the length direction of angle 575. The vertical leg of angle 575 is connected to the vertical flange of the wall top channel 512 and the narrow flange of each wall panel 510 by two bolts 585. The other vertical leg of cap channel 512 is connected to the wide flange of each wall panel 510 by two bolts 515.

Figure 47:
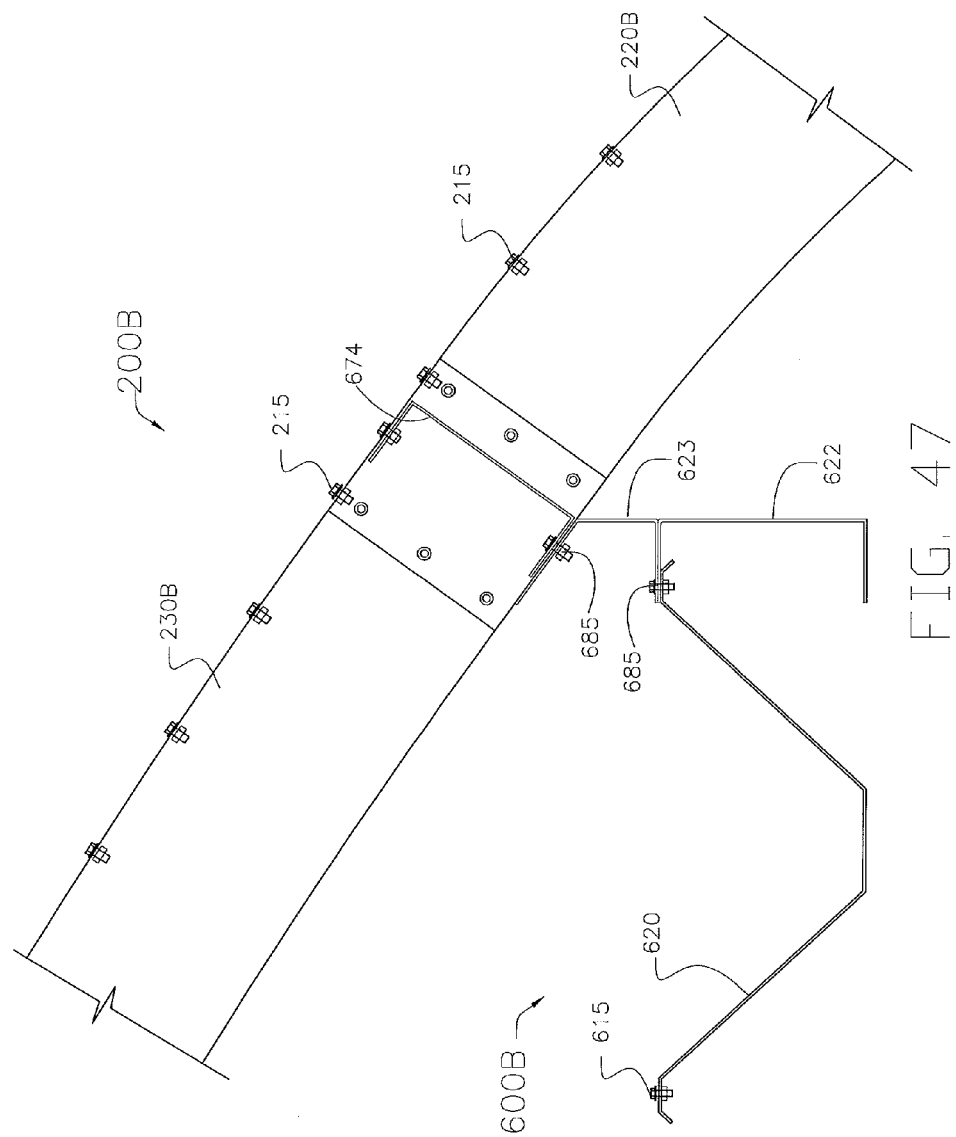
FIG. 47 is a view of connection between a floor diaphragm and a main tornado-resisting system of the structure of FIG. 36
Figure 48:
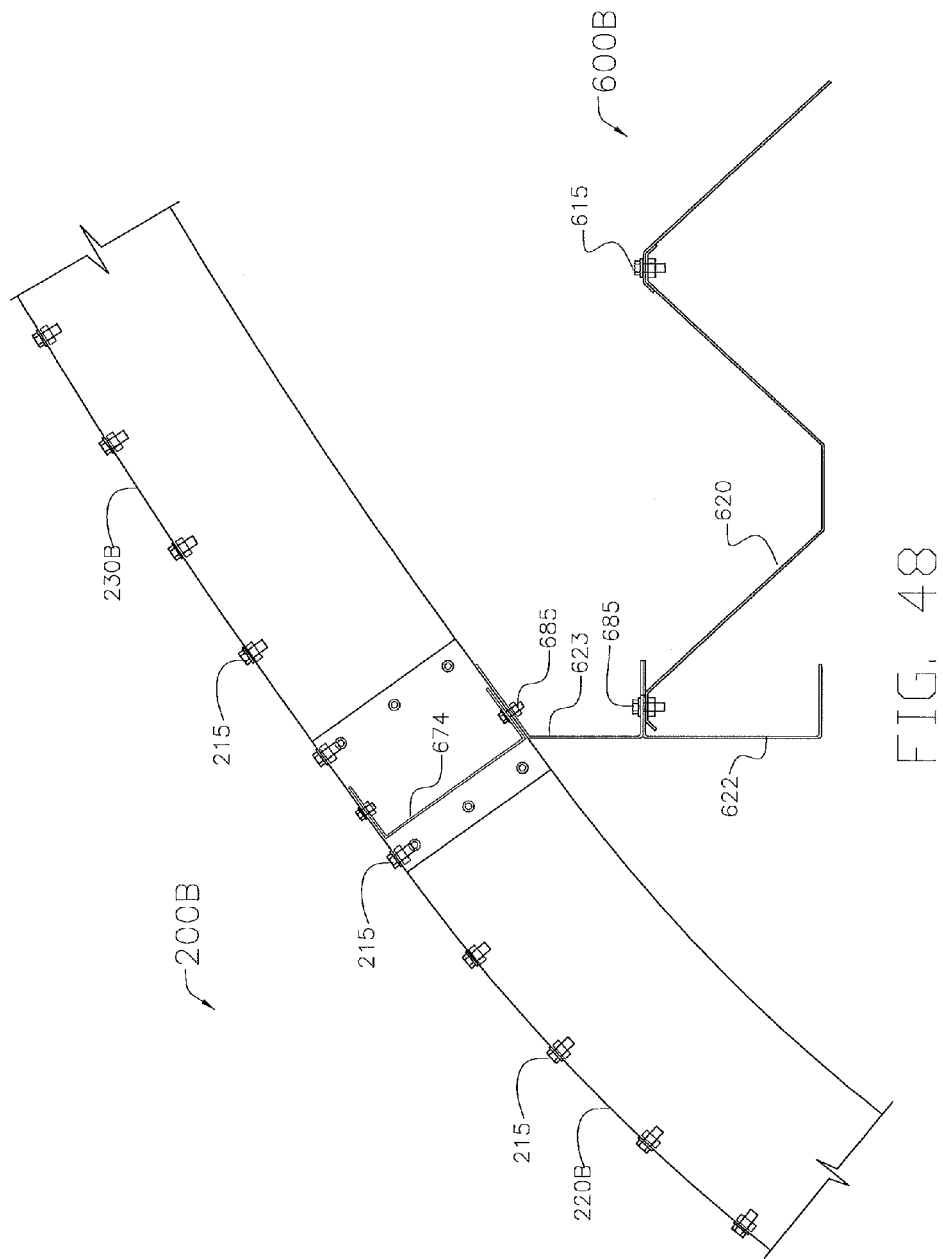
FIG. 48 is another view of connection between a floor diaphragm and a main tornado-resisting system of the structure of FIG. 36

FIG. 47 is a vertical section view of the connections between floor diaphragm 600B and main tornado-resisting system 200B of shelter 100B. The top flange of floor panel 620 is connected to the top flange of floor side channel 622 and the bottom flange of bent plate connector 623 by bolts 685 at $6^{15}/_{16}$ inch spacing. Top flange of bent plate connector 623 is connected to the bottom flanges of each roof panel 230B and eave panel 220B by two bolts 685. Gusset plate 674 is used to enclose the gap between the trapezoidal eave panel 220B and the top flange of bent plate connector 623.

FIG. 48 is similar to FIG. 47 except on the opposite side of shelter 100B and floor panel 620 is closer to the web of floor side channel 622.

A cross section view of cold-formed steel beams of the tornado shelters is illustrated in FIG. 49. Each beam 550 is comprised of two stiffened channels 551 connected back to back by two rows of self-tapping screws 553 at 18" spacing along the beam length direction. Covering plate 552 is connected to the lips of channel 551 also by two rows of self-tapping screws 553 at 18" spacing.

Figure 50:
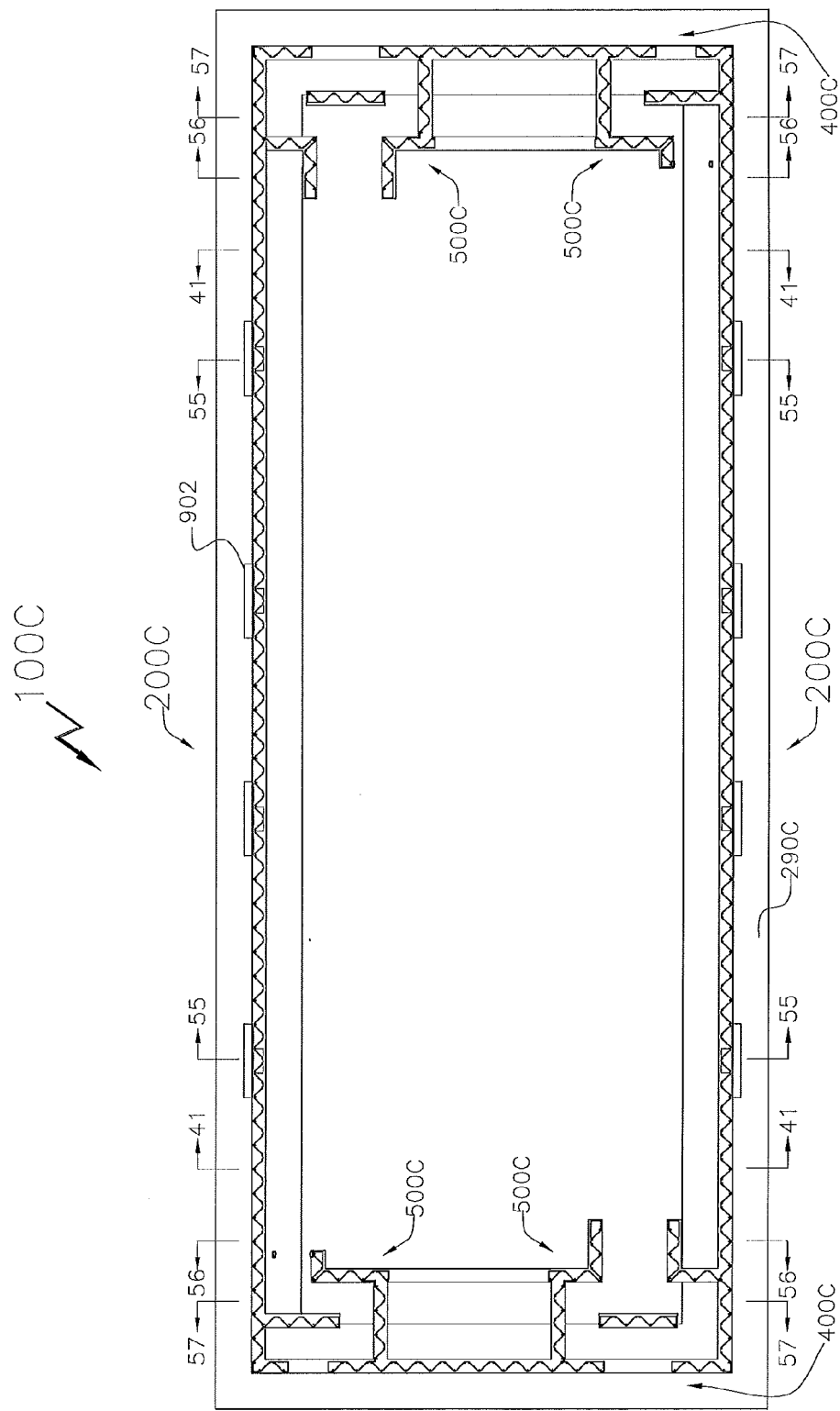
FIG. 50 is a gross plan of another alternative community tornado shelter structure constructed from a commercial package according to an exemplary embodiment of the invention

FIG. 50 shows a gross plan of an alternative small community tornado shelter structure 100C constructed from a commercial package according to an exemplary embodiment of the current invention. A tornado shelter 100C is comprised of main tornado-resisting systems 200C, tornado-resisting end walls 400C, and baffled entry walls 500C. More detailed views of shelter 100C are provided in FIGS. 51-57.

Figure 51:
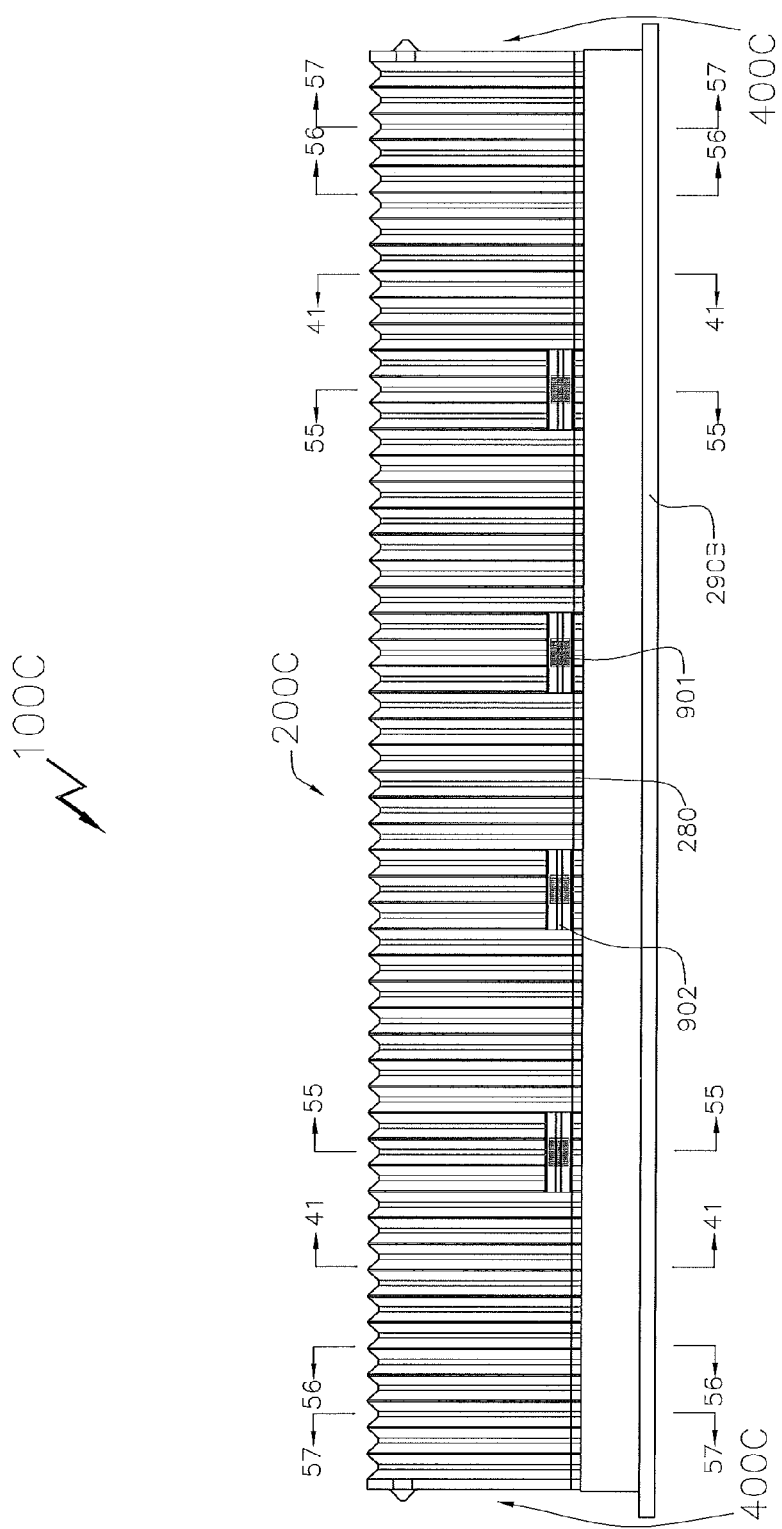
FIG. 51 is a side elevation view of the structure of FIG. 50

FIG. 51 shows a side elevation view of shelter 100C. Main tornado-resisting systems 200C, designed to withstand the ICC 500 required tornado wind pressures and debris missile impacts, serve as all of the side wall, roof, and side envelope of shelter 100C. Indicated in FIG. 51 are also locations of the cross section views, FIGS. 41, 55-57, of shelter 100C. Locations of ICC 500 required side base vents 901 and their tornado impact-protective systems 902 for shelter 100C are also shown in FIG. 51. The main tornado-resisting systems 200C are connected to Tornado-resisting foundation 290B by tornado-resisting connectors 280.

Figure 52:
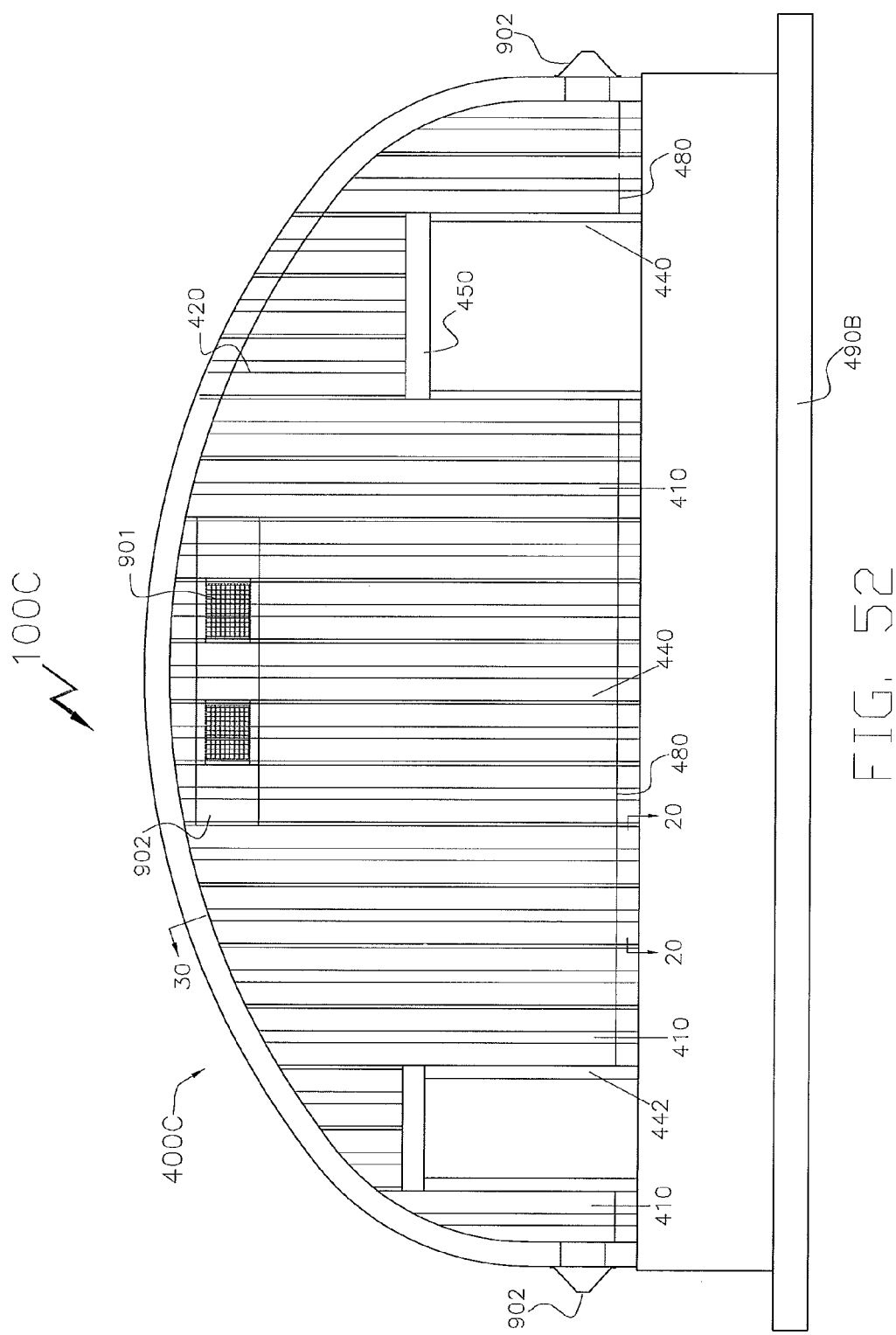
FIG. 52 is an end elevation view of the structure of FIG. 50

A tornado-resisting end wall 400C of shelter 100C is illustrated in FIG. 52. The main components of end wall 400C include tornado-resisting end wall panels 410 from foundation 490B to the main tornado-resisting system at the top, tornado-resisting end wall panels 420 above exit top beams 450, exit gate side posts 440, exit door frame 442, and tornado-resisting end wall connector 480. All of these main end wall components must be strong enough to withstand the ICC 500 required tornado wind pressures and debris missile impacts. Also shown in FIG. 52 are vents 901 and their tornado impact-protective systems 902 required for shelter 100C. Typical connection between a main tornado-resisting system panel and the top end of an end wall panel is shown in FIG. 30. A cross section plan view of the tornado-resisting end wall connector 480 is shown in FIG. 20.

Figure 53:
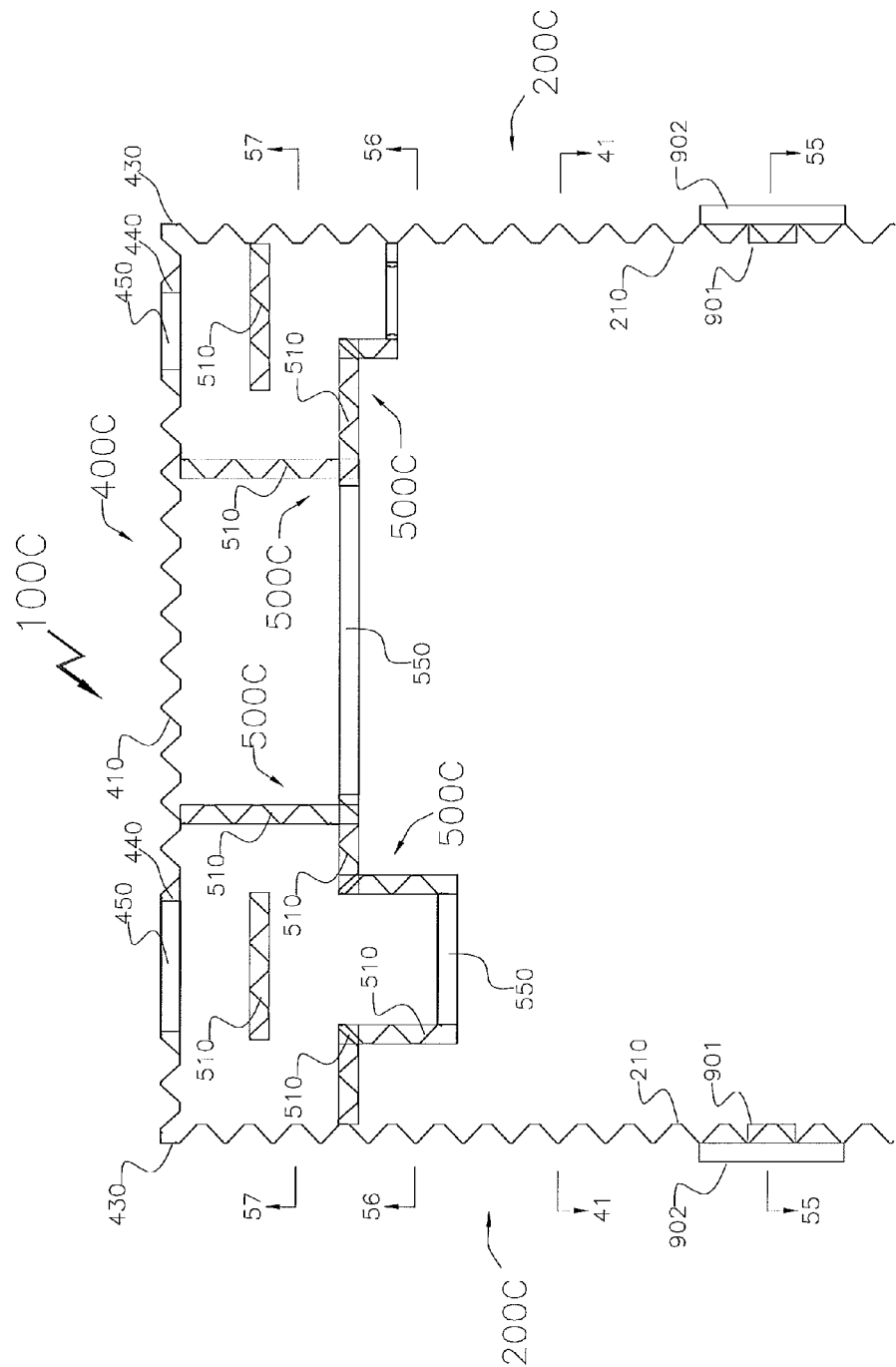
FIG. 53 is a more detailed floor plan near one end of the structure of FIG. 50

A more detailed floor plan near one end of shelter 100C is shown in FIG. 53 with the locations of two bottom ends of main tornado-resisting systems 200C, a tornado-resisting end wall 400C, end wall beams 450, alcove/baffled entry systems 500 with beams 550, side bottom vents 901 and their tornado impact-protective systems 902. Since this is a small shelter, only one small exit gate is provided at each end wall. A smaller tornado-resisting baffled entry system is used to provide an alternative emergency exit in case the main exit is blocked by tornado debris.

Figure 54:
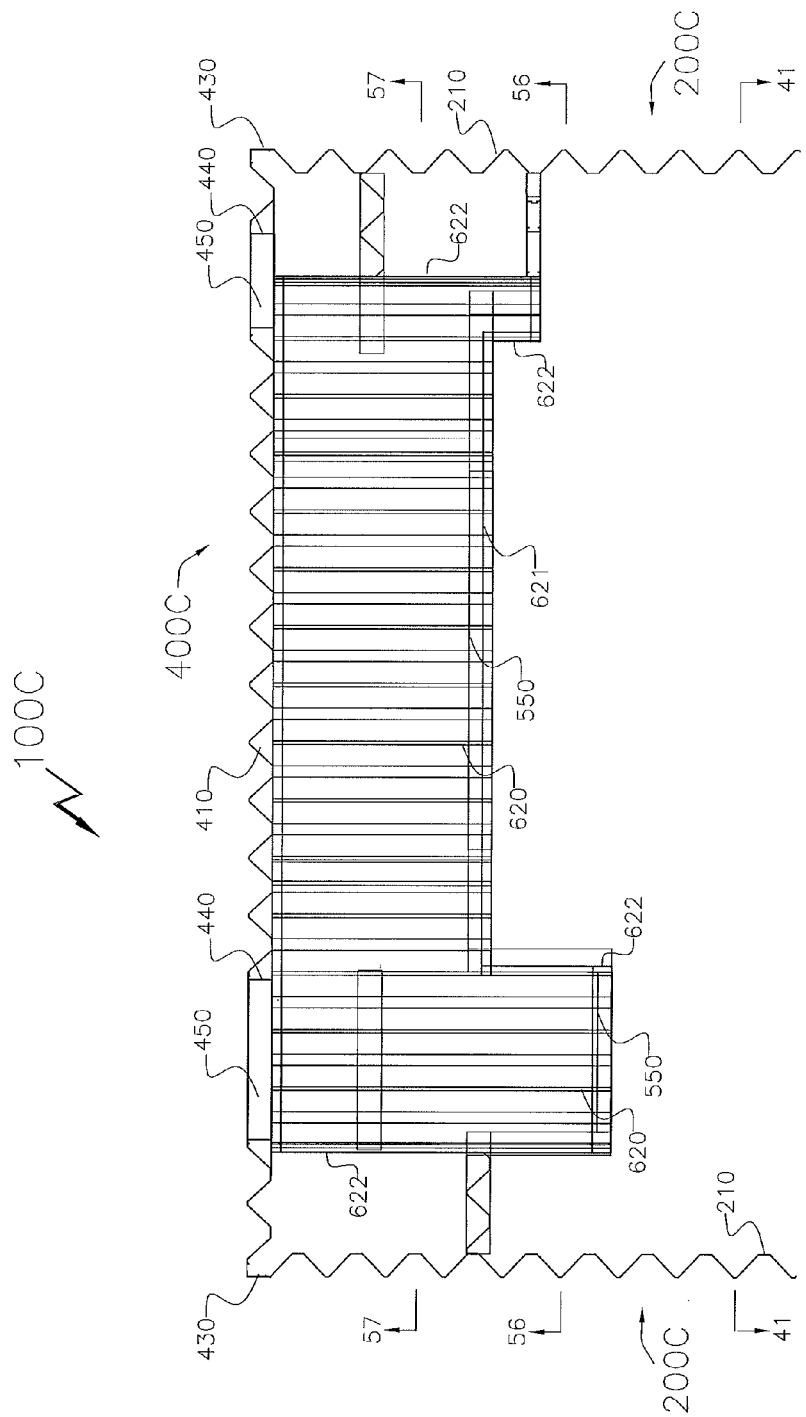
FIG. 54 is a more detailed floor diaphragm plan near one end of the structure of FIG. 50
Figure 56:
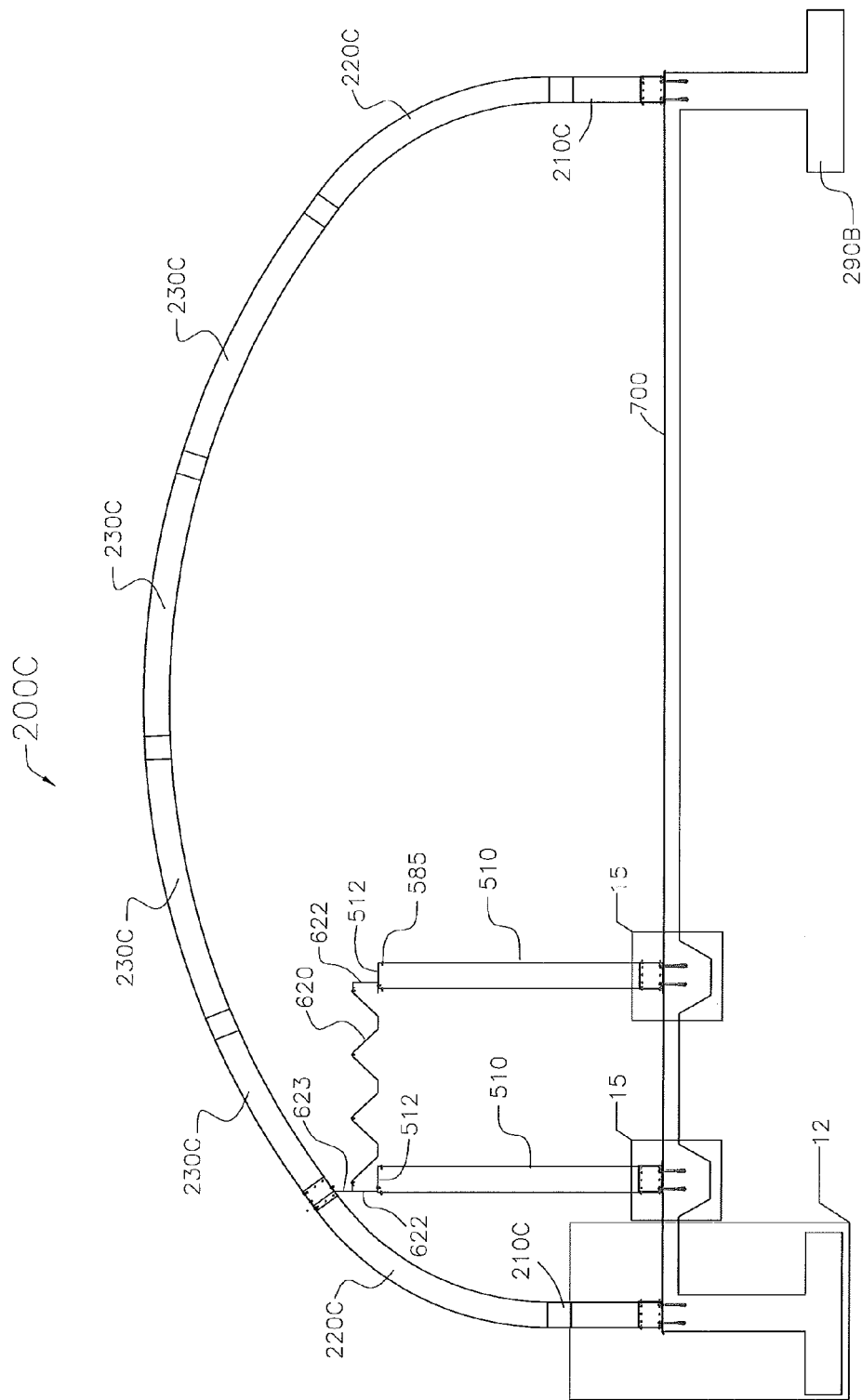
FIG. 56 is an elevation view of a main tornado-resisting system across a narrow portion of floor diaphragm and baffled entry walls of the structure of FIG. 50
Figure 57:
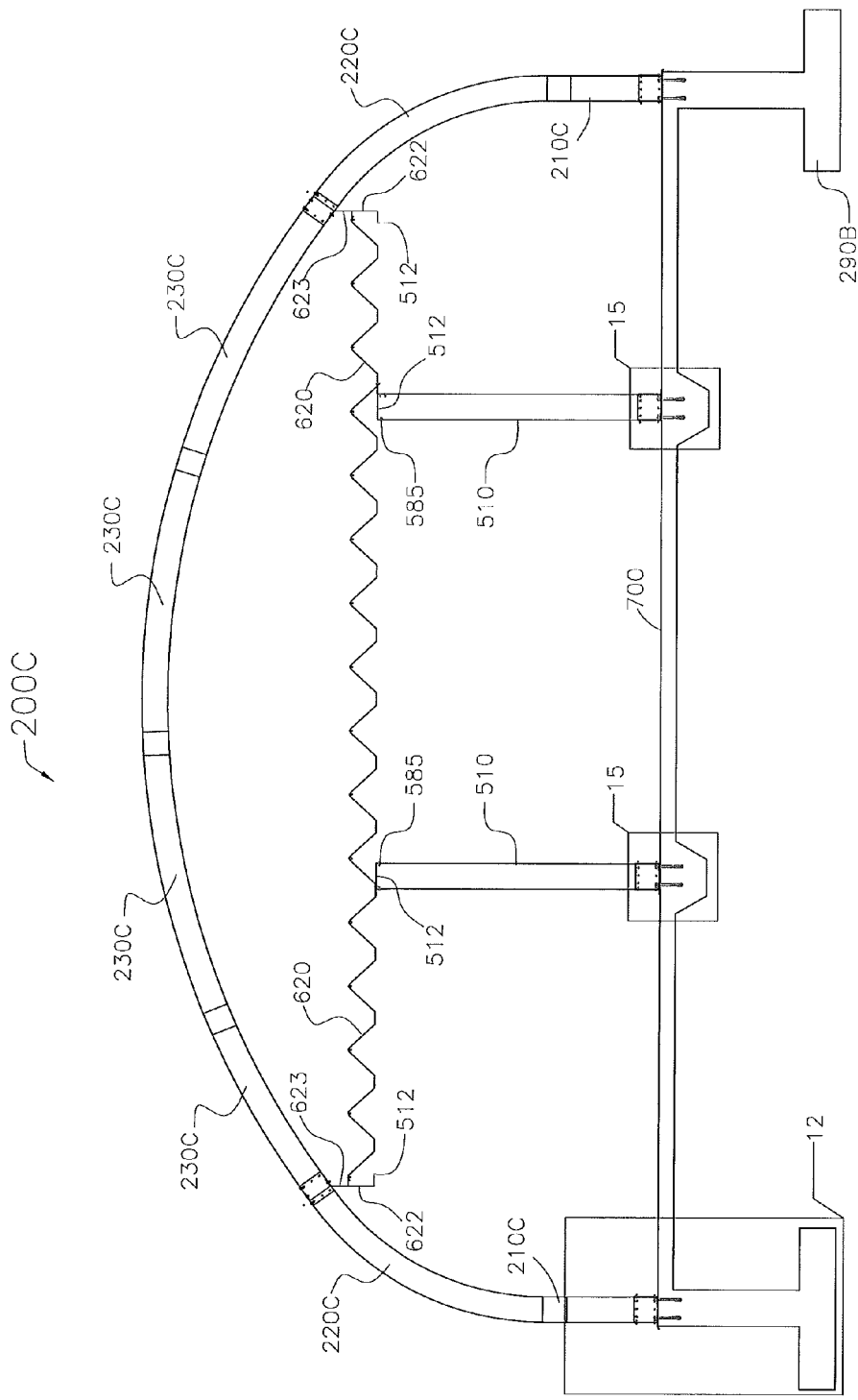
FIG. 57 is an elevation view of a main tornado-resisting system across the full width floor diaphragm and baffled entry walls of the structure of FIG. 50

Horizontal floor diaphragm panels 620 are shown in FIG. 54 together with locations of side walls 200C, end wall 400C, end wall exit top beams 450, vents 901, and vent protective panels 902 of shelter 100C. Locations of sectional views, FIGS. 41, 56 and 57 are also shown in FIG. 54. Horizontal floor diaphragm panels 620 and their connections to end wall 400C, end wall beams 450, and baffled entry walls 500 must be designed to withstand the ICC 500 required live loads and tornado wind pressures and forces.

Figure 55:
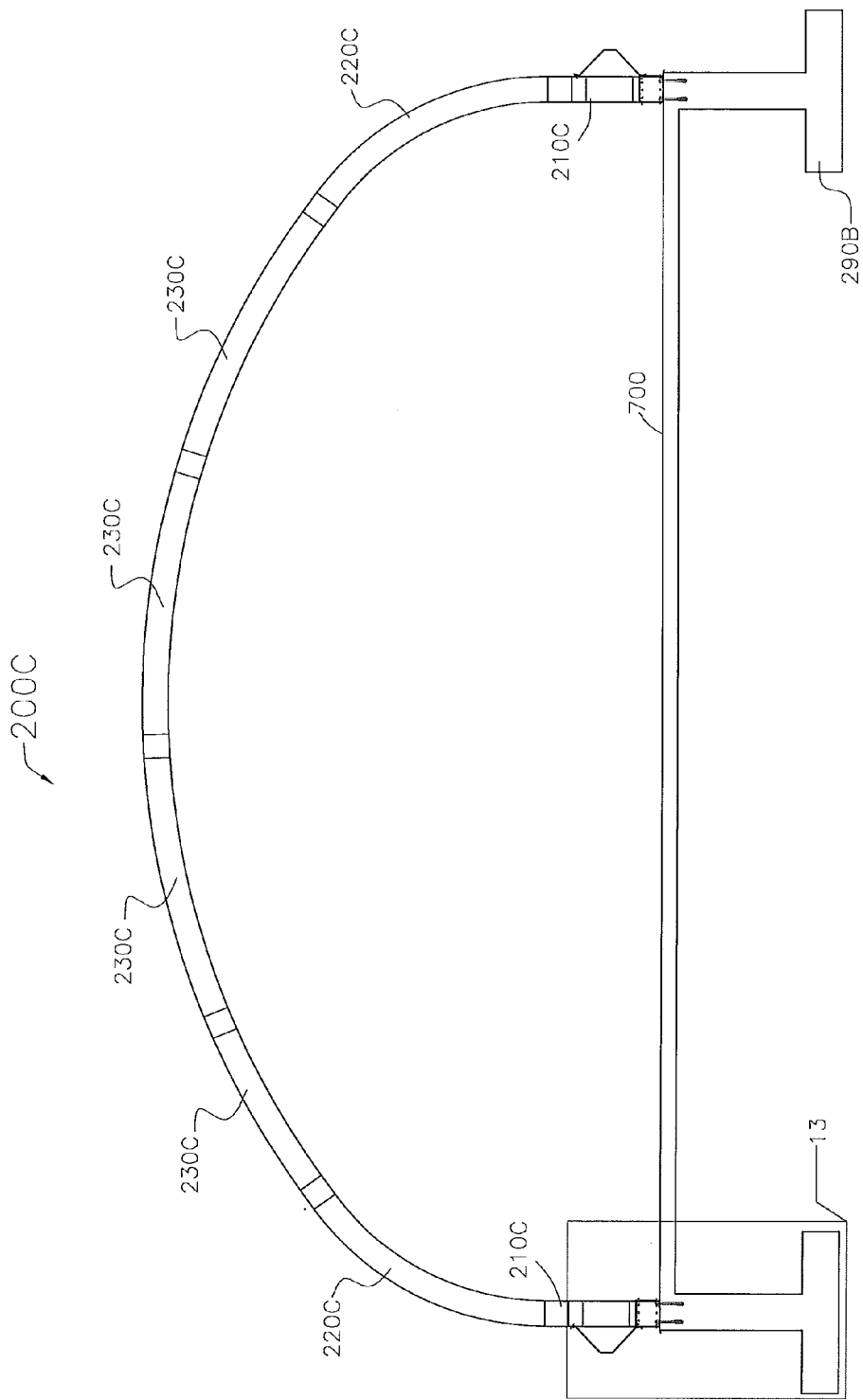
FIG. 55 is an elevation view of a main tornado-resisting system at side vents of the structure of FIG. 50

Shown in FIG. 55 is a main tornado-resisting system 200C of shelter 100C. A main tornado-resisting system 200C is comprised of tornado-resisting side wall panels 210C, eave panels 220C, and roof panels 230C. All of the above tornado-resisting panels have the same trapezoidal cross section of tornado impact-protecting panel 902 but may have varying thicknesses and radii along the long axis of the panels. Each end of a main tornado-resisting system 200C is connected to and supported by a tornado-resisting foundation 290B as illustrated in FIG. 13. All panels of the main tornado-resisting system 200C and all the connections must be designed to withstand ICC 500 specified live loads and tornado wind forces.

FIG. 56 is similar to FIG. 55 except with three floor diaphragm panels 620 and baffled entry wall panels 510 but no side vents 902. The top flange of floor panel 620 is connected to the top flange of floor side channel 622 and the bottom flange of bent plate connector 623 by bolts 685 at $6^{15}/_{16}$ inch spacing. Top flange of bent plate connector 623 is connected to the bottom flanges of each roof panel 230C and eave panel 220C by two bolts 685. Bottom flange of floor side channel 622 is connected to the web of top channel 512 by bolts 585 at $6^{15}/_{16}$ inch spacing. Details of the connections between panel 210C and foundation 290B are illustrated in FIG. 12. Connection between panel 510 and its foundation is shown in FIG. 15.

FIG. 57 is similar to FIG. 56 except wider floor diaphragm and different locations of baffled entry walls.

Figure 58:
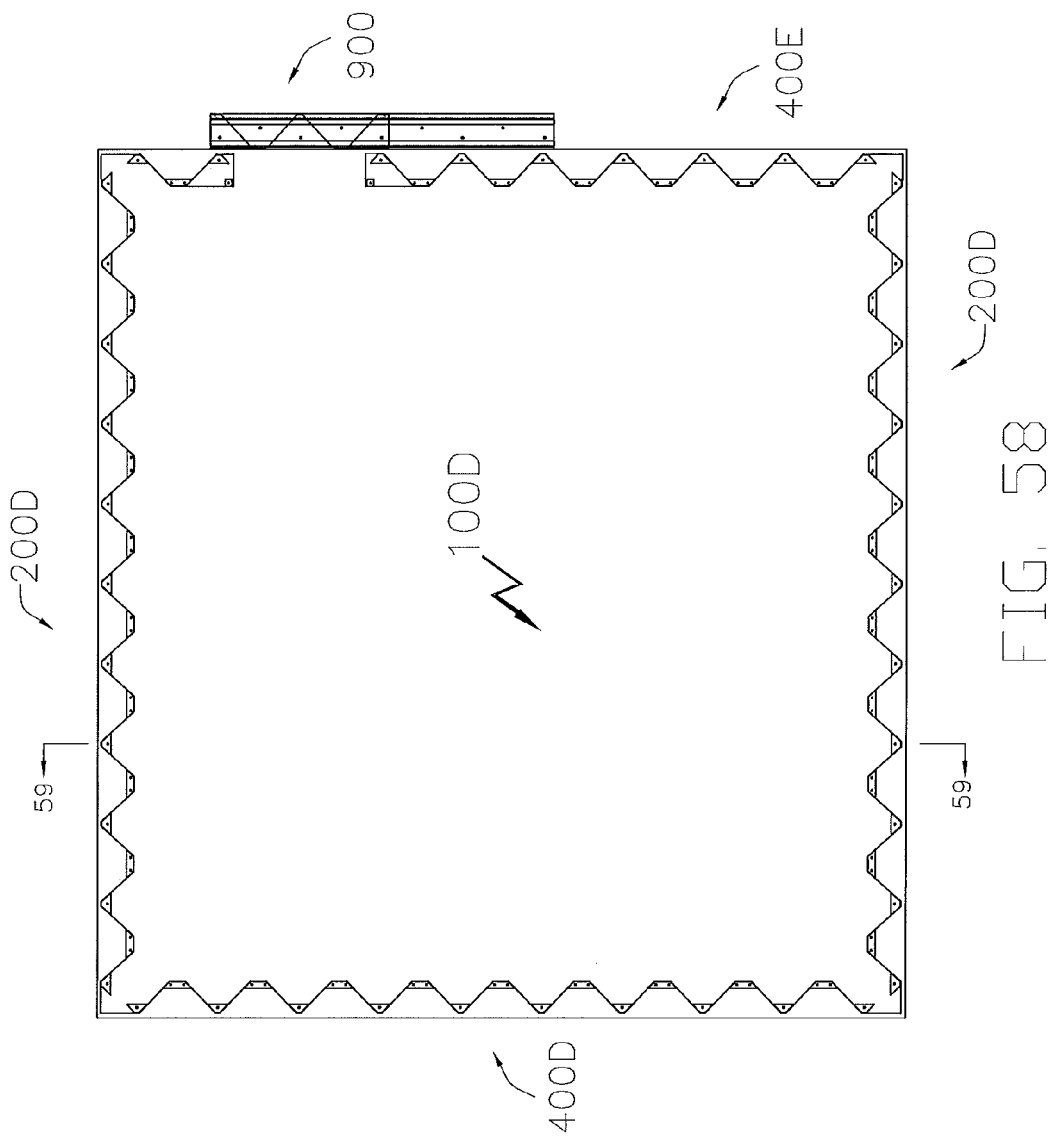
FIG. 58 is a gross plan of a residential tornado shelter structure constructed from a commercial package according to an exemplary embodiment of the invention

FIG. 58 shows a gross plan of an alternative residential tornado shelter structure 100D constructed from a commercial package according to an exemplary embodiment of the current invention. A tornado shelter 100D is comprised of main tornado-resisting systems 200D, tornado-resisting end wall 400D, and tornado-resisting end wall 400E with a sliding tornado impact-protective system 900. More detailed views of shelter 100D are provided in FIGS. 59-70.

Figure 59:
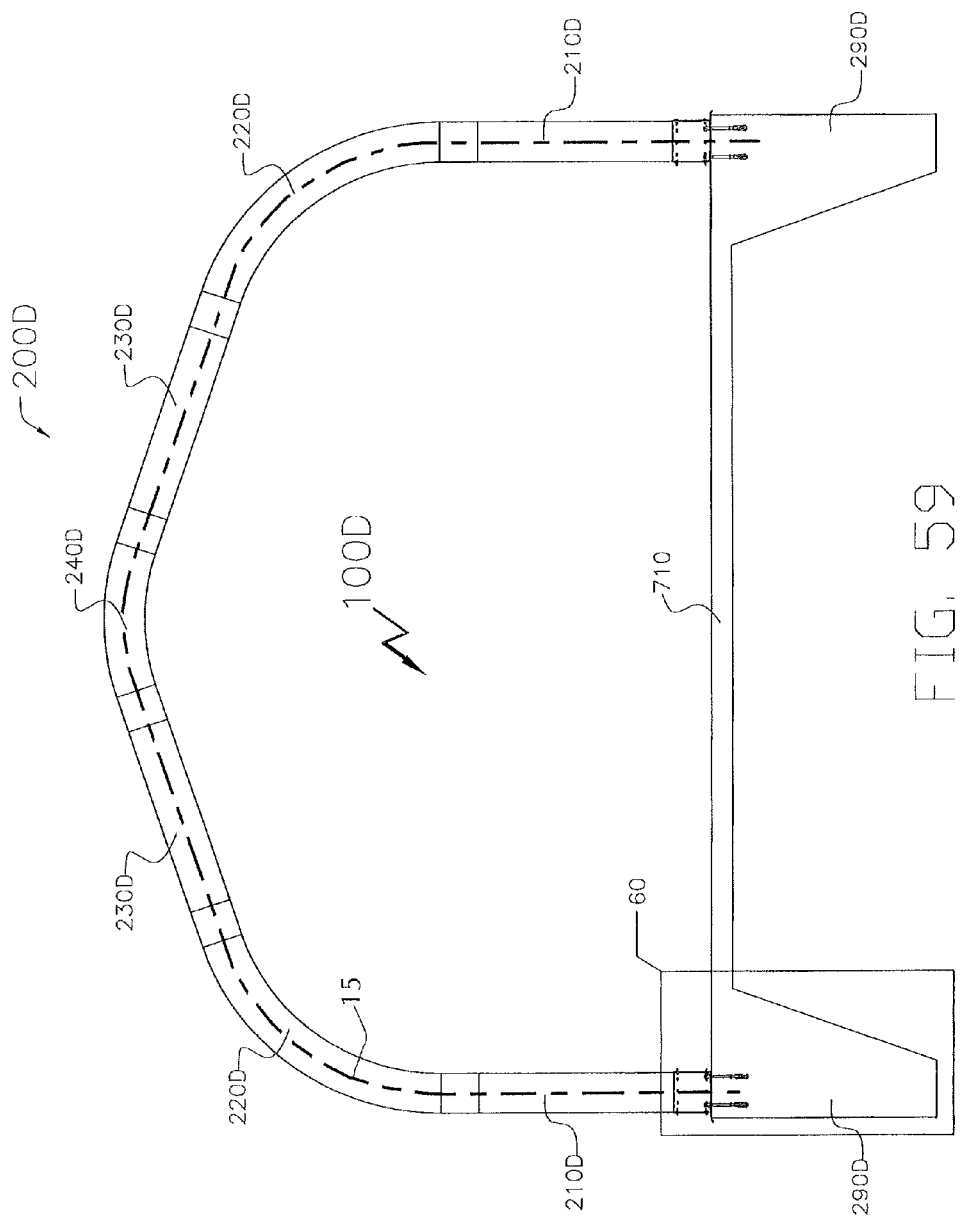
FIG. 59 is an elevation view of a typical main tornado-resisting system of the structure of FIG. 58
Figure 60:
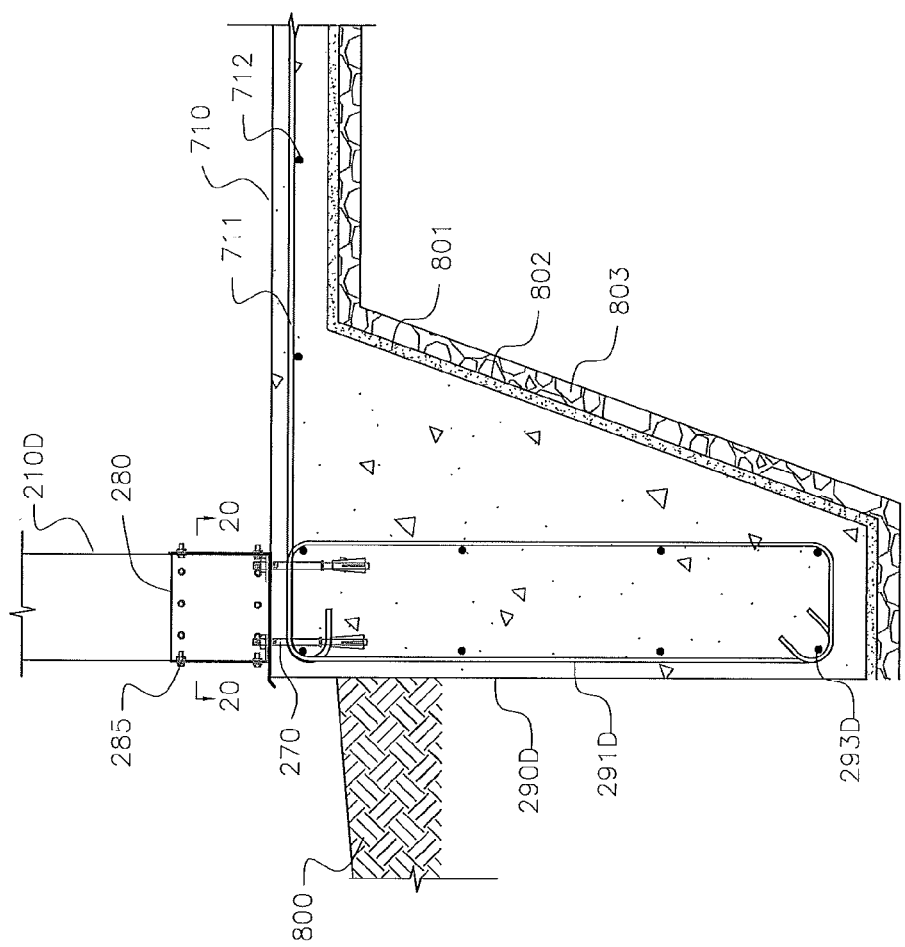
FIG. 60 is a view of a typical connection of a main tornado-resisting system to foundation of the structure of FIG. 58

Shown in FIG. 59 is a main tornado-resisting system 200D of shelter 100D. A main tornado-resisting system 200D is comprised of tornado-resisting side wall panels 210D, eave panels 220D, roof panels 230D, and peak panel 240D. All of the above tornado-resisting panels have the same trapezoidal cross section of tornado impact-protecting panel 902 but may have varying thicknesses and radii along the long axis or centerline 15 of the panels. Each end of a main tornado-resisting system 200D is connected to and supported by a tornado-resisting foundation 290D as illustrated in FIG. 60. All panels of the main tornado-resisting system 200D and all the connections must be designed to withstand ICC 500 specified live loads and tornado wind forces.

FIG. 60 is a view of a typical connection of a main tornado-resisting system 200D to its foundation 290D of shelter 100D. Bottom end of a tornado-resisting panel 210D is connected to tornado-resisting connector 280 by 20 connection bolts 285 in two rows. Details of connector 280 are illustrated in FIG. 20. Connector 280 is connected to foundation 290D by 4 anchors 270. Tornado-resisting foundation 290D is reinforced by vertical reinforcements 291D and longitudinal reinforcements 293D. Top of foundation 290D is connected to slab 710 that is reinforced with transverse reinforcements 711 and longitudinal reinforcements 712. Foundation 290D must have enough weight to resist the uplift forces from the ICC 500 specified tornado wind forces. Foundation 290D and anchors 270 must be designed based on the structural requirements of ACI 318. Shown in FIG. 60 are also soil 800, a layer of sand 801, vapor barrier 802, and a layer of crushed stone 803.

Figure 61:
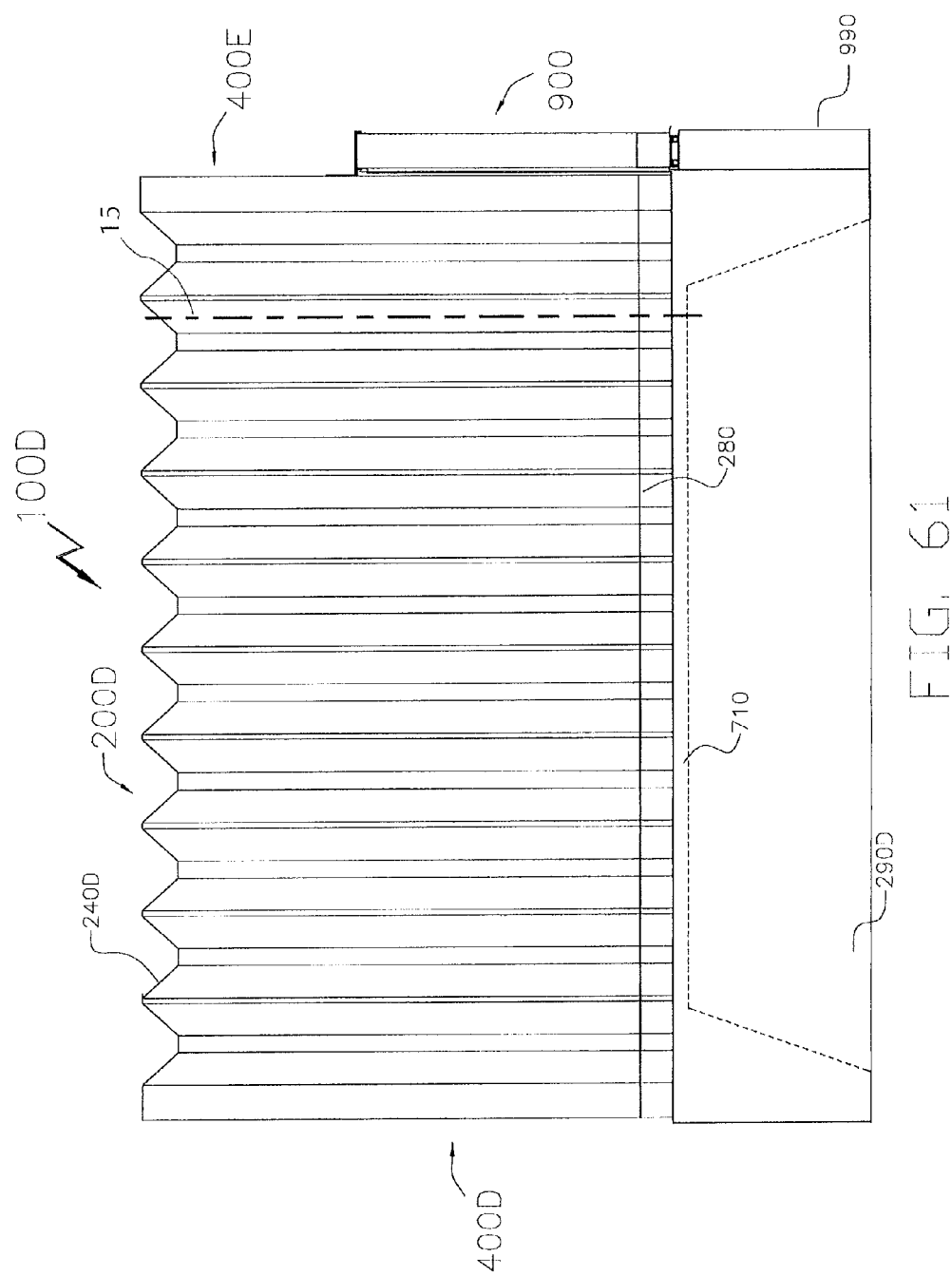
FIG. 61 is a side elevation view of the structure of FIG. 58

FIG. 61 shows a side elevation view of shelter 100D. Main tornado-resisting systems 200D serve as all of the side wall, roof, and side envelope of shelter 100D. The main tornado-resisting systems 200D are connected to Tornado-resisting foundation 290D by tornado-resisting connectors 280. Shown in FIG. 61 are also side elevation views of the tornado impact-resisting system 900 and its foundation 990.

Figure 62:
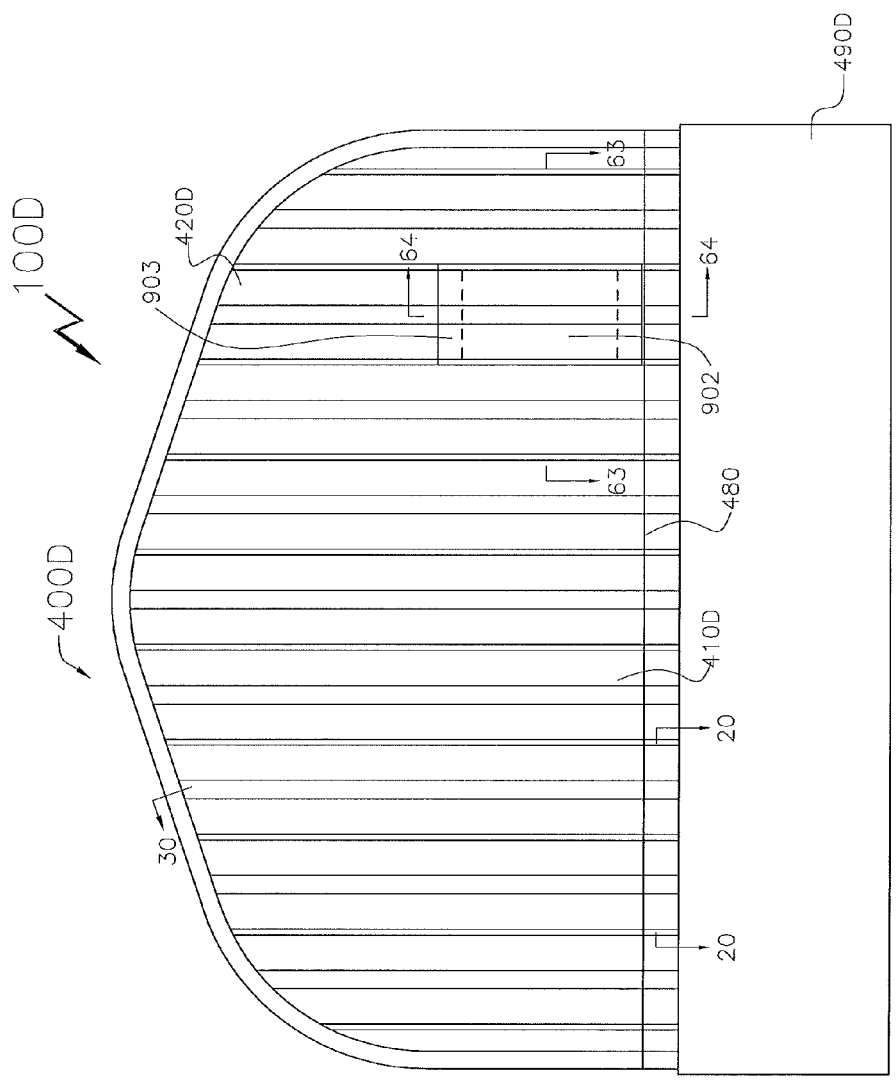
FIG. 62 is an elevation view of the rear end wall of the structure of FIG. 58

A tornado-resisting end wall 400D of shelter 100D is illustrated in FIG. 62. The main components of end wall 400D include typical tornado-resisting end wall panels 410D, tornado-resisting end wall panel 420D above emergency escape opening 902, and tornado-resisting end wall connector 480. All of these main end wall components and end wall foundation 490D must be strong enough to withstand the ICC 500 required tornado wind pressures and debris missile impacts. Typical connection between a main tornado-resisting system panel and the top end of an end wall panel is shown in FIG. 30. A cross section plan view of the tornado-resisting end wall connector 480 is shown in FIG. 20. An emergency escape opening 902 and its tornado impact-protective system 903 are also shown in FIG. 62. Cross section plan and elevation views of opening 902 and system 903 are provided in FIGS. 63 and 64.

Figure 63:
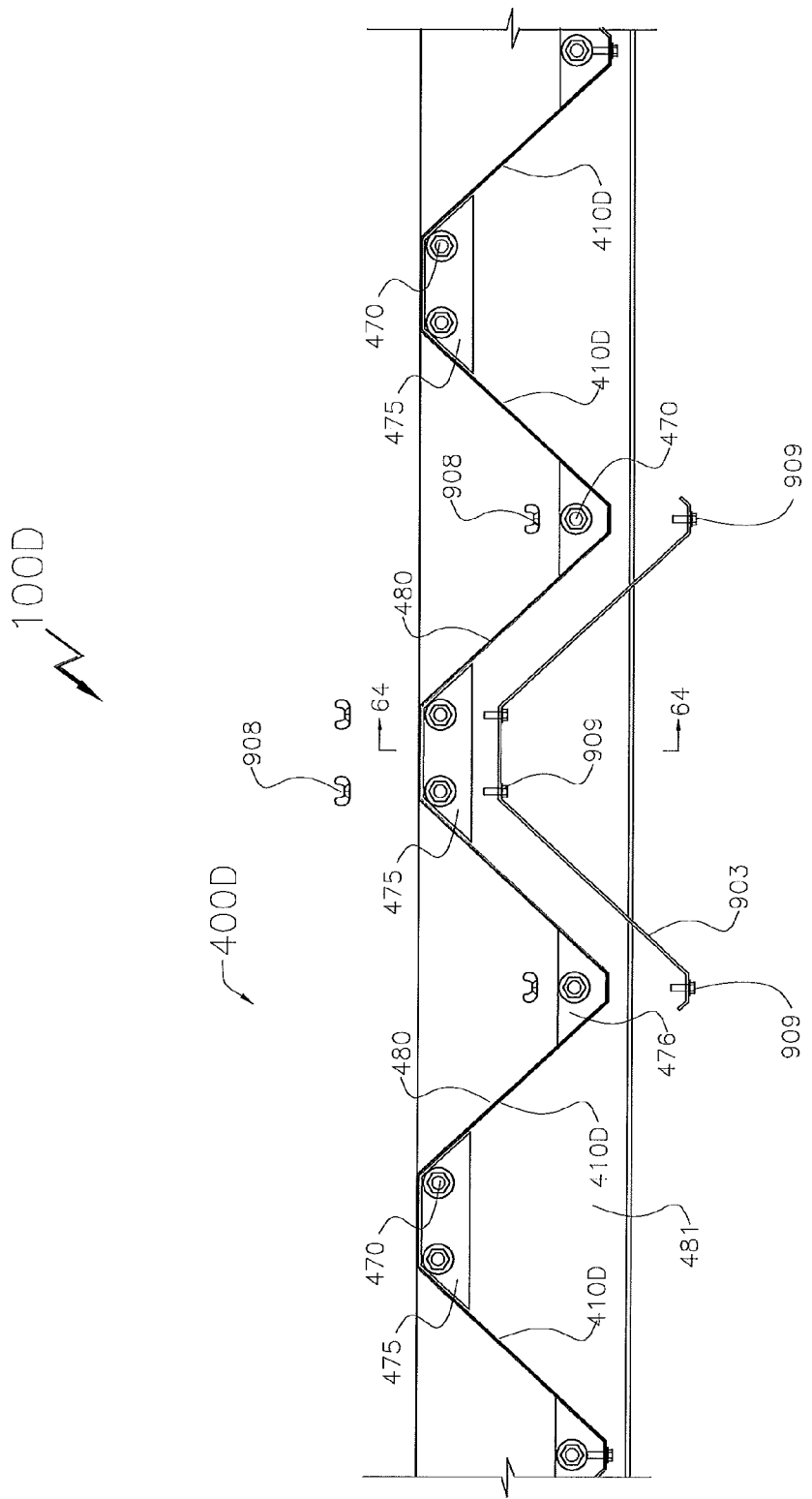
FIG. 63 is a cross section plan view of a tornado-resisting emergency escape opening within the structure of FIG. 58

FIG. 63 is a cross section plan view of a tornado emergency escape opening and its tornado impact-protective system 903. The escape opening is protected from tornado debris missiles by the tornado-resisting cover panel 903. The escape opening width is defined by the horizontal clear distance between the lips of the two end wall panels 410D on both sides of panel 903. Panel 903 is connected to the tornado-resisting end wall panels 410D on both sides and below of opening 902 and the end wall panel 420D above opening 902 by bolts 909 and wing nuts 908. The occupants can remove wing nuts 908 by hand from the inside of shelter 100D, push out panel 903, and get out of shelter 100D from opening 902. Bolts 909 are fixed to panel 903 to prevent their rotation while removing wing nuts 908. Shown in FIG. 63 are also the end wall tornado-resisting connectors 480, tornado-resisting washers 475 and 476, and anchors 470.

Figure 64:
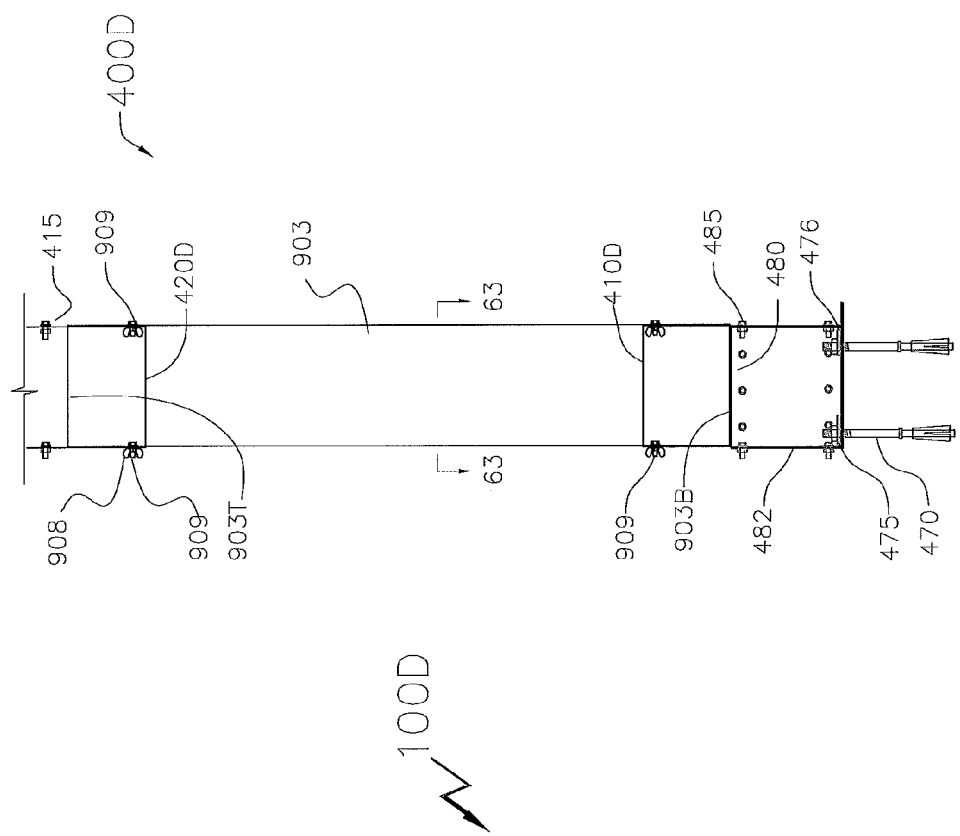
FIG. 64 is a vertical section view of a tornado-resisting emergency escape opening within the structure of FIG. 58

Shown in FIG. 64 is a vertical section view of the emergency escape opening and its tornado impact-protective system 903. The vertical height of the emergency escape opening is defined by the vertical clear distance from the top edge of panel 410D below the opening to the bottom edge of panel 420D above the opening. Tornado-resisting panel 903 covers the escape opening from the exterior face of shelter 100D. The top and bottom edge of panel 903 is marked as 903T and 903B, respectively. Panel 903 is connected to panels 410D and 420D by bolts 909 and wing nuts 908. The tornado-resisting end wall base connector 480, tornado-resisting washers 475 and 476, and anchors 470 are also shown in FIG. 64.

Figure 65:
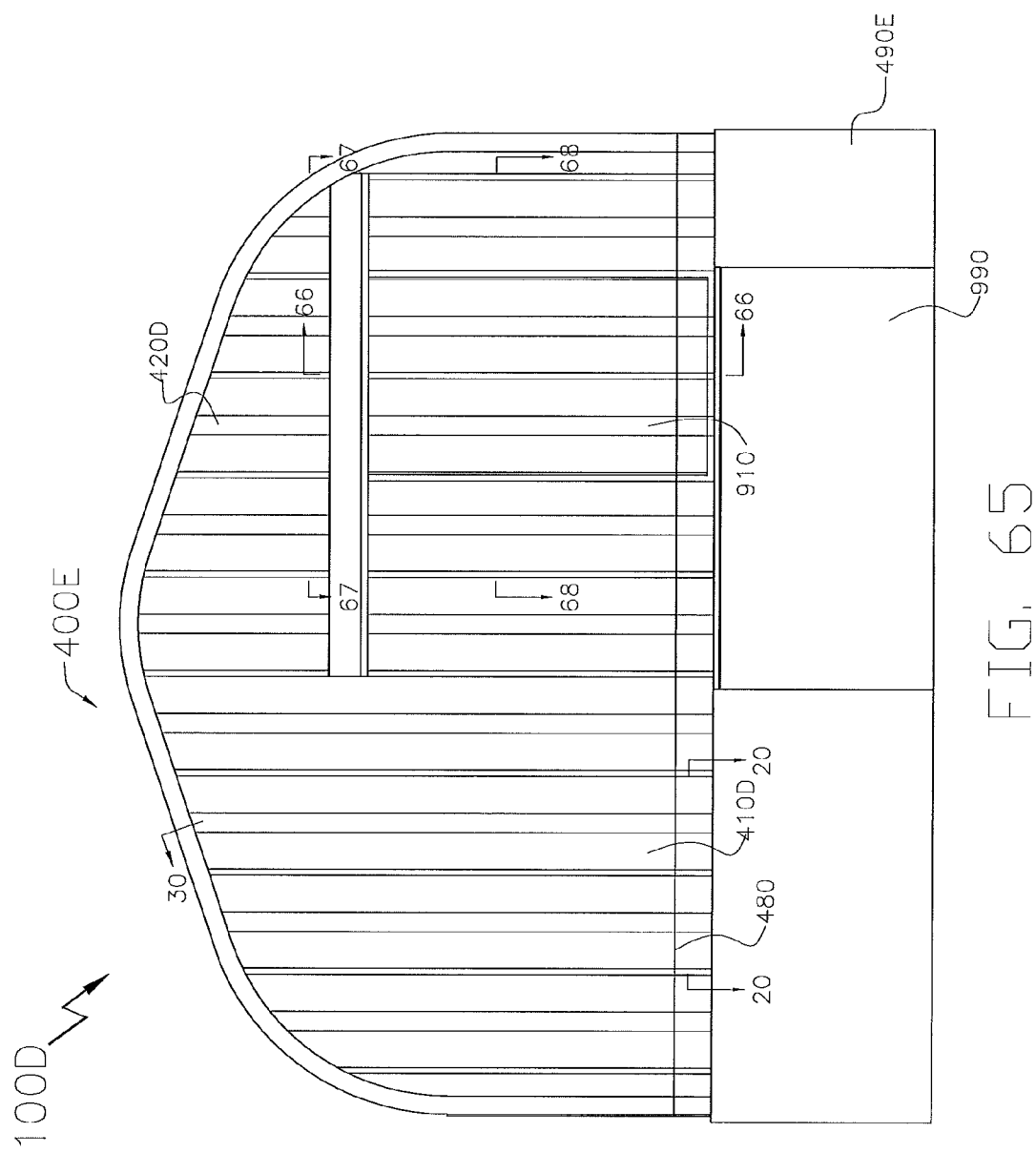
FIG. 65 is an elevation view of the front end wall of the structure of FIG. 58

A tornado-resisting end wall 400E of shelter 100D is illustrated in FIG. 65. The main components of end wall 400E include typical tornado-resisting end wall panels 410D, tornado-resisting end wall panel 420D above opening, tornado impact-protective system 900, and tornado-resisting end wall connector 480. All of these main end wall components and foundations 490E and 990 must be strong enough to withstand the ICC 500 required tornado wind pressures and debris missile impacts. Typical connection between a main tornado-resisting system panel and the top end of an end wall panel is shown in FIG. 30. A cross section plan view of the tornado-resisting end wall connector 480 is shown in FIG. 20. A tornado impact-protective system for the door opening is also shown in FIG. 65, together with locations of the its cross section plan and elevation views of FIGS. 66-68.

Figure 66:
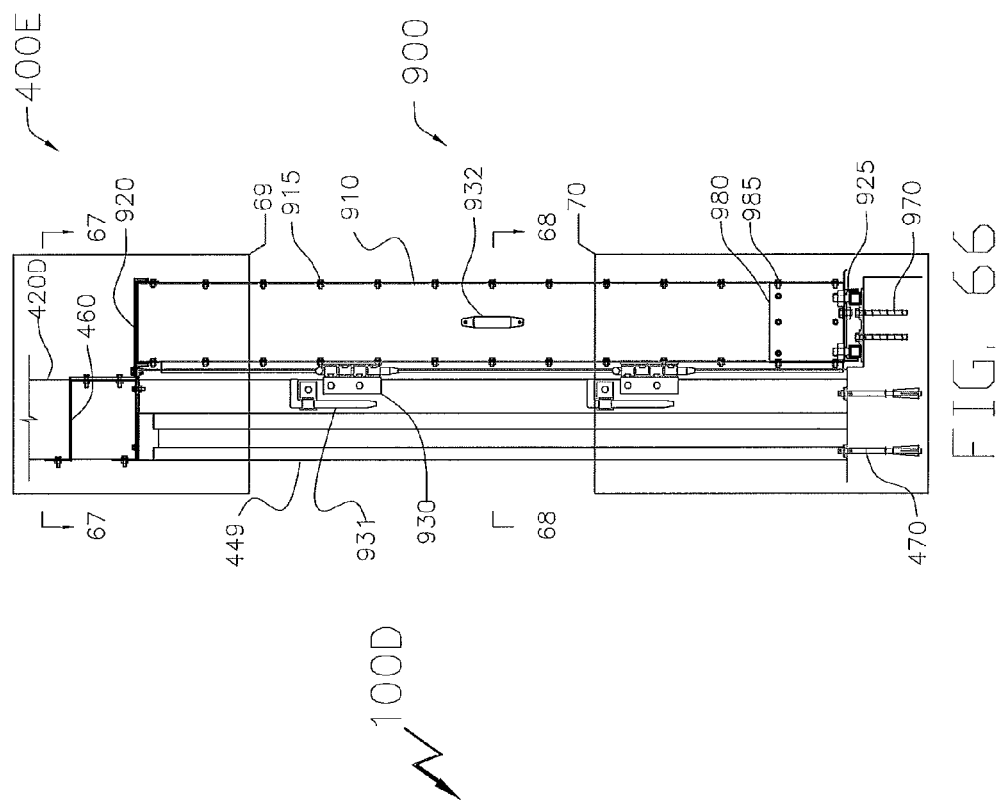
FIG. 66 is a vertical section view of a tornado impact-protective system of the structure of FIG. 58
Figure 67:
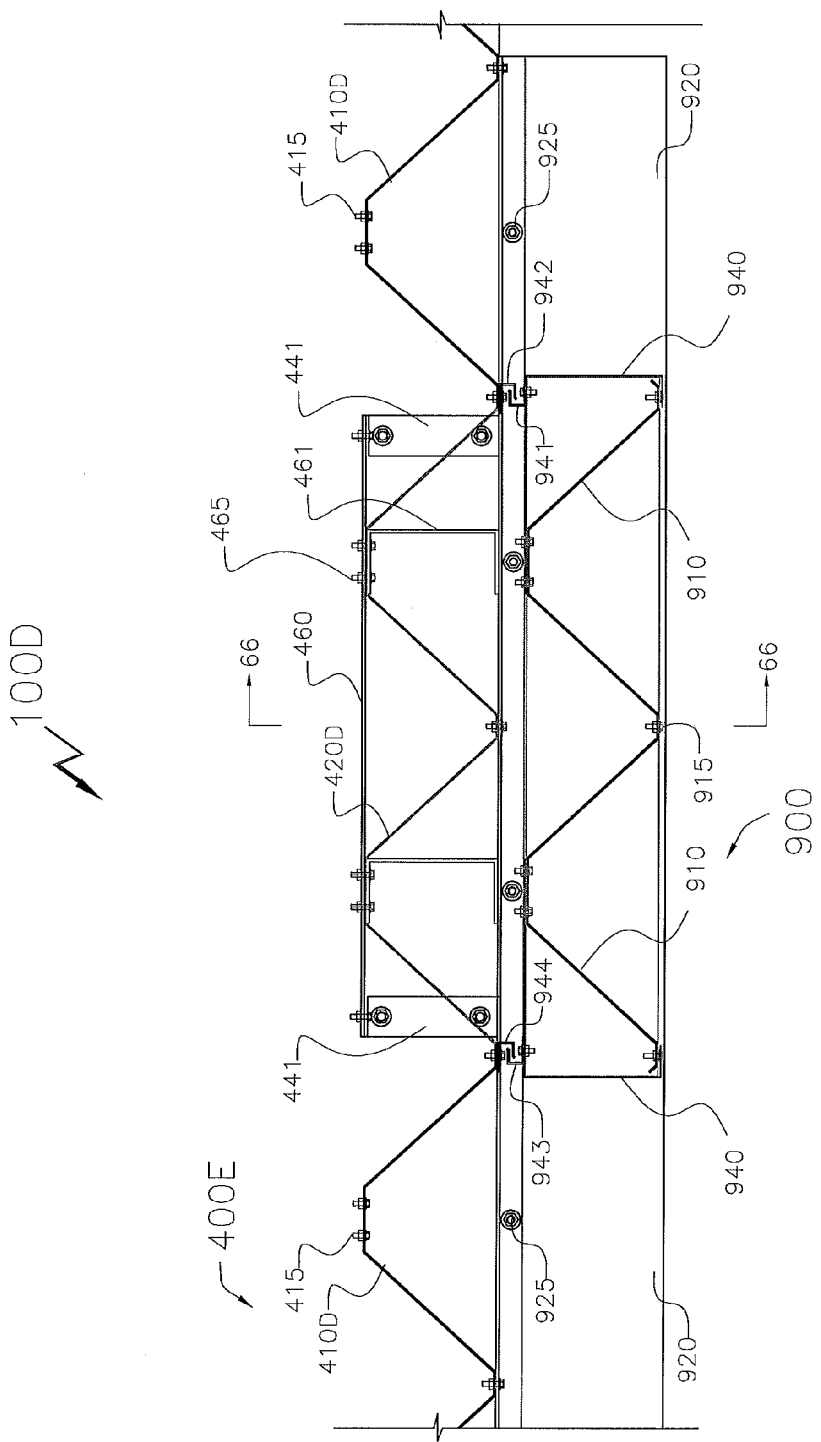
FIG. 67 is a cross section plan view at the top of a tornado impact-protective system of the structure of FIG. 58
Figure 68:
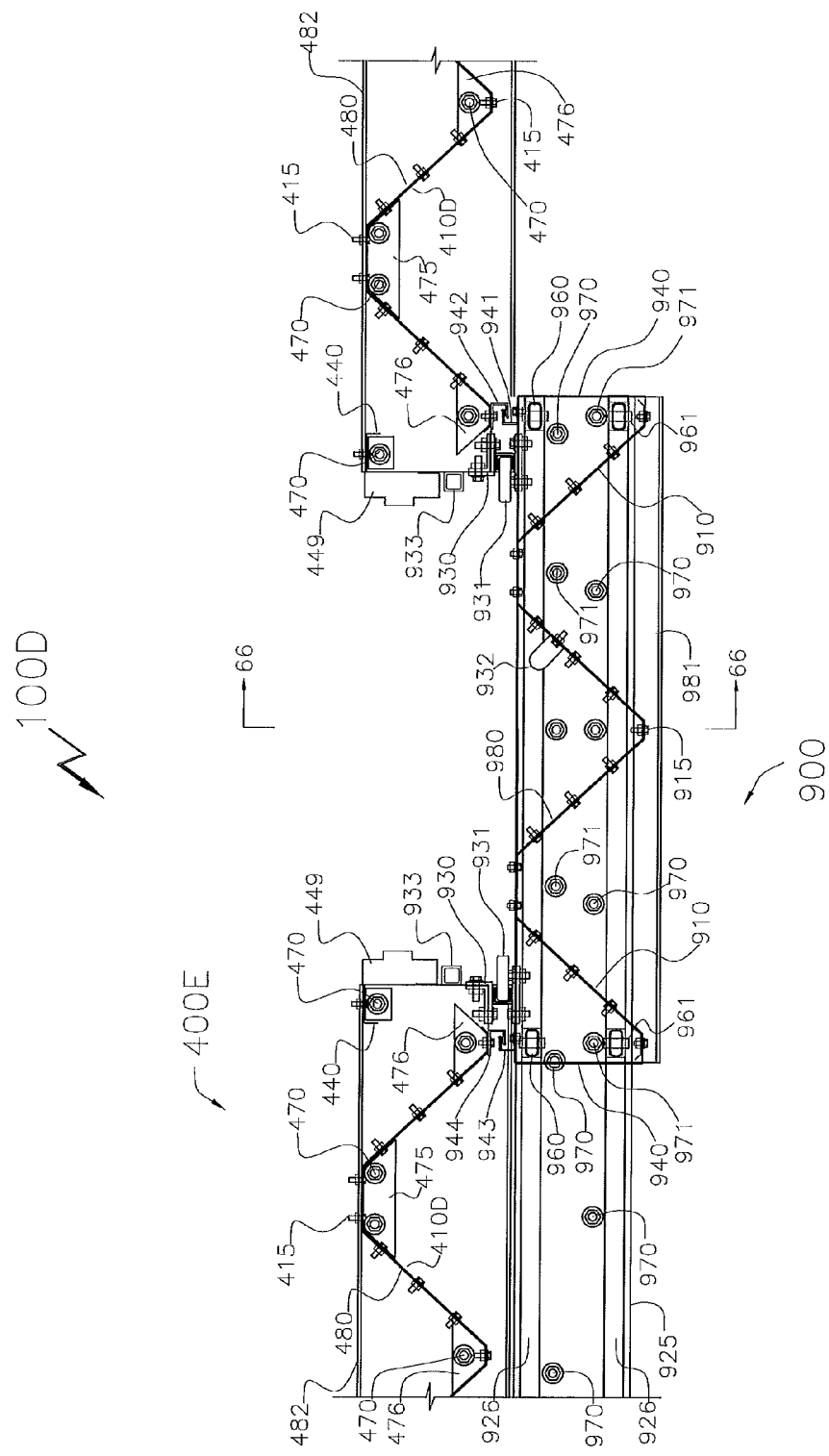
FIG. 68 is a cross section plan view at the middle height of a tornado impact-protective system of the structure of FIG. 58
Figure 69:
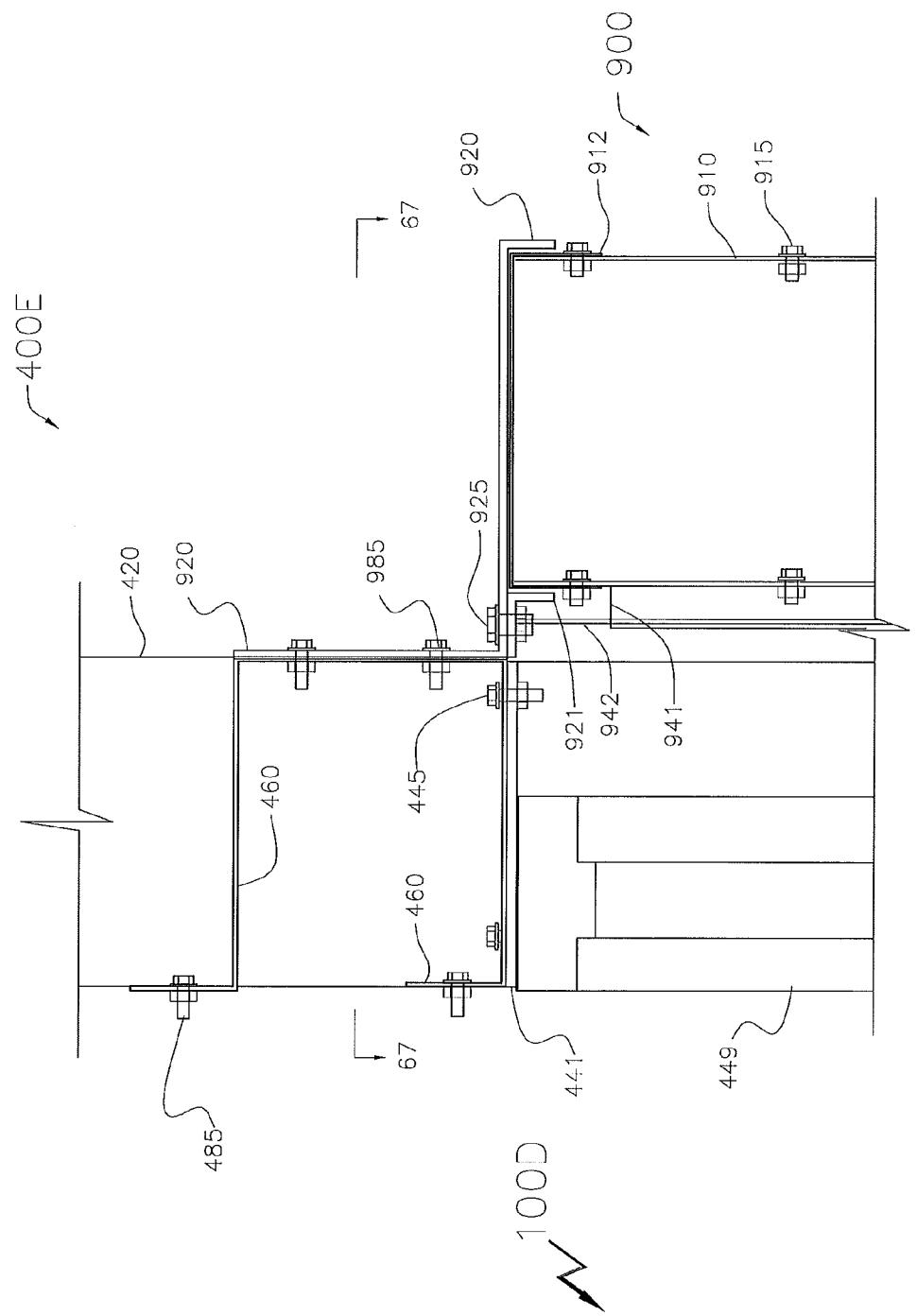
FIG. 69 is a vertical section view at the top of a tornado impact-protective system of the structure of FIG. 58
Figure 70:
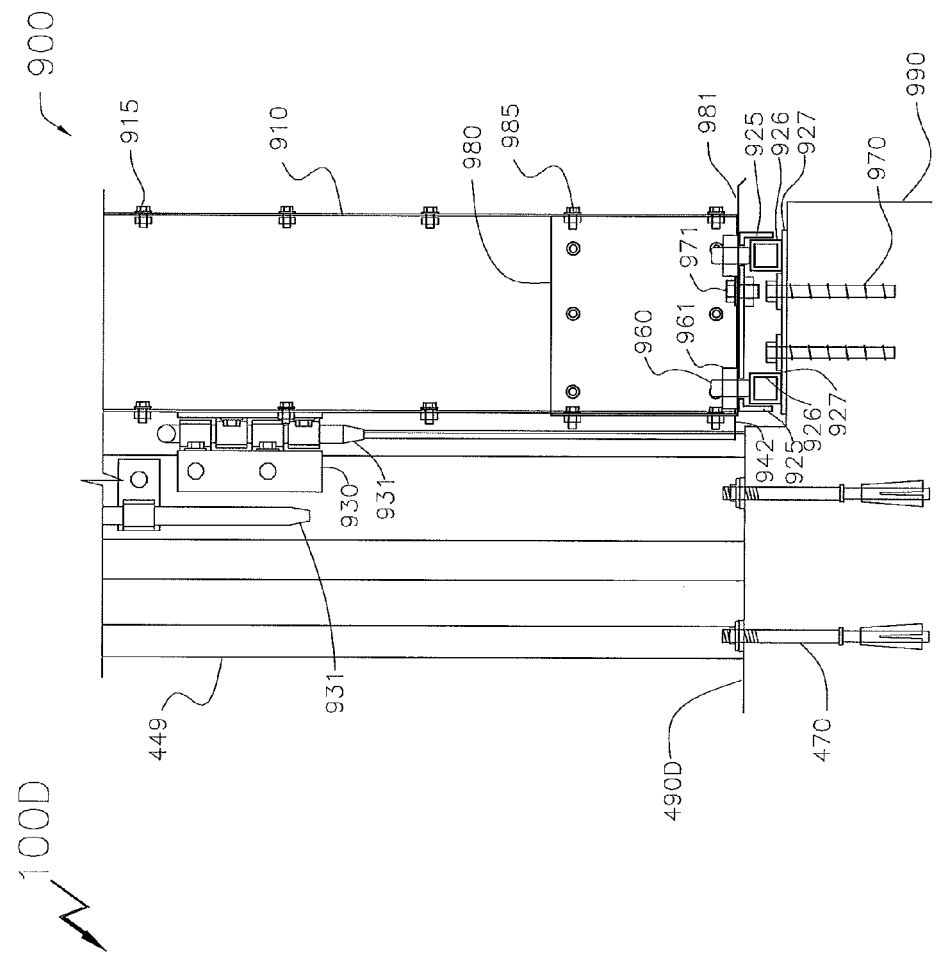
FIG. 70 is a vertical section view at the bottom of a tornado impact-protective system of the structure of FIG. 58

FIG. 66 is a vertical section view of a tornado impact-protective system 900 for an opening of shelter 100D. Although a door opening is illustrated in FIGS. 66-70, system 900 or an alternative system can also be used to protect other openings such windows or skylights. Main components of system 900 include a moving tornado impact-protective system, top guide system, bottom guide system, and locking system as shown in more details in FIGS. 67-70. During a tornado event, the moving protective system is moved to and locked in front of the opening and thus protect the shelter occupants from the tornado wind forces and debris missiles. The top guide system, detailed in FIGS. 67 and 69, provides out of plan structural supports to the top end of the moving protective system. The top guide system also prevents the moving protective system from being lifted out off the guides. The bottom guide system, detailed in FIGS. 68 and 70, provides out of plan structural support to the bottom end of the moving protective system. The bottom guide system and foundation 990 provide also vertical supports for compressive forces from the moving protective system. Handle 932 is connected to the inside face of a panel 910 and may be used by an occupant from inside of shelter 100D to move the moving protective system in the guides. Lock pins 931 are used to lock the moving protective system in front of the opening.

Shown in FIG. 67 is a cross section plan view at the top of a tornado impact-protective system 900 of shelter 100D. Connector beam 460 supports panels 420D above the opening and tie panels 410D on both sides of opening together. Beam 460 is stiffened by vertical short stub channels 461 between its bottom and top flanges. Each end of beam 460 is bolted to the top cap plate 441 of post 440. Exterior flange of Post 440 is connected to the exterior flange of panel 410D and interior leg of inner seal angle 942 or 944 by bolts 415 at 6$^{15}/_{16}$ inch spacing. The exterior leg of outer seal angle 941 or 943 is connected to the interior flange of end post 940 of moving protective system 900 by bolts 915 at 6$^{15}/_{16}$ inch spacing. The exterior leg of post 940 is connected to the exterior flange of panel 910 by bolts 915 at 6$^{15}/_{16}$ inch spacing. The exterior flanges of panels 910 are overlapped and connected also by bolts 915 at 6$^{15}/_{16}$ inch spacing. The vertical interior leg of top guide beam 920 is bolted to the exterior flanges of panels 410D and 420D. Locations of bolt 925 in beam 920 length direction are shown in FIG. 67 with more details shown in FIG. 69. Beam 920 and the connections must be strong enough to withstand the ICC 500 required tornado wind forces, moments and debris missile impacts.

FIG. 68 is cross section plan view at the middle height of tornado impact-protective system 900 of shelter 100D. Handle 932 is bolted to the interior face of the web of panel 910 so that it can be used by occupants inside of shelter 100D and will not interfere with the movement of moving protective system 900, especially with seal angle 944. Portions of seal angles 941 and 944 shall be notched to clear lock hinges 930 so that the moving protective system can be moved to the fully locked and opened positions. Lock pins 931 are shown at the closed position. When the protective system is moved away from the closed position, the lock pins 931 shall be stored in the lock pin holders 933. One half of lock 930 is illustrated as two hollow steel sections welded to a bent steel plate that is bolted to the exterior flange and web of post 440. The other half of lock 930 is made of two hollow steel sections welded to a steel plate that is bolted to the interior flange of post 940 at a height matching the first half of lock 930 so that lock pin 931 can be placed within all of the 4 hollow steel sections and lock them together. Multiple locks 930 are used for each moving protective system so that the occupants are protected even if one or two locks are damaged by tornado debris missiles.

Shown in FIG. 68 are also plan views of the bottom platform and guide system of the moving protective system. The bottom platform includes tornado-resisting base connector 980 connected to the web of a horizontal base channel 925 by bolts 971. The bottom guide system is comprised two full length hollow steel sections 926 welded to the top face of a full length steel plate 927 that is secured to foundation 990 by anchors 970. Minimum 4 ball bearings 960 are secured to base channel 925 through steel bars 961. Since the ball bearings run smoothly on top of the hollowing steel sections 926, the moving protective system can be moved into and out of the locked position easily.

As also shown in FIG. 68, panels 410D shall be bolted to the exterior faces of connectors 480. Ordinary door or window frames 449 may be used together with economical non-tornado rated door or window year-round, because they are protected during tornado events by the moving protective system. Shown in FIG. 68 are also end wall posts 440, tornado-resisting washers 475-476, and anchors 470.

FIG. 69 is a vertical section view at the top of the moving tornado impact-protective system 900 in end wall 400E of shelter 100D. End wall panel 420D above the opening is connected to the top flange of connector beam 460 by bolts 485. Bottom flange of beam 460 is connected to the top cap plate 441 of post 440 by bolts 445. Top flange of bent plate steel beam 920 is connected to the exterior web of beam 460 by bolts 985. Bottom flange of beam 920 prevents the top end of panel 910 and cap channel 912 from pulled out of the top guide system. Web of beam 920 stops potential upward movement of the moving protective system. Potential inward lateral movement of top channel 912 is restrained by full length steel angle 921 that is secured to beam 920 by bolts 925. Vertical seal angles 941 and 942 are also shown in FIG. 69.

Shown in FIG. 70 is a cross section vertical view of the lower portion of the moving tornado impact-protective system 900 of shelter 100D. Tornado-resisting panels 910 are connected to the base connector 980 by 20 bolts 985 in two rows. Bottom plate 981 of base connector 980 is secured to the web of base connector 925 by short bolts 971. Ball bearings 960 are secured to the web of base channel 925 through steel bars 961. Ball bearings 960 run on top face of hollow steel sections 926 that are welded to top face of base steel plate 927. Anchors 970 are used to connect base plate 927 to foundation 990. The two flanges of base channel 925 and the two hollow steel sections 926 are used to prevent any out of plan movements while allow free longitudinal travelling of the moving protective system. Lock 930 and lock pin 931 are also shown in FIG. 70, together with end wall anchors 470 and ordinary opening frame 449.

Figure 71:
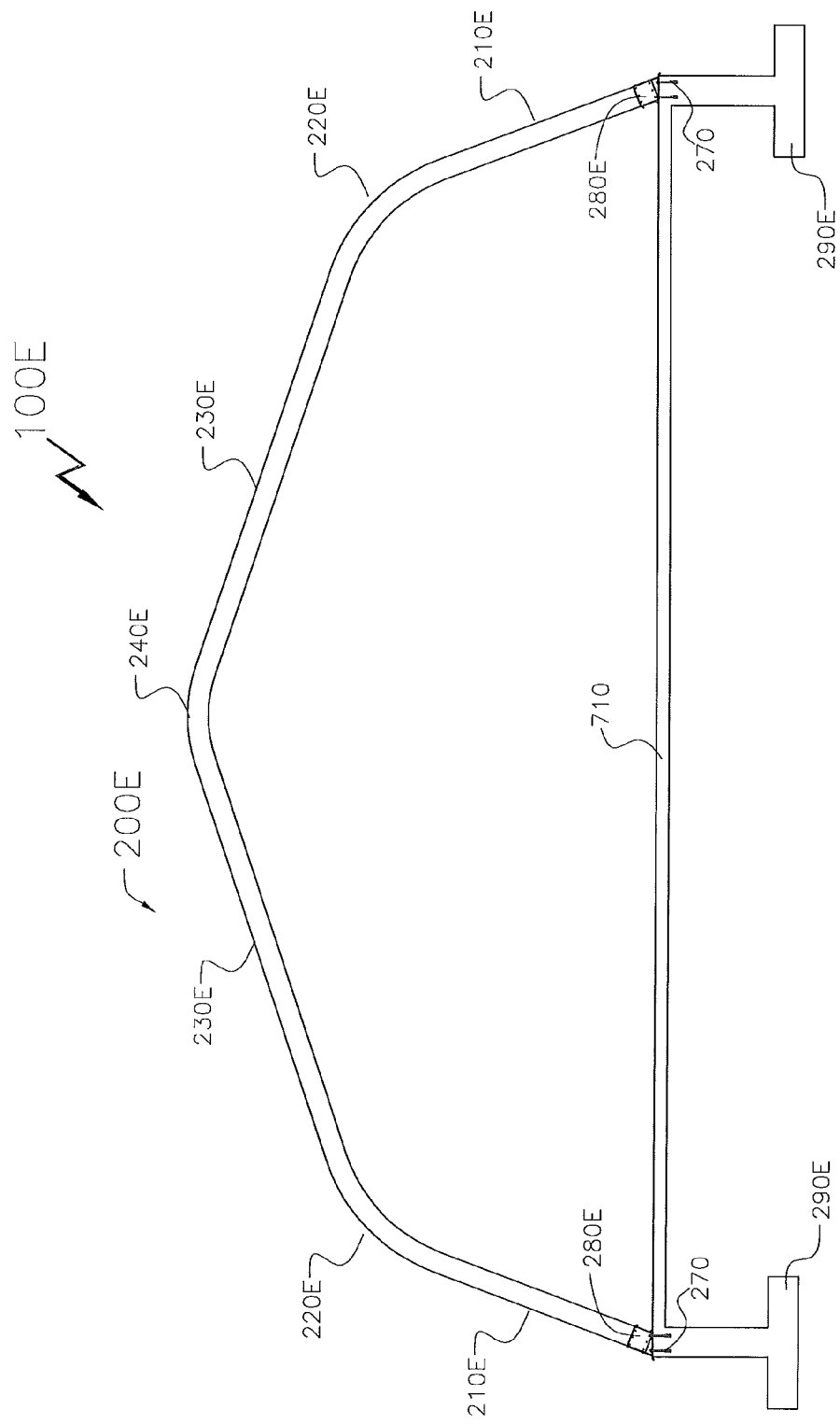
FIG. 71 is a view of an alternative shape with sloped walls of a main tornado-resisting system constructed from a commercial package according to an exemplary embodiment of the invention

An alternative main tornado-resisting system 200E is shown in FIG. 71 for a tornado shelter 100E. A system 200E is comprised of inclined wall panels 210E, eave panels 220E, roof panels 230E, and peak panel 240E. All of the above tornado-resisting panels have the same trapezoidal cross section of tornado impact-protecting panel 902 but may have varying thicknesses and radii along the long axis of the panels. Each end of a main tornado-resisting system 200E is connected to tornado-resisting foundation 290E through tornado-resisting base connector 280E and anchors 270. All panels of the main tornado-resisting system 200E and all the connections must be designed to withstand ICC 500 specified live loads and tornado wind forces.

Figure 72:
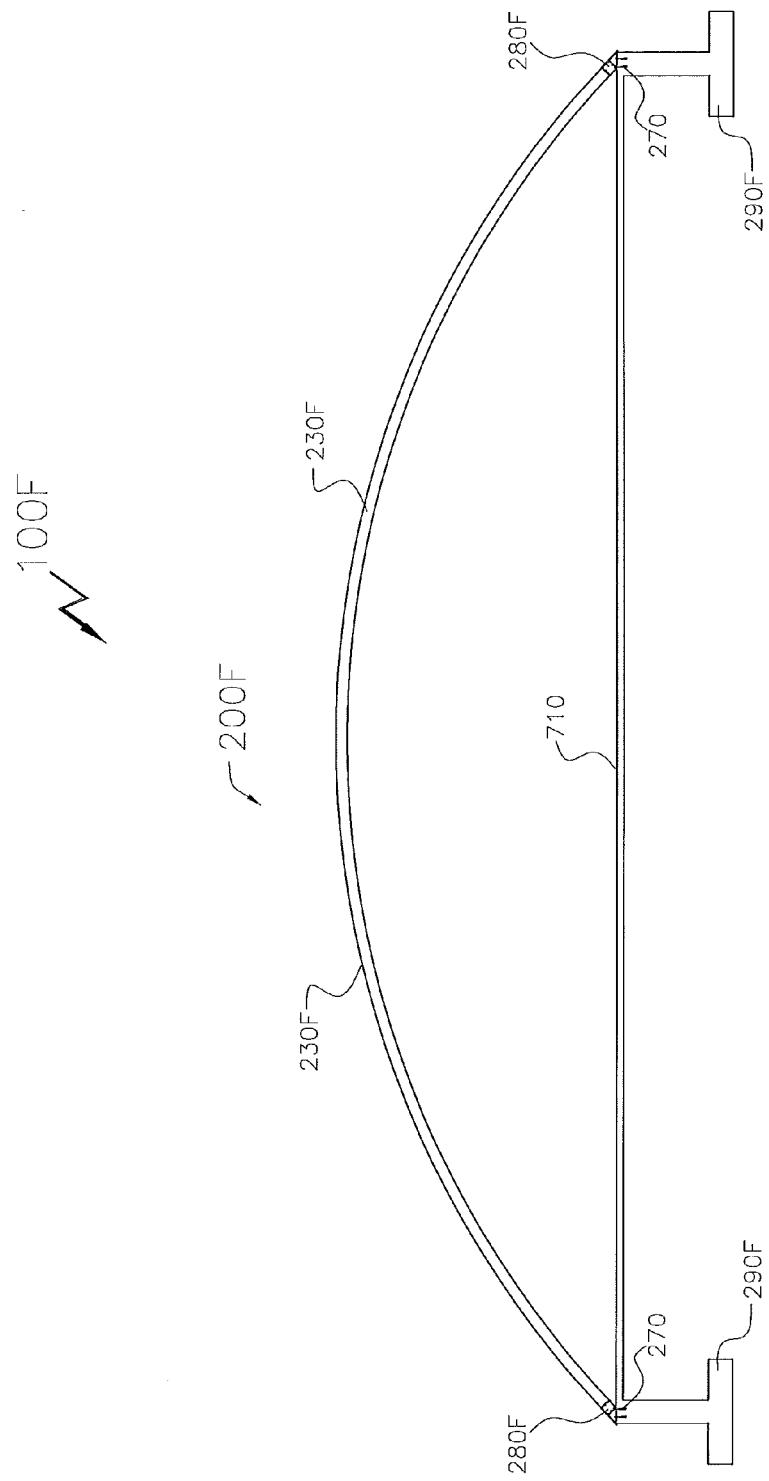
FIG. 72 is a view of an alternative shape of all curved panels of a main tornado-resisting system constructed from a commercial package according to an exemplary embodiment of the invention

Shown in FIG. 72 is an additional alternative main tornado-resisting system 200F for a tornado shelter 100F. A system 200F is comprised of tornado-resisting panels 230F of the same radius and the same trapezoidal cross section of panel 902. Each end of a main tornado-resisting system 200F is connected to tornado-resisting foundation 290F through tornado-resisting base connector 280F and anchors 270. All panels of the main tornado-resisting system 200F and all the connections must be designed to withstand ICC 500 specified live loads and tornado wind forces.

A further alternative main tornado-resisting system 200G is shown in FIG. 72 for a tornado shelter 100G. A system 200G is comprised of eave panels 220G and roof panel(s) 230G, but wall panel(s) 210G on only one side. The lower end of system 200G is connected to tornado-resisting foundation 290D through tornado-resisting base connector 280 and anchors 270. The upper end of system 200G is connected to structural support 299G through connector 280G and anchors 270. All panels of system 200G, foundations 290D and 290G, structural support 299G, and all the connections must be designed to withstand ICC 500 specified live loads and tornado wind forces.

Figure 73:
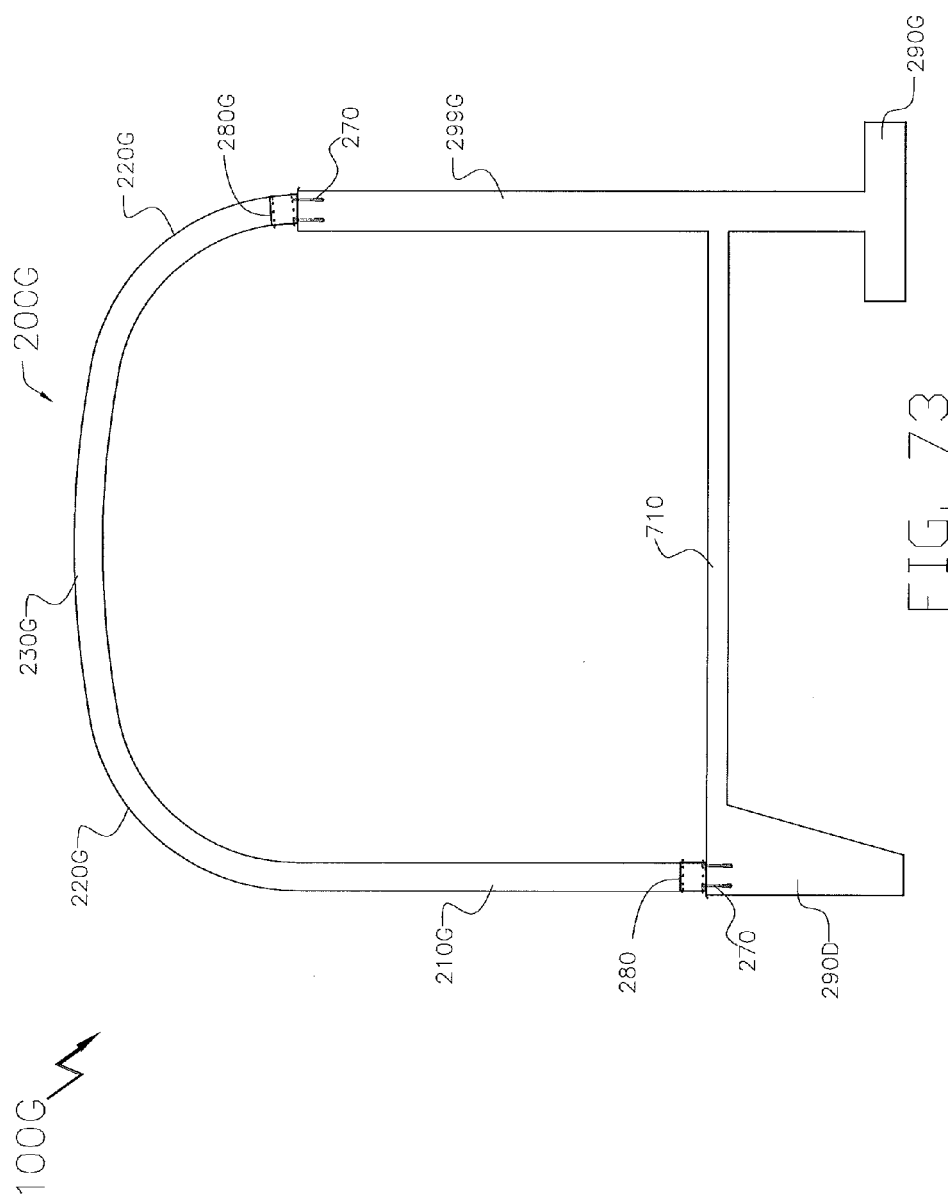
FIG. 73 is a view of an alternative shape with a portion of a main tornado-resisting system constructed from a commercial package according to an exemplary embodiment of the invention
Figure 74:
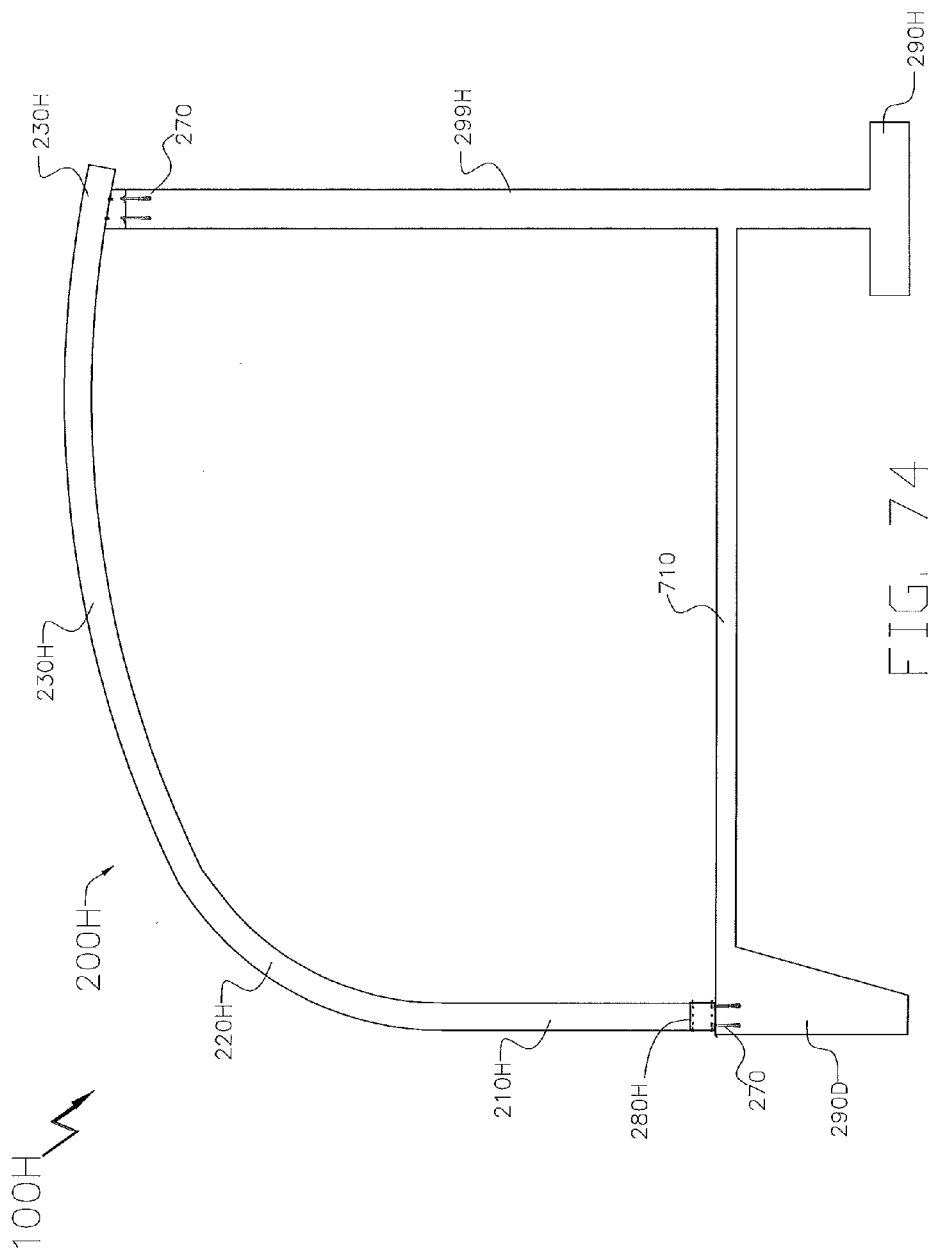
FIG. 74 is a view of an alternative shape with different side heights of a main tornado-resisting system constructed from a commercial package according to an exemplary embodiment of the invention

Shown in FIG. 74 is an additional type of main tornado-resisting system 200H for a tornado shelter 100H. System 200H contains only a portion of an otherwise full symmetrical system. The upper end of system 200H may directly sit on or extend pass the structural support 299H. The rest of FIG. 74 is similar with FIG. 73.

Figure 75:
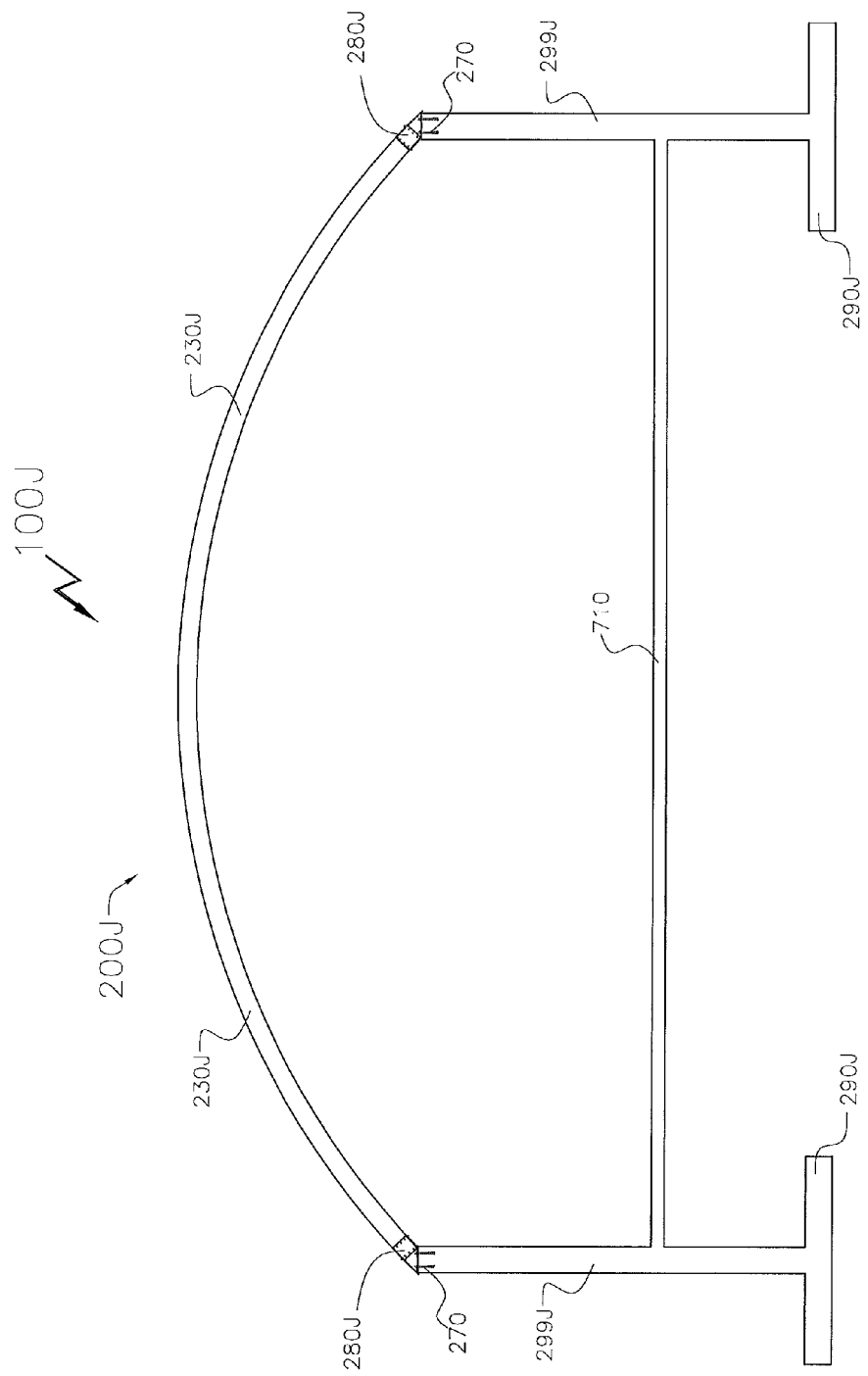
FIG. 75 is a view of an alternative shape of an elevated main tornado-resisting system constructed from a commercial package according to an exemplary embodiment of the invention

An additional type of main tornado-resisting system 200J is shown in FIG. 75 for a tornado shelter 100J. System 200J may be one of any previous main tornado-resisting systems except that both ends are supported by elevated structural supports. The two ends may be at the same or different elevation(s) above the grade. Each end of system 200J is connected to the structural support 299J through tornado-resisting connector 280J and anchors 270. All panels of system 200J, foundations 290J, structural supports 299J, and all the connections must be designed to withstand ICC 500 specified live loads and tornado wind forces.

Figure 76:
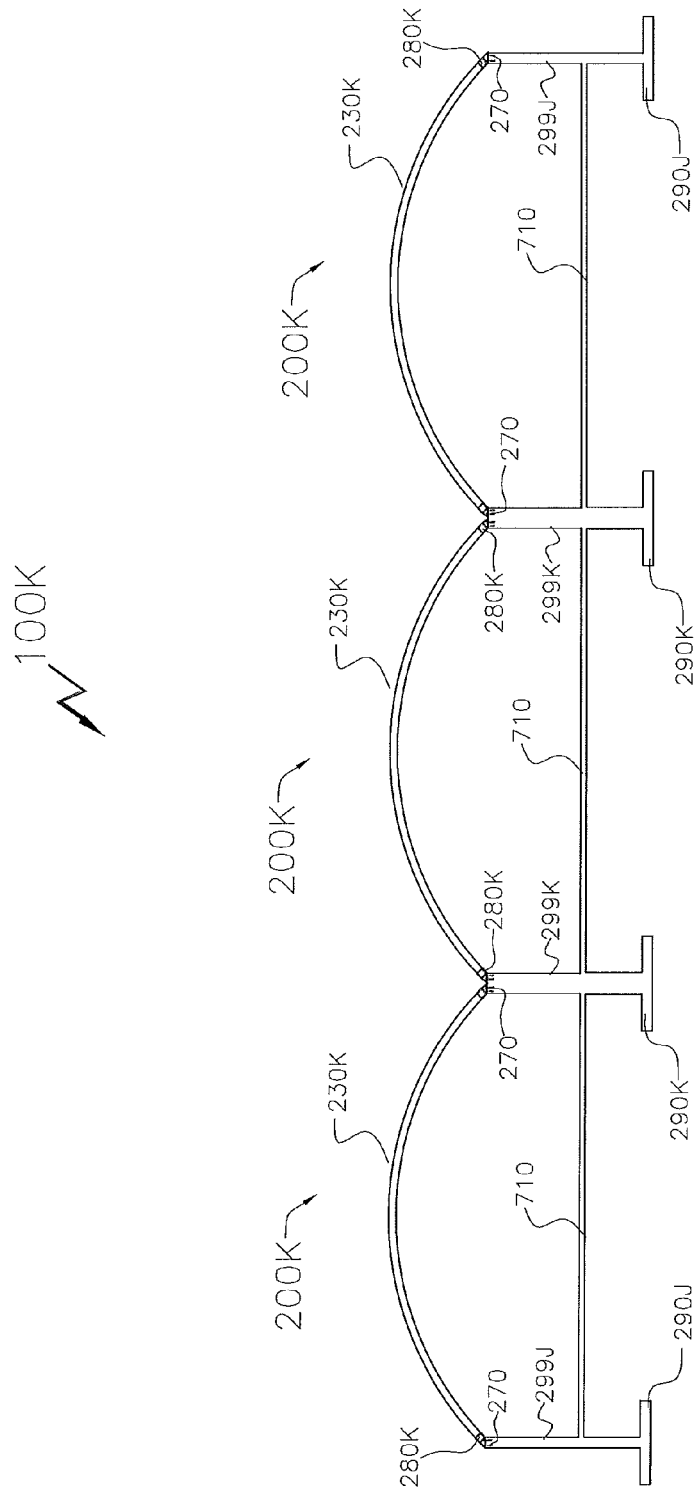
FIG. 76 is a view of an alternative shape of a multi-bay elevated main tornado-resisting system constructed from a commercial package according to an exemplary embodiment of the invention

Shown in FIG. 76 is a further alternative type of main tornado-resisting systems 200K for a tornado shelter 100K. Each bay of system 200K is similar to system 200J shown in FIG. 75. By using multiple bays of system 200K, the total number of occupants allowable in shelter 100K can be significantly increased.

Commentary

From the foregoing, it will be immediately evident to persons of ordinary skill that the above structures have great utility, in that:

they can be used as tornado shelters with occupants range from a few family members up to tens of thousands for a very large community.

they can be prefabricated as commercial packages they can be modified to include many features and functions of use both when in use as a tornado shelter and in day-to-day non-emergency auxiliary uses installation instructions, checklists, and quality assurance plans that are created specifically for the above tornado shelters can accompany the packages when sold as kits, or the packages can be assembled as a service Based upon the foregoing description, persons of ordinary skill in the art will be able to readily reproduce the exemplary embodiments as well as variants thereof that also embody the invention.

Merely to assist such persons of ordinary skill, and without admission against interest in any way as to the need for further explanation, the following further comments about features shown in the drawings are provided.

In order to safely resist large wind forces and roof live loads, the shelter must be strong and rigid. However, the stronger and more rigid the tornado shelter, the larger tornado debris missile impact forces will be. Such increased impact forces will in turn require an even stronger tornado shelter. This vicious cycle can significantly increase the tornado shelter costs. Accordingly, exploitation of the invention involves the design of panels that are sufficiently strong to meet the desired wind forces and roof live loads, but also flexible enough to withstand the desired debris missile impact forces. For greater certainty, the panels shown in the drawings meet the ICC 500 requirements. The steel forming the panels in the drawings ranges in thickness from 0.03" to 0.13" in thickness. Selection of a suitable steel thickness in any given application is a matter of routine trial and error for a person of ordinary skill in the art; normally, larger spans and walls will be constructed of thicker steel. By way of example, only, the structure shown in FIG. 3, which spans 100', can be constructed of steel 0.105" in thickness to meet applicable standards, whereas the structure of FIG. 62, which spans 8', has steel as thin as 0.03" thick forming the roof structure.

A plurality of the tornado-resisting panels bolted to one another end to end serve as the envelope of the tornado shelters, side walls, and roof. The sizes of the envelope can be increased by using one or more internal supports which can but not need be made of the tornado-resisting panels.

Tornado-resisting connectors as shown in the drawings are an important consideration. The main function of the tornado-resisting connectors is to secure the envelope to the foundation. In order to safely transfer the large tornado forces from the envelope into the foundation, the connectors must safely withstand (i) the large shear and bearing forces from the connection bolts connecting the said systems to the said connectors; and (ii) and the large tensile forces and moments from the main tornado-resisting systems, and safely transfer them into the tornado shelter foundation through the tornado-resisting anchor systems.

A tornado-resistant foundation is also another important consideration. The foundation must safely withstand the large tornado uplift and shear forces from the main tornado-resisting systems, tornado-resisting connectors and tornado anchor systems.

Tornado-resisting end walls need also be provided and can be made of a plurality of the tornado-resisting panels bolted to one another end to end. The bottom end of the tornado-resisting end wall panel is secured to the foundation through the tornado-resisting connector. The top end of the said end wall panel is connected to and laterally supported by the main tornado-resisting system. These tornado-resisting end wall panels are bolted to one another side by side to form a solid tornado-resisting end wall. Taller end walls may be laterally supported by floor diaphragms and shear walls made of the tornado-resisting panels.

End wall doors, windows, and vents can be protected by the tornado-resisting panels from the impact of tornado debris. For example, venting openings can be protected by bolting the tornado-resisting panels on the exterior side of the venting openings. Windows and doors can be protected by shutters made of the tornado-resisting panels. Large gates for community tornado shelters can be protected by alcove/baffled entry systems made of the tornado-resisting panels.

Emergency escape openings can be protected by the tornado-resisting panels bolted to the exterior face of the openings by wing nuts that can be removed from the inside of the tornado shelters.

Installation checklists can provide detailed instructions for the installations of the above tornado-resist panels, main tornado-resisting systems, tornado-resisting connectors, tornado-resisting end walls, tornado impact-protective systems, and tornado-resisting emergency escape openings.

Tornado shelter quality assurance plans can provide detailed requirements for the main tornado-resisting systems and panels, quality assurance of the manufacturer and components, quality assurance of the installation, structural observations and special inspections by licensed professional engineer for the above tornado-resisting panels, main tornado-resisting systems, tornado-resisting connectors, tornado-resisting end walls, tornado impact-protective systems, and tornado-resisting emergency escape openings.

A commercial package can be provided which comprises components for a residential or community tornado shelter made of the above tornado-resisting panels, main tornado-resisting systems, tornado-resisting connectors, tornado-resisting end walls, tornado impact-protective systems, and/or tornado-resisting emergency escape openings, including the associated engineering drawings, installation checklist and quality assurance plan.

CONCLUSIONS

Whereas specific embodiments and variations are herein shown and described, it will be evident that further variations, as well as combinations and subcombinations of features, are possible.

Further, whereas the invention allows for the construction of shelters that will meet the structural performance criteria of ICC 500, FEMA 361, IBC, ASCE 7, AISI S100, and ACI 318 for 250 mph tornado wind forces, 100 mph 15-lb sawn lumber 2×4 missile impacts, and 100 psf roof live loads, not all applications will require compliance with all criteria, and the invention should not be so limited. Further, it will be understood that the above mentioned standards are subject to change, and to the extent that the invention is defined by standards that change in the future, it should be understood that the claims encompass packages, uses and methods that fall within the standards referenced, notwithstanding that such standards may be amended or replaced in the future. Accordingly, it will be understood that the invention is to be limited only by the accompanying claims, purposively construed.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A low cost tornado shelter comprising:
   a plurality of 0.03" to 0.13" thick tornado-resisting cold-formed steel panels;
   a plurality of 10' to 100' wide main tornado-resisting systems comprised of the panels;
   a tornado-resisting end wall system;
   a tornado-resisting foundation system; and
   the panels, the main systems, the end wall and the foundation being adapted such that the shelter is capable of providing life-safety protection to up to thousands of occupants from up to 250 mph tornadoes and up to 100 mph tornado debris missile impacts.

2. The tornado shelter according to claim 1, wherein the end wall system is comprised of the panels.

3. The tornado shelter according to claim 1, wherein at least one of the end walls includes at least one baffled entry system comprising:
   an opening within the end wall;
   a tornado-resisting main baffled entry wall comprised of the panels;
   a tornado-resisting side baffled entry wall system comprised of the panels;
   a tornado-resisting horizontal diaphragm comprised of the panels; and
   the opening, the main baffled entry wall, the side baffled entry wall system, the horizontal diaphragm, and the end wall being adapted to allow occupants to enter the shelter through two passageways while providing life-safety protections to up to thousands of occupants from up to 100 mph tornado debris missile impacts, with or without a door.

4. A tornado shelter according to claim 1, wherein an opening is protected by a tornado impact-protective system comprised of one or more of the panels.

5. A commercial package comprising the steel components of the panels, the main systems, the end walls of the shelter, and the impact-protective system according to claim 1.

6. A commercial package comprising the steel components of the panels, the main systems, the end walls of the shelter, and the impact-protective system according to claim 2.

7. A commercial package comprising the steel components of the panels, the main systems, the end walls of the shelter, and the impact-protective system according to claim 3.

8. A commercial package comprising the steel components of the panels, the main systems, the end walls of the shelter, and the impact-protective system according to claim 4.

9. A method of assisting a consumer with the securement of a tornado shelter, the method comprising the steps of:
   offering the commercial package of claim 5 for sale; and
   providing assistance in the installation of the commercial package.

10. A method of assisting a consumer with the securement of a tornado shelter, the method comprising the steps of:
    offering the commercial package of claim 6 for sale; and
    providing assistance in the installation of the commercial package.

11. A method of assisting a consumer with the securement of a tornado shelter, the method comprising the steps of:
    offering the commercial package of claim 7 for sale; and
    providing assistance in the installation of the commercial package.

12. A method of assisting a consumer with the securement of a tornado shelter, the method comprising the steps of:
    offering the commercial package of claim 8 for sale; and
    providing assistance in the installation of the commercial package.

13. The method according to claim 9, wherein the assistance is provided in the form of one or more of instructions accompanying the commercial package in shipment and the service of installation of the commercial package.

14. The method according to claim 10, wherein the assistance is provided in the form of one or more of instructions accompanying the commercial package in shipment and the service of installation of the commercial package.

15. The method according to claim 11, wherein the assistance is provided in the form of one or more of instructions accompanying the commercial package in shipment and the service of installation of the commercial package.

16. The method according to claim 12, wherein the assistance is provided in the form of one or more of instructions accompanying the commercial package in shipment and the service of installation of the commercial package.

17. The tornado shelter according to claim 3 wherein the baffle wall has opposite ends and is located inside the shelter, the baffle wall having a width greater than the opening, the baffle wall ends being spaced apart from and inside the opening to create two passageway disposed between each end of the baffle wall an edge of the opening.

\* \* \* \* \*

UNITED STATES PATENT AND TRADEMARK OFFICE
CERTIFICATE OF CORRECTION

PATENT NO. : 9,938,710 B2
APPLICATION NO. : 14/675124
DATED : April 10, 2018
INVENTOR(S) : Ping Guo Page 1 of 1

It is certified that error appears in the above-identified patent and that said Letters Patent is hereby corrected as shown below:

In the Specification

Column 12, Line 23, delete "1006" and substitute therefore --100B--.

Signed and Sealed this
Twenty-first Day of May, 2019

Andrei Iancu
*Director of the United States Patent and Trademark Office*